United States Patent
Kurokawa

(10) Patent No.: US 10,504,204 B2
(45) Date of Patent: Dec. 10, 2019

(54) ELECTRONIC DEVICE

(71) Applicant: Semiconductor Energy Laboratory Co., Ltd., Atsugi-shi, Kanagawa-ken (JP)

(72) Inventor: Yoshiyuki Kurokawa, Sagamihara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 22 days.

(21) Appl. No.: 15/646,537

(22) Filed: Jul. 11, 2017

(65) Prior Publication Data
US 2018/0018752 A1 Jan. 18, 2018

(30) Foreign Application Priority Data

Jul. 13, 2016 (JP) .................................. 2016-138377
Jul. 13, 2016 (JP) .................................. 2016-138378

(51) Int. Cl.
*G06T 1/60* (2006.01)
*G06F 1/3218* (2019.01)
(Continued)

(52) U.S. Cl.
CPC .............. *G06T 1/60* (2013.01); *G06F 1/3218* (2013.01); *G06F 3/044* (2013.01); *G06F 3/0416* (2013.01);
(Continued)

(58) Field of Classification Search
CPC .............. G06F 1/3218; G09G 3/3291; G09G 2330/021; G09G 2360/12
See application file for complete search history.

(56) References Cited

U.S. PATENT DOCUMENTS 5,615,376 A    3/1997   Ranganathan
6,351,273 B1   2/2002   Lemelson et al.
(Continued)

FOREIGN PATENT DOCUMENTS

JP    2008-225381 A    9/2008
WO   WO-2007/041150   4/2007

OTHER PUBLICATIONS

Arima.Y et al., "A Self-Learning Neural Network Chip with 125 Neurons and 10K Self-Organization Synapses", IEEE Journal of Solid-State Circuits, Apr. 1, 1991, vol. 26, No. 4, pp. 607-611.

*Primary Examiner* — Grace Q Li
(74) *Attorney, Agent, or Firm* — Robinson Intellectual Property Law Office; Eric J. Robinson

(57) ABSTRACT

To provide an electronic device with reduced power consumption. In the case where rewriting of image data is not performed in an electronic device including a display device, a source driver, a gate driver, an image processing circuit, and the like that drive the display device are power-gated, reducing the power consumption of the electronic device. When power gating is performed, setting data needs to be saved into a memory device in advance. It is preferable that the saving of setting data be performed according to a prediction that power gating is to be performed. To predict whether to perform power gating, learning and calculation using a neural network are carried out. Predictive information about whether to perform power gating is obtained by the calculation, and when power gating is performed, saving of setting data into the memory device is speculatively executed.

16 Claims, 42 Drawing Sheets

(51) Int. Cl.
*G06F 3/041* (2006.01)
*G09G 3/36* (2006.01)
*G06F 13/40* (2006.01)
*G09G 3/20* (2006.01)
*G06F 3/044* (2006.01)
*G09G 3/3291* (2016.01)

(52) U.S. Cl.
CPC ....... *G06F 13/4068* (2013.01); *G09G 3/2096* (2013.01); *G09G 3/3291* (2013.01); *G09G 3/3688* (2013.01); *G09G 2300/046* (2013.01); *G09G 2300/0814* (2013.01); *G09G 2320/0295* (2013.01); *G09G 2330/021* (2013.01); *G09G 2360/12* (2013.01); *Y02D 10/14* (2018.01); *Y02D 10/151* (2018.01)

(56) References Cited

U.S. PATENT DOCUMENTS

| | | | |
|---|---|---|---|
| 6,473,078 | B1 | 10/2002 | Ikonen et al. |
| 8,126,685 | B2 | 2/2012 | Nasle |
| 8,547,753 | B2 | 10/2013 | Takemura et al. |
| 8,581,625 | B2 | 11/2013 | Yoneda et al. |
| 8,698,717 | B2 | 4/2014 | Arasawa et al. |
| 8,809,850 | B2 | 8/2014 | Yamazaki |
| 8,854,286 | B2 | 10/2014 | Yamazaki et al. |
| 9,207,511 | B2 | 12/2015 | Yamazaki et al. |
| 9,478,704 | B2 | 10/2016 | Nishijima et al. |
| 9,520,411 | B2 | 12/2016 | Takahashi et al. |
| 9,627,010 | B2 | 4/2017 | Ishizu et al. |
| 9,934,826 | B2 | 4/2018 | Kurokawa |
| 10,061,172 | B2 | 8/2018 | Yamazaki et al. |
| 2003/0107688 | A1 | 6/2003 | Yamagishi |
| 2010/0191487 | A1 | 7/2010 | Rada et al. |
| 2011/0160913 | A1 | 6/2011 | Parker et al. |
| 2011/0175894 | A1* | 7/2011 | Wakimoto ........... G09G 3/3648 345/212 |
| 2011/0185303 | A1 | 7/2011 | Katagi et al. |
| 2012/0117311 | A1* | 5/2012 | Hong .................. G06F 1/3275 711/103 |
| 2014/0340115 | A1* | 11/2014 | Kurokawa ........... H03K 19/094 326/41 |
| 2016/0283028 | A1 | 9/2016 | Yamazaki et al. |
| 2016/0343452 | A1 | 11/2016 | Ikeda et al. |
| 2017/0063351 | A1 | 3/2017 | Kurokawa |
| 2017/0263291 | A1 | 9/2017 | Kurokawa |
| 2017/0270405 | A1 | 9/2017 | Kurokawa |
| 2017/0337884 | A1 | 11/2017 | Kurokawa |
| 2017/0351947 | A1* | 12/2017 | Tamura .................. G06N 3/04 |
| 2018/0005566 | A1 | 1/2018 | Kurokawa |

\* cited by examiner

<u>411</u>

<u>413</u>

<u>414</u>

<u>415</u>

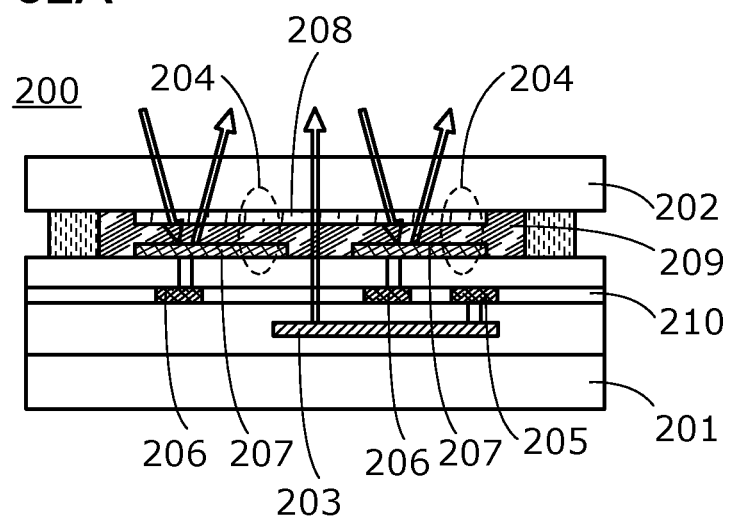
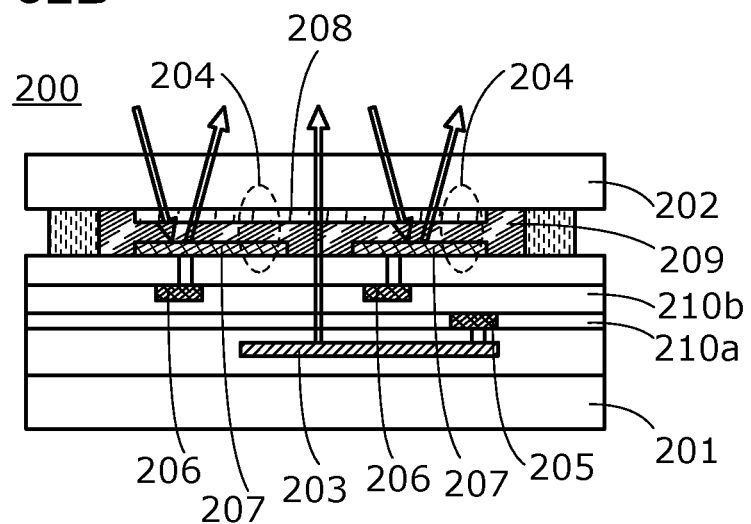

ELECTRONIC DEVICE

BACKGROUND OF THE INVENTION

1. Field of the Invention

Embodiments of the present invention relate to an electronic device, an operation method of the electronic device, and a moving vehicle.

Note that one embodiment of the present invention is not limited to the above technical field. The technical field of the invention disclosed in this specification and the like relates to an object, a method, or a manufacturing method. One embodiment of the present invention relates to a process, a machine, manufacture, or a composition of matter. Specifically, examples of the technical field of one embodiment of the present invention disclosed in this specification include a semiconductor device, a display device, a liquid crystal display device, a light-emitting device, a power storage device, an imaging device, a memory device, a processor, an electronic device, a method for driving any of them, a method for manufacturing any of them, a method for testing any of them, and a system including any of them.

2. Description of the Related Art

Display devices included in mobile phones such as smartphones, tablet information terminals, and notebook personal computers (PC) have undergone various improvements in recent years. For example, there have been developed display devices with features such as higher resolution, higher color reproducibility (higher NTSC ratio), a smaller driver circuit, and lower power consumption.

As an example, an improved display device has a function of automatically adjusting the brightness of an image displayed on the display device in accordance with ambient light. An example of such a display device is a display device having a function of displaying an image by reflecting ambient light and a function of displaying an image by making a light-emitting element emit light. This structure enables the brightness of an image displayed on a display device to be adjusted in the following manner: the display device is set to a display mode for displaying an image with the use of reflected light (hereinafter referred to as a reflective mode) when ambient light is sufficiently strong, whereas the display device is set to a display mode for displaying an image with light emitted from a light-emitting element (hereinafter referred to as a self-luminous mode) when ambient light is weak. In other words, the display device can display images in a display mode that is selected from the reflective mode, the self-luminous mode, and a mode using both the reflective and self-luminous modes in accordance with the intensity of ambient light sensed with an illuminometer (illuminance sensor).

As examples of a display device having a function of displaying an image by making a light-emitting element emit light and a function of displaying an image by reflecting ambient light, Patent Documents 1 to 3 each disclose a display device in which one pixel includes a pixel circuit for controlling a liquid crystal element and a pixel circuit for controlling a light-emitting element (such a display device is referred to as a hybrid display device).

For image processing for a display device to display an image, the utilization of a neural network has been considered. Non-Patent Document 1 discloses a technique relating to a chip having a self-learning function with a neural network.

REFERENCE

Patent Document

[Patent Document 1] United States Patent Application Publication No. 2003/0107688
[Patent Document 2] PCT International Publication No. WO2007/041150
[Patent Document 3] Japanese Published Patent Application No. 2008-225381

Non-Patent Document

[Non-Patent Document 1] Yutaka Arima et al., "A Self-Learning Neural Network Chip with 125 Neurons and 10K Self-Organization Synapses," *IEEE Journal of Solid-State Circuits*, Vol. 26, No. 4, April 1991, pp. 607-611

SUMMARY OF THE INVENTION

The use of a transistor having a low off-state current as a selection transistor included in a display element (e.g., a reflective element, a liquid crystal element, and a light-emitting element) of a display device allows the display element to hold charge (image data) for a long time. This is because the off-state current of the selection transistor in an off state is low and thus leakage of charge (image data) from the display element is unlikely to occur. Particularly in the case where the display device displays a still image, the image data held in the display element does not need to be refreshed; consequently, power consumption can be reduced while high display quality is kept. Furthermore, in this case, rewriting of image data is also unnecessary; thus, a source driver and a gate driver that drive the display device can be power-gated to reduce the power consumption of the display device. A driving method in which circuits that are not needed while a display device displays a still image are power-gated during the period in the aforementioned manner is referred to as idling stop (idle reduction) driving (or IDS driving) in this specification.

Idling stop driving of a display device can be triggered by determination that image data is not updated. In accordance with the timing when idling stop driving is executed, a source driver, a gate driver, an image correction circuit, and the like included in the display device can be power-gated. To determine that image data is not updated, for example, a source driver or the like can determine that after display of image data of one frame is finished, image data of the next frame is not transmitted in a display device, or an appropriate circuit can transmit a control signal indicating that image data is not updated.

Note that in the case where circuits included in a display device are power-gated, setting data is required to be saved into a memory device such as a register prior to the power gating. For data saving, the circuits in the display device need to operate. In other words, the circuits in the display device cannot be power-gated until data saving is completed. That is to say, in the case where data saving is started when it is determined by the above determination method that image data is not updated, a long time is required before power gating of the circuits because the circuits in the display device continue operating until the data saving is completed. Thus, the net power gating period of the circuits is shortened, resulting in decrease of the effect of reduction in power consumption owing to power gating of the circuits in the display device in some cases.

An object of one embodiment of the present invention is to provide a novel electronic device. Another object of one embodiment of the present invention is to provide an operation method of the novel electronic device.

Another object of one embodiment of the present invention is to provide an electronic device with high display quality. Another object of one embodiment of the present invention is to provide an electronic device with low power consumption.

Note that the objects of one embodiment of the present invention are not limited to the above objects. The objects described above do not disturb the existence of other objects. The other objects are the ones that are not described above and will be described below. The other objects are apparent from and can be derived from the description of the specification, the drawings, and the like by those skilled in the art. One embodiment of the present invention achieves at least one of the above objects and the other objects. One embodiment of the present invention does not necessarily achieve all the above objects and the other objects.

(1) One embodiment of the present invention is an electronic device including a data processing circuit, a frame memory, and a memory device. The frame memory includes a power consumption monitor. The data processing circuit includes a first product-sum operation circuit, a second product-sum operation circuit, a first switch circuit, and a second switch circuit. The first product-sum operation circuit includes a first terminal. The second product-sum operation circuit includes a second terminal. The first switch circuit includes a third terminal and a fourth terminal. The second switch circuit includes a fifth terminal and a sixth terminal. The first terminal is electrically connected to the third terminal. The second terminal is electrically connected to the fifth terminal. The fourth terminal is electrically connected to the sixth terminal. The first switch circuit is configured to electrically connect or disconnect the third terminal and the fourth terminal to or from each other. The second switch circuit is configured to electrically connect or disconnect the fifth terminal and the sixth terminal to or from each other. The frame memory is configured to hold image data and to rewrite the held image data. The power consumption monitor is configured to obtain as first data an amount of power consumed when the image data held in the frame memory is rewritten. The data processing circuit is configured to receive the first data and a signal indicating whether to perform idling stop driving and to determine whether to speculatively execute data saving into the memory device, in response to the first data and the signal.

(2) Another embodiment of the present invention is an electronic device including a data processing circuit, a touch sensor unit, and a memory device. The data processing circuit includes a first product-sum operation circuit, a second product-sum operation circuit, a first switch circuit, and a second switch circuit. The first product-sum operation circuit includes a first terminal. The second product-sum operation circuit includes a second terminal. The first switch circuit includes a third terminal and a fourth terminal. The second switch circuit includes a fifth terminal and a sixth terminal. The first terminal is electrically connected to the third terminal. The second terminal is electrically connected to the fifth terminal. The fourth terminal is electrically connected to the sixth terminal. The first switch circuit is configured to electrically connect or disconnect the third terminal and the fourth terminal to or from each other. The second switch circuit is configured to electrically connect or disconnect the fifth terminal and the sixth terminal to or from each other. The touch sensor unit is configured to obtain first data based on input data. The data processing circuit is configured to receive the first data and a signal indicating whether to perform idling stop driving and to determine whether to speculatively execute data saving into the memory device, in response to the first data and the signal.

(3) Another embodiment of the present invention is the electronic device according to (1) or (2) in which the configuration of the first switch circuit is the same as the configuration of the second switch circuit. The fifth terminal corresponds to the third terminal. The sixth terminal corresponds to the fourth terminal. The first switch circuit includes a circuit. The circuit includes a first transistor, a second transistor, and a first capacitor. One of a source and a drain of the first transistor is electrically connected to a gate of the second transistor. One of a pair of electrodes of the first capacitor is electrically connected to the one of the source and the drain of the first transistor. One of a source and a drain of the second transistor is electrically connected to the third terminal. The other of the source and the drain of the second transistor is electrically connected to the fourth terminal.

(4) Another embodiment of the present invention is the electronic device according to (3) in which at least one of channel formation regions in the first transistor and the second transistor includes an oxide containing at least one of indium, zinc, and an element M that is aluminum, gallium, yttrium, or tin.

(5) Another embodiment of the present invention is the electronic device according to any one of (1) to (4) in which the configuration of the second product-sum operation circuit is the same as the configuration of the first product-sum operation circuit. The first product-sum operation circuit includes a first memory cell, a second memory cell, and an offset circuit. The first memory cell is electrically connected to the offset circuit. The second memory cell is electrically connected to the offset circuit. The first memory cell is configured to hold first analog data and to supply a first current based on the first analog data when a first signal is input as a selection signal to the first memory cell. The second memory cell is configured to hold reference analog data and to supply a second current based on the reference analog data when the first signal is input as the selection signal to the second memory cell. The offset circuit is configured to supply a third current which is a difference between the first current and the second current. The first memory cell is configured to supply a fourth current based on a second signal including a second analog data and the first analog data when the second signal is input as the selection signal to the first memory cell. The second memory cell is configured to supply a fifth current based on the second signal and the reference analog data when the second signal is input as the selection signal to the second memory cell. The first product-sum operation circuit is configured to output a sixth current obtained by subtracting the third current from a difference between the fourth current and the fifth current.

(6) Another embodiment of the present invention is the electronic device according to any one of (1) to (4) that includes an offset circuit. The configuration of the second product-sum operation circuit is the same as the configuration of the first product-sum operation circuit. The first product-sum operation circuit includes a memory cell array. The memory cell array includes a first memory cell and a second memory cell. The first memory cell is electrically connected to the offset circuit. The second memory cell is electrically connected to the offset circuit. The first memory cell is configured to hold first analog data and to supply a first current based on the first analog data when a first signal is input as a selection signal to the first memory cell. The second memory cell is configured to hold reference analog data and to supply a second current based on the reference analog data when the first signal is input as a selection signal to the second memory cell. The offset circuit is configured to supply a third current which is a difference between the first current and the second current. The first memory cell is configured to supply a fourth current based on a second signal including second analog data and the first analog data when the second signal is input as the selection signal to the first memory cell. The second memory cell is configured to supply a fifth current based on the second signal and the reference analog data when the second signal is input as the selection signal to the second memory cell. The first product-sum operation circuit is configured to output a sixth current obtained by subtracting the third current from a difference between the fourth current and the fifth current.

(7) Another embodiment of the present invention is an electronic device including a data processing circuit, a frame memory, and a memory device. The frame memory includes a power consumption monitor. The data processing circuit includes a first memory cell, a second memory cell, and an offset circuit. The first memory cell is configured to output a first current based on first analog data held in the first memory cell. The second memory cell is configured to output a second current based on reference analog data held in the second memory cell. The offset circuit is configured to output a third current which is a difference between the first current and the second current. The first memory cell is configured to output a fourth current based on the first analog data held in the first memory cell, when second analog data is input as a selection signal to the first memory cell. The second memory cell is configured to output a fifth current based on the reference analog data held in the second memory cell, when the second analog data is input as the selection signal to the second memory cell. The data processing circuit is configured to output a sixth current that is obtained by subtracting the third current from a difference between the fourth current and the fifth current and depends on a sum of products of the first analog data and the second analog data. The frame memory is configured to hold image data and to rewrite the held image data. The power consumption monitor is configured to obtain as first data an amount of power consumed when the image data held in the frame memory is rewritten. The data processing circuit is configured to receive the first data and a signal indicating whether to perform idling stop driving and to determine to speculatively execute whether data saving into the memory device, in response to the first data, the signal, and the sixth current.

(8) Another embodiment of the present invention is an electronic device including a data processing circuit, a touch sensor unit, and a memory device. The data processing circuit includes a first memory cell, a second memory cell, and an offset circuit. The first memory cell is configured to output a first current based on first analog data held in the first memory cell. The second memory cell is configured to output a second current based on reference analog data held in the second memory cell. The offset circuit is configured to output a third current which is a difference between the first current and the second current. The first memory cell is configured to output a fourth current based on the first analog data held in the first memory cell, when second analog data is input as a selection signal to the first memory cell. The second memory cell is configured to output a fifth current based on the reference analog data held in the second memory cell, when the second analog data is input as the selection signal to the second memory cell. The data processing circuit is configured to output a sixth current that is obtained by subtracting the third current from a difference between the fourth current and the fifth current and depends on a sum of products of the first analog data and the second analog data. The touch sensor unit is configured to obtain first data based on input data. The data processing circuit is configured to receive the first data and a signal indicating whether to perform idling stop driving and to determine whether to speculatively execute data saving into the memory device, in response to the first data, the signal, and the sixth current.

(9) Another embodiment of the present invention is the electronic device according to any one of (5) to (8) in which the first memory cell, the second memory cell, and the offset circuit each include a third transistor. A channel formation region in the third transistor includes an oxide containing at least one of indium, zinc, and an element M that is aluminum, gallium, yttrium, or tin.

(10) Another embodiment of the present invention is the electronic device according to any one of (1) to (9) in which the memory device is a register.

(11) Another embodiment of the present invention is the electronic device according to any one of (1) to (10) that includes a first display element and a second display element. The first display element is configured to display an image with use of reflection of light. The second display element is configured to display an image by self-emission.

According to one embodiment of the present invention, a novel electronic device can be provided. According to another embodiment of the present invention, an operation method of the novel electronic device can be provided.

According to another embodiment of the present invention, an electronic device with high display quality can be provided. According to another embodiment of the present invention, an electronic device with low power consumption can be provided.

Note that the effects of one embodiment of the present invention are not limited to the above effects. The effects described above do not disturb the existence of other effects. The other effects are the ones that are not described above and will be described below. The other effects will be apparent from and can be derived from the description of the specification, the drawings, and the like by those skilled in the art. One embodiment of the present invention has at least one of the above effects and the other effects. Accordingly, one embodiment of the present invention does not have the aforementioned effects in some cases.

BRIEF DESCRIPTION OF THE DRAWINGS

FIGS. 32A and 32B are cross-sectional views each illustrating an example of a display device.

DETAILED DESCRIPTION OF THE INVENTION

An "electronic device", an "electronic component", a "module", and a "semiconductor device" will be described. In general, an "electronic device" may refer to a personal computer, a mobile phone, a tablet terminal, an e-book reader, a wearable terminal, an audiovisual (AV) device, an electronic appliance, a household appliance, an industrial appliance, a digital signage, a car, or an electronic appliance including a system, for example. An "electronic component" or a "module" may refer to a processor, a memory device, a sensor, a battery, a display device, a light-emitting device, an interface device, a radio frequency (RF) tag, a receiver, or a transmitter included in an electronic device. A "semiconductor device" may refer to a device including a semiconductor element or a driver circuit, a control circuit, a logic circuit, a signal generation circuit, a signal conversion circuit, a potential level converter circuit, a voltage source, a current source, a switch circuit, an amplifier circuit, a memory circuit, a memory cell, a display circuit, a display pixel, or the like that includes a semiconductor element and is included in an electronic component or a module.

In this specification, an oxide semiconductor is referred to as an OS in some cases. Thus, a transistor including an oxide semiconductor in a channel formation region is referred to as an OS transistor in some cases.

Embodiment 1

As described above, in the case where circuits included in a display device are power-gated, setting data needs to be saved into a memory device such as a register. Thus, power gating of the circuits included in the display device cannot be started until data saving is completed. In view of this, this embodiment discloses a configuration example of a display device controller integrated chip (controller IC) that is capable of predicting power gating of the circuits in the display device and speculatively executing data saving into the memory device in advance in order that data saving is completed early. A controller IC that controls a display portion of a hybrid display device and has the above functions will be described below.

<Controller IC>

Figure 1:
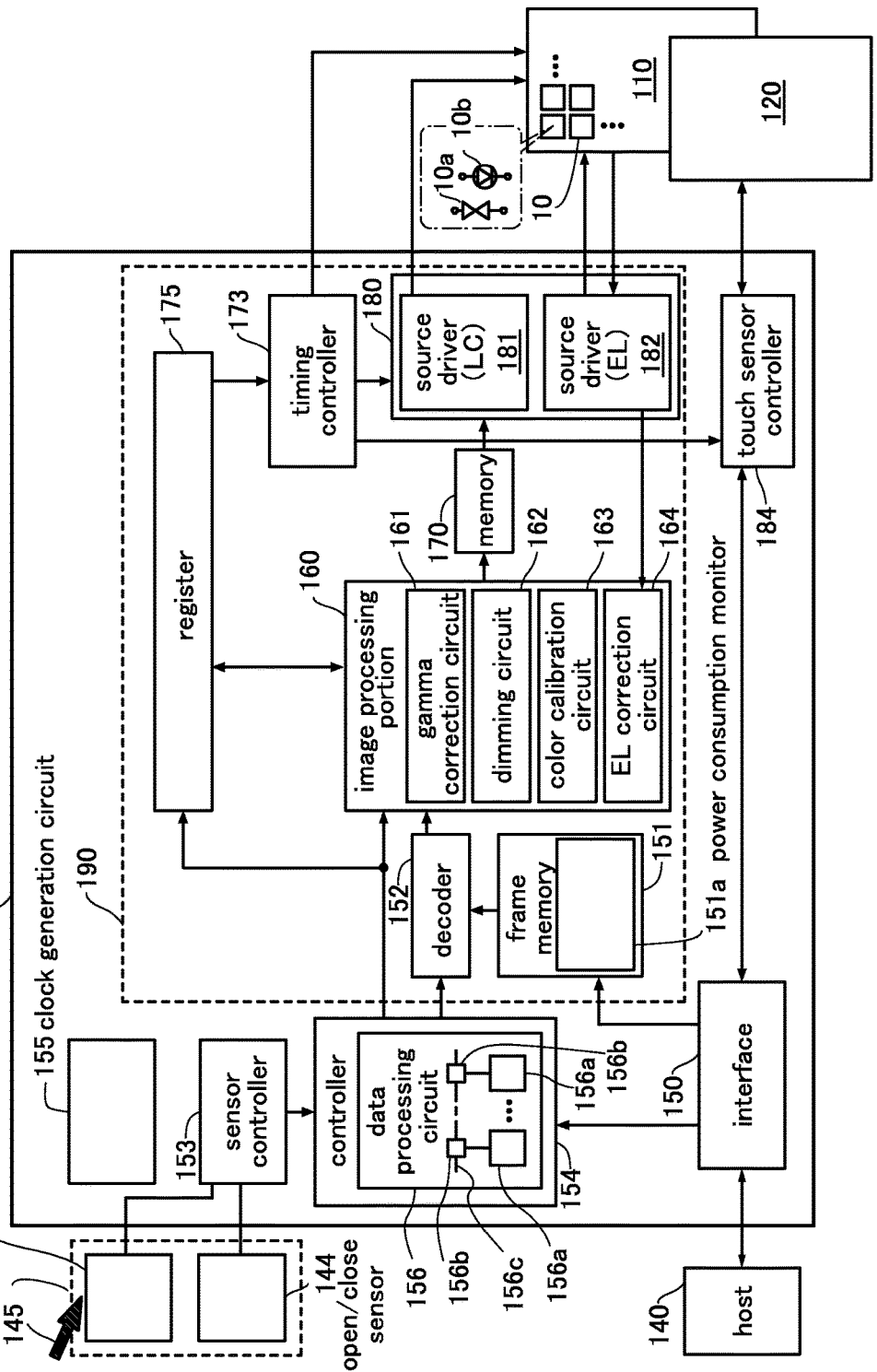
FIG. 1 is a block diagram illustrating a configuration example of a controller IC.

FIG. 1 is a block diagram illustrating a configuration example of a controller IC 115. The controller IC 115 includes an interface 150, a frame memory 151, a decoder 152, a sensor controller 153, a controller 154, a clock generation circuit 155, an image processing portion 160, a memory 170, a timing controller 173, a register 175, a source driver 180, and a touch sensor controller 184.

The controller IC 115 is electrically connected to a display unit 110 and a touch sensor unit 120. The display unit 110 includes a pixel array that includes a plurality of pixels 10. The pixel 10 includes a reflective element 10a and a light-emitting element 10b. Note that the display unit 110 and the touch sensor unit 120 will be described in detail in Embodiment 4.

The reflective element 10a is a display element used when the display device displays an image with use of reflected light, and a liquid crystal element, for example, can be used as the reflective element 10a. The light-emitting element 10b is a display element used when the display device displays an image by self-emission or the like, and an organic electroluminescence (EL) element, for example, can be used as the light-emitting element 10b. Note that the light-emitting element 10b is not limited to an organic EL element and may be a transmissive liquid crystal element with a backlight, an LED, or a display element using quantum dots, for example. In this embodiment, the reflective element 10a is assumed to be a liquid crystal element, and the light-emitting element 10b is assumed to be an organic EL element. Note that the reflective element 10a and the light-emitting element 10b will be described in detail in Embodiment 6.

The controller IC 115 is electrically connected to a sensor 141 that includes multiple kinds of sensors. In FIG. 1, the sensor 141 includes an optical sensor 143, and an open/close sensor 144.

The source driver 180 includes a source driver 181 and a source driver 182. The source driver 181 is a driver for driving the reflective element 10a, and the source driver 182 is a driver for driving the light-emitting element 10b.

Communication between the controller IC 115 and a host 140 is performed via the interface 150. Image data, a variety of control signals, and the like are transmitted from the host 140 to the controller IC 115. Information about a touch position or the like obtained by the touch sensor controller 184 is transmitted from the controller IC 115 to the host 140. Note that the configuration of the controller IC 115 is changed as appropriate depending on, for example, the standard for the host 140 and the specifications of the display unit 110, the touch sensor unit 120, and the like.

The frame memory 151 is a memory for storing the image data input to the controller IC 115. In the case where compressed image data is transmitted from the host 140, the frame memory 151 can store the compressed image data. The decoder 152 is a circuit for decompressing the compressed image data. When decompression of the image data is not needed, processing is not performed in the decoder 152. Alternatively, the decoder 152 can be provided between the frame memory 151 and the interface 150.

The frame memory 151 includes a power consumption monitor 151a. The power consumption monitor 151a has a function of measuring power consumed when image data is held in the frame memory 151.

The image processing portion 160 has a function of performing various kinds of image processing on image data. For example, the image processing portion 160 can include a gamma correction circuit 161, a dimming circuit 162, a color calibration circuit 163, and an EL correction circuit 164.

The gamma correction circuit 161 has a function of correcting a gamma value. The gamma value represents the response characteristics of the gradation of an image to an input voltage (or an input current). Generally, when the gamma value is less than 1, an image with black floating is displayed on the display portion, whereas when the gamma value is greater than 1, an image with dark-area-gradation deterioration is displayed on the display portion. The gamma correction circuit 161 has a function of correcting the input voltage (or the input current) such that the gamma value becomes 1.

The EL correction circuit 164 is provided in the case where the source driver 182 is provided with a current detection circuit that detects current flowing through the light-emitting element 10b. The EL correction circuit 164 has a function of adjusting the luminance of the light-emitting element 10b on the basis of a signal transmitted from the current detection circuit of the source driver 182.

The image data processed in the image processing portion 160 is output to the source driver 180 through the memory 170. The memory 170 is a memory for temporarily storing image data. The source driver 181 and the source driver 182 each have a function of processing the input image data and writing the image data to a source line in the display unit 110.

The timing controller 173 has a function of generating timing signals to be used in the source driver 180, the touch sensor controller 184, and gate drivers of the display unit 110.

The touch sensor controller 184 has a function of controlling a touch sensor driver (hereinafter referred to as a TS driver) and a sensing circuit of the touch sensor unit 120. A signal including touch information read from the sensing circuit is processed in the touch sensor controller 184 and transmitted to the host 140 through the interface 150. The host 140 generates image data reflecting the touch information and transmits the image data to the controller IC 115. Note that the controller IC 115 can reflect the touch information in the image data.

The clock generation circuit 155 has a function of generating a clock signal to be used in the controller IC 115. The controller 154 has a function of processing a variety of control signals transmitted from the host 140 through the interface 150 and controlling a variety of circuits in the controller IC 115. The controller 154 also has a function of controlling power supply to the variety of circuits in the controller IC 115. Hereinafter, temporary stop of power supply to a circuit that is not used is referred to as power gating.

The controller 154 includes a data processing circuit 156. The data processing circuit 156, which is included in the electronic device of one embodiment of the present invention, has a function of predicting whether the electronic device is to perform IDS driving, on the basis of information about the power consumption of the frame memory 151 or touch operation on the electronic device by a user. Furthermore, the data processing circuit 156 includes circuits forming a neural network to be described later.

Note that the data processing circuit 156, which constitutes a neural network circuit, includes a plurality of product-sum operation circuits 156a and a plurality of switch circuits 156b. Each of the product-sum operation circuits 156a is electrically connected to the corresponding switch circuit 156b. The switch circuits 156b are connected in series by a bus 156c. The switch circuits 156b each have a function of electrically connecting or disconnecting the corresponding product-sum operation circuit 156a and the bus 156c. This configuration allows the scale of product-sum operation circuits to be set in a programmable way, so that product-sum operation required for the neural network can be performed with the small-scale product-sum operation circuit, at high speed, and with low power consumption. Note that this configuration will be described in detail in Embodiment 2.

Figure 2:
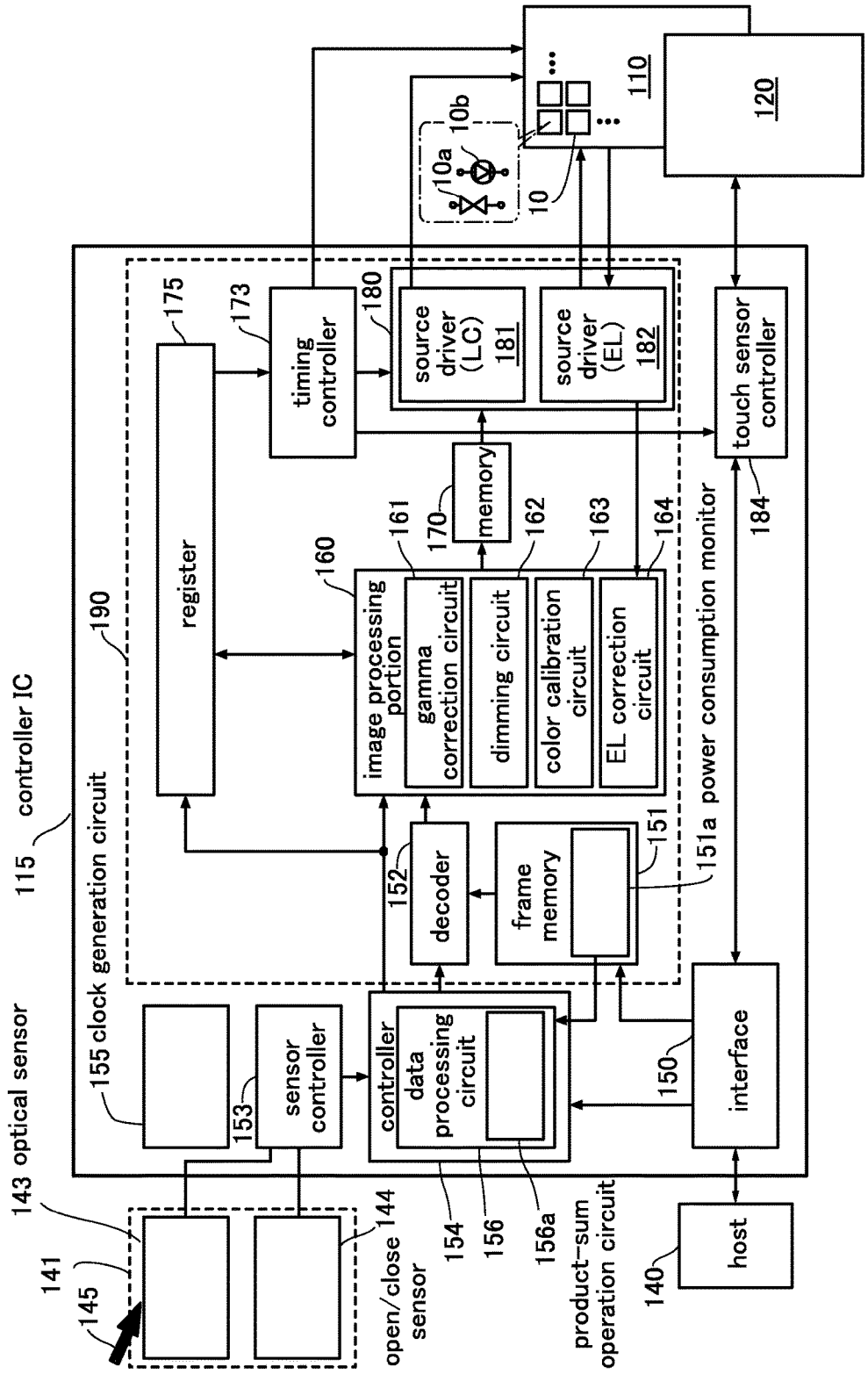
FIG. 2 is a block diagram illustrating a configuration example of a controller IC.

Note that the configuration of the data processing circuit 156 is not limited to that illustrated in FIG. 1. The data processing circuit 156 may include only one product-sum operation circuit 156a as in the controller IC 115 in FIG. 2, for example.

By using the neural network, the data processing circuit 156 performs learning using, as learning data, information about power consumption that is sent from the frame memory 151 and, as teacher data, information about whether IDS driving has been started. After that, the information about power consumption that is sent from the frame memory 151 is input as input data, and a signal containing a prediction on whether to start IDS driving can be output.

Alternatively, the data processing circuit 156 performs learning using, as learning data, information about touch operation by a user that is sent from the touch sensor unit 120 and, as teacher data, information about whether IDS driving has been started. After that, the information about touch operation by the user that is sent from the touch sensor unit 120 is input as input data, and a signal containing a prediction on whether to start IDS driving can be output.

The register 175 stores data used for the operation of the controller IC 115. The data stored in the register 175 includes a parameter used to perform correction in the image processing portion 160, parameters used to generate waveforms of a variety of timing signals in the timing controller 173, and the like. The register 175 is provided with a scan chain register including a plurality of registers. In particular, the register 175 preferably includes a nonvolatile register. Furthermore, a transistor included in the nonvolatile register preferably has a low off-state current. The use of the transistor with a low off-state current enables suppression of current leakage between a source and a drain of the transistor when the transistor is off. Suppression of current leakage allows the register to hold charge (data). Note that the transistor is preferably an OS transistor that includes an oxide containing at least one of indium, zinc, and an element M (the element M is aluminum, gallium, yttrium, or tin) in a channel formation region. Furthermore, the oxide is preferably a CAC-OS to be described in Embodiment 9.

The sensor controller 153 is electrically connected to the optical sensor 143. The optical sensor 143 has a function of measuring the illuminance of external light 145 and generating a sensor signal including information about the measured illuminance and incident angle. The sensor controller 153 generates a control signal on the basis of the sensor signal. The control signal is output to the controller 154, for example.

Furthermore, the open/close sensor 144, which is effective in the case where the hybrid display device is foldable, is electrically connected to the sensor controller 153. When the hybrid display device is folded and the display unit 110 is not used, the open/close sensor 144 sends a signal to the sensor controller 153 so that power gating of circuits and the like in the controller IC is performed. In the case where the hybrid display device is not foldable, the hybrid display device does not necessarily include the open/close sensor 144.

In the case where the reflective element 10*a* and the light-emitting element 10*b* display the same image data, the image processing portion 160 has a function of separately generating image data that the reflective element 10*a* displays and image data that the light-emitting element 10*b* displays. In that case, the reflection intensity of the reflective element 10*a* and the emission intensity of the light-emitting element 10*b* can be adjusted in response to the brightness of the external light 145 measured using the optical sensor 143 and the sensor controller 153. Here, the adjustment can be referred to as dimming or dimming processing. Note that the processing is performed in the dimming circuit 162, for example.

In the case where the display device including the display unit 110 is used outdoors in the daytime on a sunny day, it is not necessary to make the light-emitting element 10*b* emit light if sufficient luminance can be obtained only with the reflective element 10*a*. This is because even when the light-emitting element 10*b* is used to perform display, favorable display cannot be obtained owing to the intensity of external light that exceeds the intensity of light emitted from the light-emitting element 10*b*. In contrast, in the case where the display device including the display unit 110 is used at night or in a dark place, display is performed by making the light-emitting element 10*b* emit light.

In response to the brightness of external light, the image processing portion 160 can generate image data that only the reflective element 10*a* displays, image data that only the light-emitting element 10*b* displays, or image data that the reflective element 10*a* and the light-emitting element 10*b* display in combination. The display device including the display unit 110 can perform favorable display even in an environment with bright external light or an environment with weak external light. Furthermore, power consumption can be reduced by making the light-emitting element 10*b* emit no light or reducing the luminance of the light-emitting element 10*b* in the environment with bright external light.

Color tones can be corrected by combining the display by the light-emitting element 10*b* with the display by the reflective element 10*a*. A function of measuring the color tones of the external light 145 may be added to the optical sensor 143 and the sensor controller 153 to perform such tone correction. For example, in the case where the display device including the display unit 110 is used in an environment with reddish light at twilight, a blue (B) component is not sufficient only with the display by the reflective element 10*a*; thus, the color tones can be corrected by making the light-emitting element 10*b* emit light. Here, the correction can be referred to as color calibration or color calibration processing. In addition, the processing is performed in the color calibration circuit 163.

The image processing portion 160 might include another processing circuit such as an RGB-RGBW conversion circuit depending on the specifications of the display unit 110. The RGB-RGBW conversion circuit has a function of converting image data of red, green, and blue (RGB) into image data of red, green, blue, and white (RGBW). That is, in the case where the display unit 110 includes pixels of four colors of RGBW, power consumption can be reduced by displaying a white (W) component in the image data using the white (W) pixel. Note that in the case where the display unit 110 includes pixels of four colors of RGBY, an RGB-RGBY (red, green, blue, and yellow) conversion circuit can be used, for example.

The reflective element 10*a* and the light-emitting element 10*b* can display different image data. In general, the operation speed of a liquid crystal element, electronic paper, or the like that can be used as a reflective element is low in many cases (it takes time to display a picture). Thus, a still image to be a background can be displayed by the reflective element 10*a* and a moving mouse pointer or the like can be displayed by the light-emitting element 10*b*. In displaying a still image, the display device including the display unit 110 stops operation of the gate driver or the source driver to terminate rewriting of an image (this driving is referred to as idling stop driving or IDS driving), and in displaying a moving image, makes the light-emitting element 10*b* emit light. This enables the display device including the display unit 110 to achieve display of a smooth moving image and reduction in power consumption. In that case, the frame memory 151 may be provided with regions for storing image data displayed by the reflective element 10a and image data displayed by the light-emitting element 10b. Particularly in performing IDS driving, a selection transistor of the reflective element 10a preferably has a low off-state current. Furthermore, a selection transistor of the light-emitting element 10b also preferably has a low off-state current. The use of the selection transistor with a low off-state current allows charge (image data) stored in the reflective element 10a (and the light-emitting element 10b) to be held for a long time when the selection transistor is off. This eliminates the necessity of refreshing image data when a still image is displayed, thereby reducing power consumption.

<<Power Gating>>

In the case where image data transmitted from the host 140 is not changed, the controller 154 can power-gate some circuits in the controller IC 115. Specifically, for example, the circuits are circuits in a region 190 (the frame memory 151, the decoder 152, the image processing portion 160, the memory 170, the timing controller 173, the register 175, and the source driver 180). Power gating can be performed in the case where a control signal indicating no change in the image data is transmitted from the host 140 to the controller IC 115 and detected by the controller 154.

The circuits in the region 190 are the circuits relating to image data and the circuits for driving the display unit 110; therefore, the circuits in the region 190 can be temporarily stopped in the case where the image data is not changed. Note that even when the image data is not changed, a period during which the transistor used for the pixel 10 can store data (a period during which IDS driving can be performed) and a period during which inversion driving is performed to prevent burn-in of a liquid crystal element used as the reflective element 10a may be considered.

For example, the controller 154 may be incorporated with a timer function so as to determine the timing at which power supply to the circuits in the region 190 is restarted, on the basis of time measured by a timer. Note that it is possible to store image data in the frame memory 151 or the memory 170 in advance and supply the image data to the display unit 110 at inversion driving. With such a structure, inversion driving can be performed without transmitting the image data from the host 140. Thus, the amount of data transmitted from the host 140 can be reduced and the power consumption of the controller IC 115 can be reduced.

Note that the circuits that can be power-gated are not limited to the circuits in the region 190, the sensor controller 153, the touch sensor controller 184, and the like, which are described here. A variety of combinations are possible in accordance with the configuration of the controller IC 115, the standard for the host 140, and the specifications of the display unit 110 and the touch sensor unit 120, for example.

This embodiment can be combined with any of the other embodiments in this specification as appropriate.

Embodiment 2

In this embodiment, a configuration example of circuits of the neural network included in the data processing circuit 156 described in Embodiment 1 will be described.

A neural network is an information processing system modeled on a biological neural network. A computer having higher performance than a conventional Neumann computer is expected to be provided by utilizing the neural network, and in these years, a variety of researches on a neural network formed using an electronic circuit have been carried out.

In the neural network, units which resemble neurons are connected to each other through units which resemble synapses. By changing the connection strength, a variety of input patterns are learned, and pattern recognition, associative storage, or the like can be performed at high speed.

For example, a product-sum operation circuit described in this embodiment is used as a feature extraction filter for convolution or an arithmetic circuit for fully connected layer, whereby prediction using a convolutional neural network (CNN) can be performed. Note that weight coefficients of the feature extraction filter can be set using random numbers as initial values.

<Hierarchical Neural Network>

A hierarchical neural network will be described as a kind of neural networks that can be used for the hybrid display device of one embodiment of the present invention.

Figure 3:
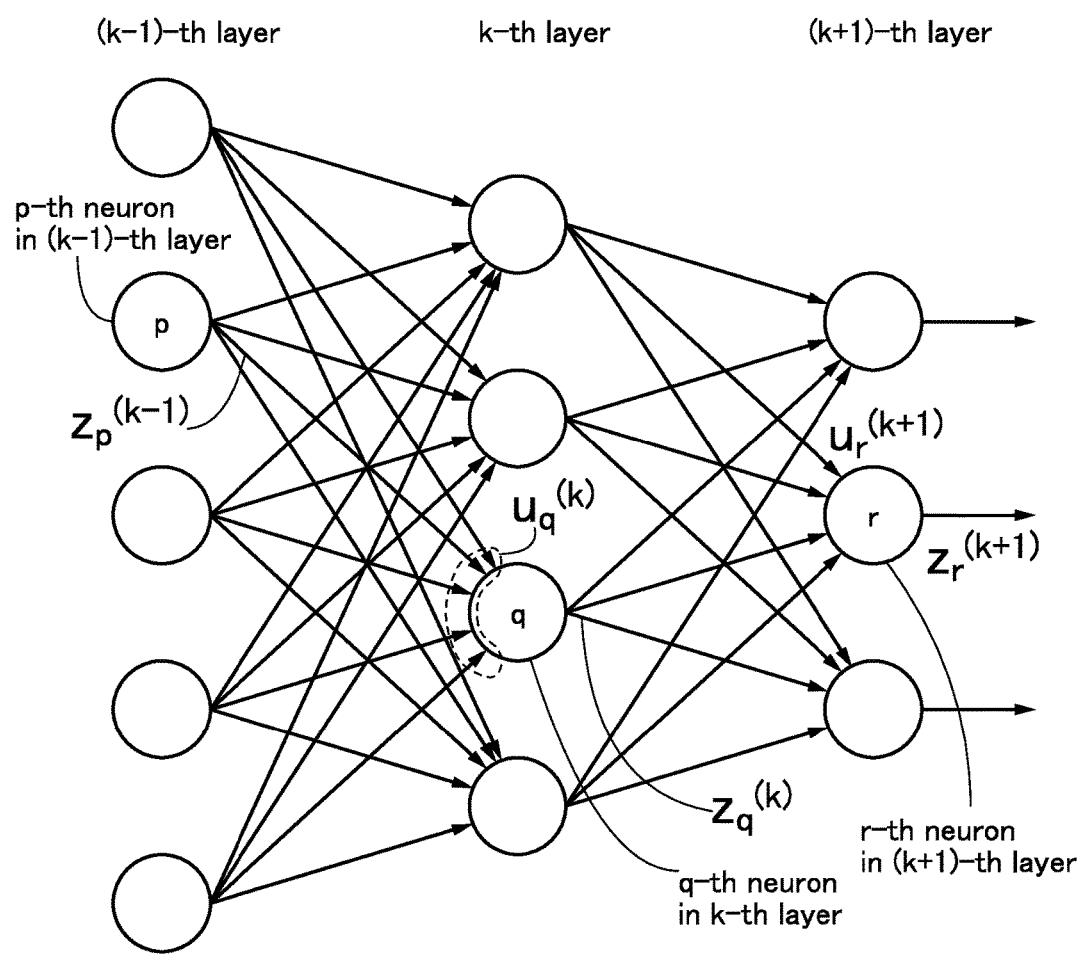
FIG. 3 illustrates an example of a hierarchical neural network.

FIG. 3 is a diagram showing an example of a hierarchical neural network. A (k−1)-th layer (here, k is an integer greater than or equal to 2) includes P neurons (here, P is an integer greater than or equal to 1). A k-th layer includes Q neurons (here, Q is an integer greater than or equal to 1). A (k+1)-th layer includes R neurons (here, R is an integer greater than or equal to 1).

The product of an output signal $z_p^{(k-1)}$ of the p-th neuron (here, p is an integer greater than or equal to 1 and less than or equal to P) in the (k−1)-th layer and a weight coefficient $w_{qp}^{(k)}$ is input to the q-th neuron (here, q is an integer greater than or equal to 1 and less than or equal to Q) in the k-th layer. The product of an output signal $z_q^{(k)}$ of the q-th neuron in the k-th layer and a weight coefficient $w_{rq}^{(k+1)}$ is input to the r-th neuron (here, r is an integer greater than or equal to 1 and less than or equal to R) in the (k+1)-th layer. The output signal of the r-th neuron in the (k+1)-th layer is $z_r^{(k+1)}$.

In this case, the summation $u_q^{(k)}$ of signals input to the q-th neuron in the k-th layer is expressed by the following formula.

[Formula 1]

$$u_q^{(k)} = \sum w_{qp}^{(k)} z_p^{(k-1)} \qquad (D1)$$

The output signal $z_q^{(k)}$ from the q-th neuron in the k-th layer is expressed by the following formula.

[Formula 2]

$$z_q^{(k)} = f(u_q^{(k)}) \qquad (D2)$$

Figure 6A:
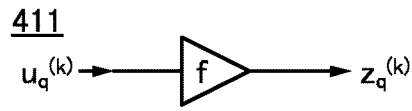
FIGS. 6A to 6D each illustrate a configuration example of a circuit.

A function $f(u_q^{(k)})$ is an activation function. A step function, a linear ramp function, a sigmoid function, or the like can be used as the function $f(u_q^{(k)})$. Product-sum operation of Formula (D1) can be performed with a product-sum operation circuit 700 to be described later. Formula (D2) can be calculated with a circuit 411 illustrated in FIG. 6A, for example.

Note that the activation function may be the same among all neurons or may be different among neurons. Furthermore, the activation function in one layer may be the same as or different from that in another layer.

Figure 4:
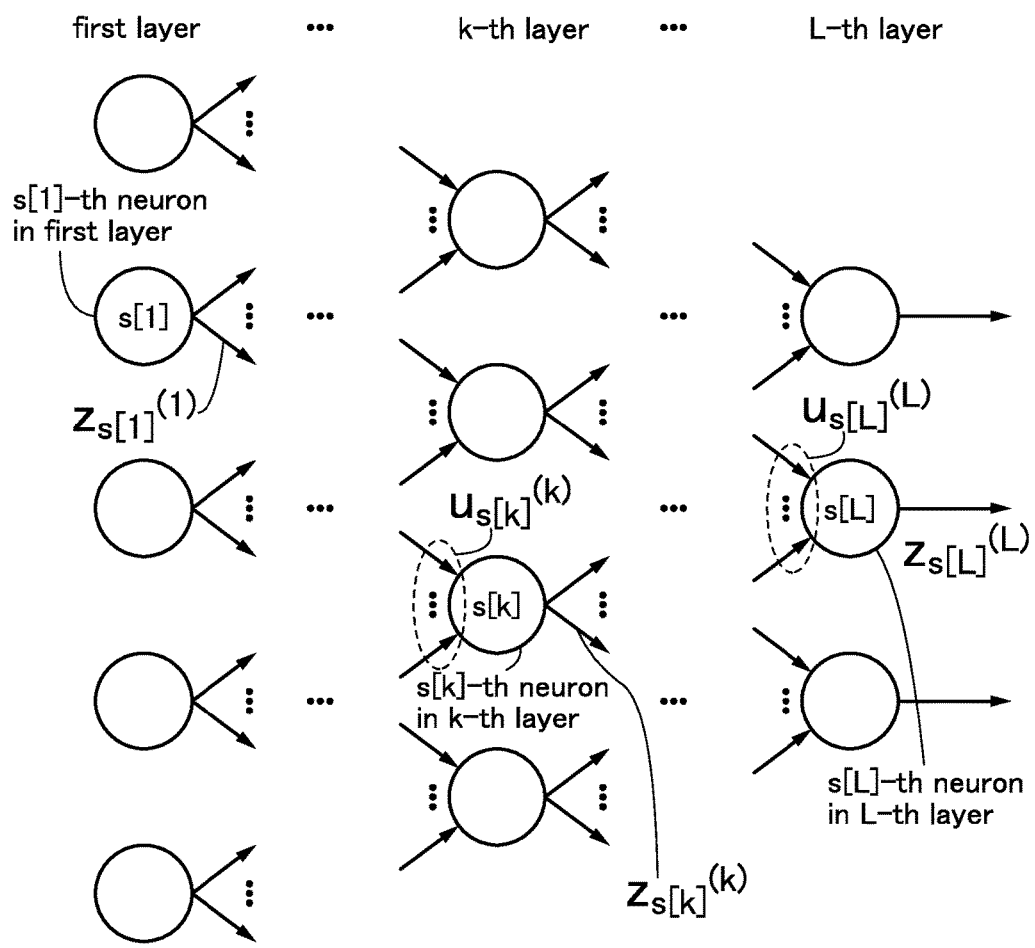
FIG. 4 illustrates an example of a hierarchical neural network.

Here, a hierarchical neural network including L layers (here, L is an integer greater than or equal to 3) in total shown in FIG. 4 will be described (that is, here, k is an integer greater than or equal to 2 and less than or equal to (L−1)). A first layer is an input layer of the hierarchical neural network, an L-th layer is an output layer of the hierarchical neural network, and second to (L−1)-th layers are hidden layers of the hierarchical neural network.

The first layer (input layer) includes P neurons, the k-th layer (hidden layer) includes Q[k] neurons (here, Q[k] is an integer greater than or equal to 1), and the L-th layer (output layer) includes R neurons.

An output signal of the s[1]-th neuron in the first layer (here, s[1] is an integer greater than or equal to 1 and less than or equal to P) is $z_{s[1]}^{(1)}$, an output signal of the s[k]-th neuron in the k-th layer (here, s[k] is an integer greater than or equal to 1 and less than or equal to Q[k]) is $z_{s[k]}^{(k)}$, and an output signal of the s[L]-th neuron in the L-th layer (here, s[L] is an integer greater than or equal to 1 and less than or equal to R) is $z_{s[L]}^{(L)}$.

The product $u_{s[k]}^{(k)}$ of an output signal $z_{s[k-1]}^{(k-1)}$ of the s[k−1]-th neuron in the (k−1)-th layer and a weight coefficient $w_{s[k]s[k-1]}^{(k)}$ (here, s[k−1] is an integer greater than or equal to 1 and less than or equal to Q[k−1]) is input to the s[k]-th neuron in the k-th layer. The product $u_{s[L]}^{(L)}$ of an output signal $z_{s[L-1]}^{(L-1)}$ of the s[L−1]-th neuron in the (L−1)-th layer and a weight coefficient $w_{s[L]s[L-1]}^{(L)}$ (here, s[L−1] is an integer greater than or equal to 1 and less than or equal to Q[L−1]) is input to the s[L]-th neuron in the L-th layer.

Next, supervised learning will be described. Supervised learning refers to operation of updating all weight coefficients of a hierarchical neural network on the basis of an output result and a desired result (also referred to as teacher data or a teacher signal in some cases) when the output result and the desired result differ from each other, in functions of the hierarchical neural network.

Figure 5:
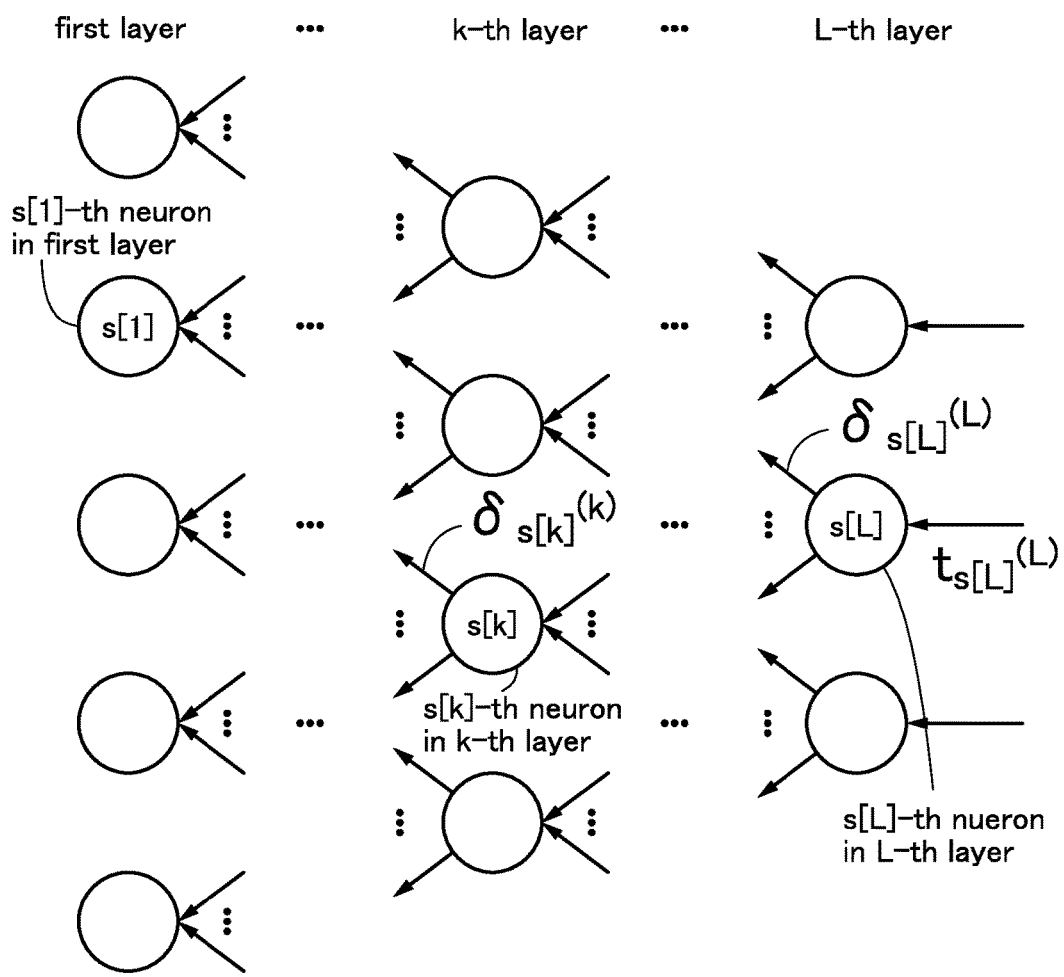
FIG. 5 illustrates an example of a hierarchical neural network.

A learning method using backpropagation will be described as a specific example of supervised learning. FIG. 5 is a diagram illustrating a learning method using backpropagation. Backpropagation is a method for changing a weight coefficient so that an error between an output of a hierarchical neural network and teacher data becomes small.

For example, assume that input data is input to the s[1]-th neuron in the first layer and output data $z_{s[L]}^{(L)}$ is output from the s[L]-th neuron in the L-th layer. Here, error energy E can be expressed using output data $z_{s[L]}^{(L)}$ and a teacher signal $t_{s[L]}^{(L)}$, when a teacher signal for the output data $z_{s[L]}^{(L)}$ is $t_{s[L]}^{(L)}$.

The update amount of a weight coefficient $w_{s[k]s[k-1]}^{(k)}$ of the s[k]-th neuron in the k-th layer with respect to the error energy E is set to $\partial E/\partial w_{s[k]s[k-1]}^{(k)}$, whereby the weight coefficient can be updated. Here, when an error $\delta_{s[k]}^{(k)}$ of the output value $z_{s[k]}^{(k)}$ of the s[k]-th neuron in the k-th layer is defined as $\partial E/\partial u_{s[k]}^{(k)}$, $\delta_{s[k]}^{(k)}$ and $\partial E/\partial w_{s[k]s[k-1]}^{(k)}$ can be expressed by the following respective formulae.

[Formula 3]

$$\delta_{s[k]}^{(k)} = \sum_{s[k+1]} \delta_{s[k+1]}^{(k+1)} \cdot w_{s[k+1]s[k]}^{(k+1)} \cdot f'(u_{s[k]}^{(k)}) \quad (D3)$$

[Formula 4]

$$\frac{\partial E}{\partial w_{s[k]s[k-1]}^{(k)}} = \delta_{s[k]}^{(k)} \cdot z_{s[k-1]}^{(k-1)} \quad (D4)$$

Figure 6B:
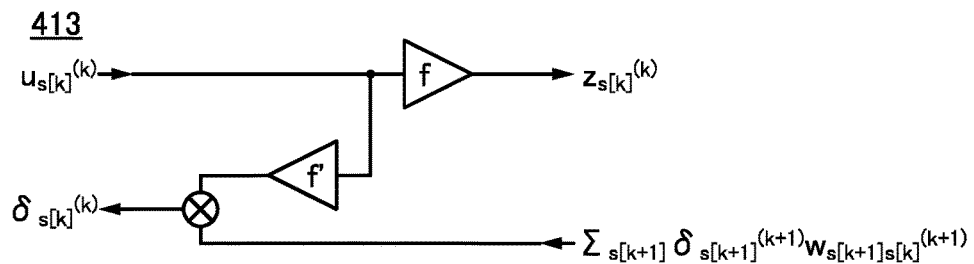
Figure 6C:
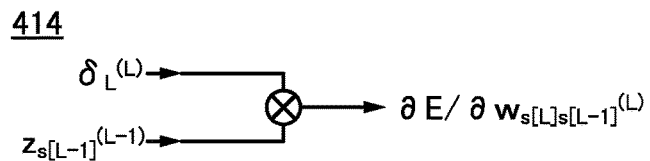

A function $f'(u_{s[k]}^{(k)})$ is the derivative of an activation function. Formula (D3) can be calculated with a circuit 413 illustrated in FIG. 6B, for example. Formula (D4) can be calculated with a circuit 414 illustrated in FIG. 6C, for example. The derivative of an output function can be obtained by connecting an arithmetic circuit that can execute a desired derivative to an output terminal of an operational amplifier, for example.

For example, $\Sigma \delta_{s[k+1]}^{(k+1)} \cdot w_{s[k+1]s[k]}^{(k+1)}$ in Formula (D3) can be calculated with the product-sum operation circuit 700 to be described later.

Here, when the (k+1)-th layer is an output layer, or the L-th layer, $\delta_{s[L]}^{(L)}$ and $\partial E/\partial w_{s[L]s[L-1]}^{(L)}$ can be expressed by the following respective formulae.

[Formula 5]

$$\delta_{s[L]}^{(L)} = (z_{s[L]}^{(L)} \cdot t_{s[L]}) \cdot f'(u_{s[L]}^{(L)}) \quad (D5)$$

[Formula 6]

$$\frac{\partial E}{\partial w_{s[L]s[L-1]}^{(L)}} = \delta_{s[L]}^{(L)} \cdot z_{s[L-1]}^{(L-1)} \quad (D6)$$

Figure 6D:
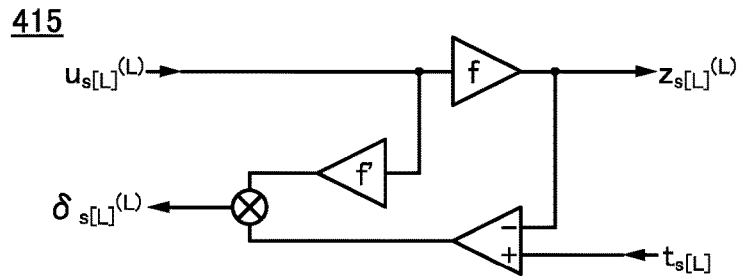

Furthermore, Formula (D5) can be calculated with a circuit 415 illustrated in FIG. 6D. Formula (D6) can be calculated with the circuit 414 illustrated in FIG. 6C.

That is to say, the errors $\delta_{s[k]}^{(k)}$ and $\delta_{s[L]}^{(L)}$ of all neuron circuits can be calculated by Formulae (D1) to (D6). Note that the update amounts of weight coefficients are set on the basis of the errors $\delta_{s[k]}^{(k)}$ and $\delta_{s[L]}^{(L)}$, predetermined parameters, and the like.

As described above, by using the circuits illustrated in FIGS. 6A to 6D and the product-sum operation circuit 700, calculation of the hierarchical neural network using supervised learning can be performed.

Configuration Example 1 of Hierarchical Neural Network

Next, an example of a product-sum operation circuit having a hierarchical neural network will be described.

Figure 7A:
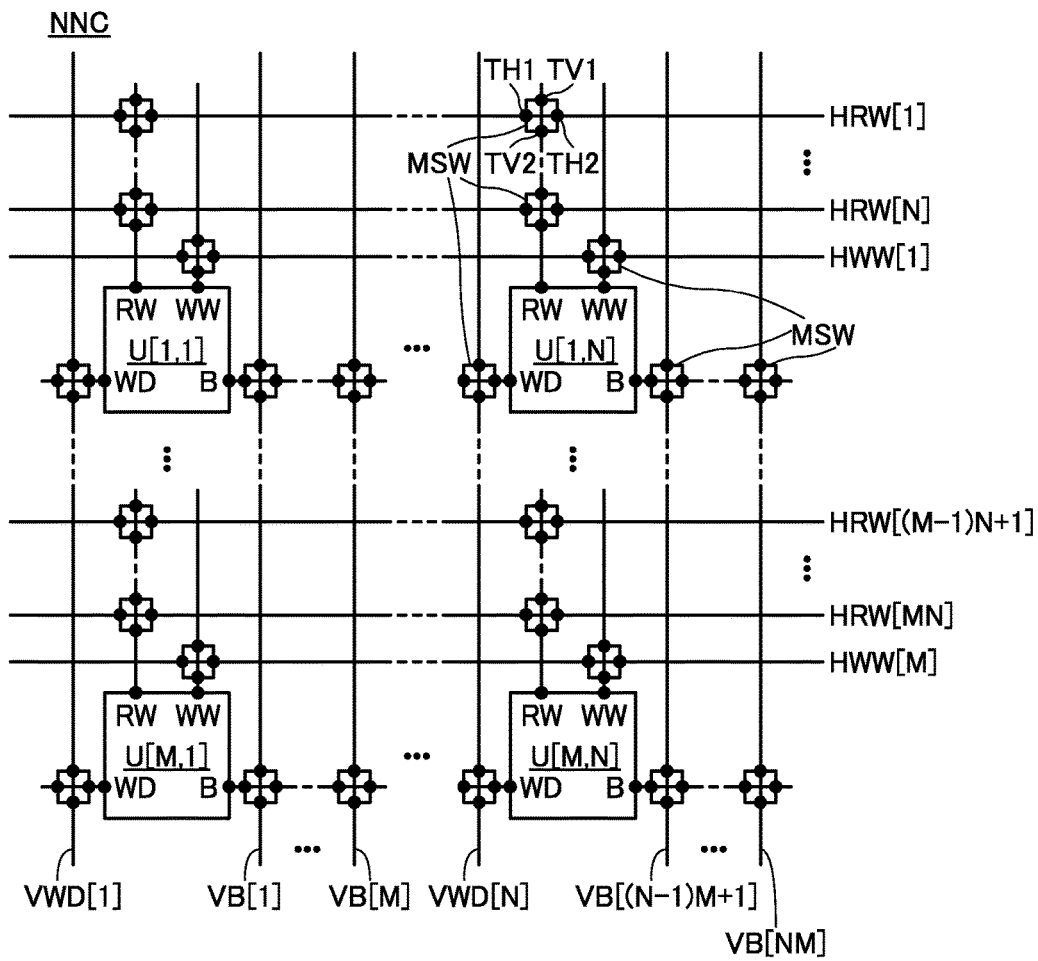
FIGS. 7A and 7B are block diagrams illustrating an example of a product-sum operation circuit.

A circuit NNC illustrated in FIG. 7A includes M (column direction)×N (row direction) product-sum operation circuits arranged in a matrix (here, M and N are each an integer greater than or equal to 1). Note that the product-sum operation circuit in the g-th row and the h-th column (here, g is an integer greater than or equal to 1 and less than or equal to M, and h is an integer greater than or equal to 1 and less than or equal to N) is denoted by U[g,h]. Note that product-sum operation circuits U[1,1] to U[M,N] each include m (column direction)×n (row direction) analog memory cells that are arranged in a matrix (here, m and n are each an integer greater than or equal to 1).

The product-sum operation circuit U[g,h] can be a product-sum operation circuit 700 to be described later. The product-sum operation circuit U[g,h] does not necessarily include an offset circuit 710 to be described later and can be electrically connected to the offset circuit 710 outside the product-sum operation circuit U[g,h].

Each of the product-sum operation circuits U[1,1] to U[M,N] includes a terminal RW, a terminal WW, a terminal WD, and a terminal B. The terminals RW are m terminals connected to wirings RW[1] to RW[m] in a memory cell array 720 in FIG. 11 to be described later. Similarly, the terminals WW are m terminals connected to wirings WW[1] to WW[m] in the memory cell array 720, the terminals WD are n terminals connected to wirings WD[1] to WD[n−1] and a wiring WDref, and the terminals B are n terminals connected to wirings B[1] to B[n−1] and a wiring Bref.

In addition, the circuit NNC includes wiring groups HRW[1] to HRW[MN], wiring groups HWW[1] to HWW[M], wiring groups VB[1] to VB[NM], and wiring groups VWD[1] to VWD[N]. Note that the wiring groups HRW[1] to HRW[MN] each include m wirings, the wiring groups HWW[1] to HWW[M] each include m wirings, the wiring groups VB[1] to VB[NM] each include n wirings, and the wiring groups VWD[1] to VWD[N] each include n wirings.

The circuit NNC includes a plurality of switch circuits MSW. The switch circuit MSW includes a terminal TV1, a terminal TV2, a terminal TH1, and a terminal TH2. Note that the terminal TV1 is electrically connected to the terminal TV2, and the terminal TH1 is electrically connected to the terminal TH2.

The switch circuit MSW has a function of electrically connecting or disconnecting the terminal TV1 and the terminal TV2 and electrically connecting or disconnecting the terminal TH1 and the terminal TH2. That is, the switch circuit MSW has a function of electrically connecting or disconnecting the terminals of the product-sum operation circuit U[g,h] to/from the wirings. Furthermore, the switch circuit MSW has a function of holding data (in this specification, also referred to as configuration data in some cases) for electrically connecting or disconnecting the terminal TV1 and the terminal TV2 and electrically connecting or disconnecting the terminal TH1 and the terminal TH2. Here, it is preferable that the switch circuit MSW include a pass transistor for electrically connecting or disconnecting the terminal TV1 and the terminal TV2 and electrically connecting or disconnecting the terminal TH1 and the terminal TH2, and the on/off state of the pass transistor be controlled by the configuration data.

Note that in FIG. 7A, only the following components are shown: the product-sum operation circuit U[1,1]; the product-sum operation circuit U[M,1]; the product-sum operation circuit U[1,N]; the product-sum operation circuit U[M,N]; the wiring group HRW[1]; the wiring group HRW[N]; a wiring group HRW[(M−1)N+1]; the wiring group HRW[MN]; the wiring group HWW[1]; the wiring group HWW[M]; the wiring group VB[1]; the wiring group VB[M]; a wiring group VB[(N−1)M+1]; the wiring group VB[NM]; the wiring group VWD[1]; the wiring group VWD[N]; the terminal RW; the terminal WW; the terminal WD; the terminal B; the switch circuit MSW; the terminal TH1; the terminal TH2; the terminal TV1; and the terminal TV2. Other product-sum operation circuits are not shown.

Note that the configuration of the circuit NNC is not limited to that illustrated in FIG. 7A. Depending on the circumstances or conditions, a circuit, a wiring, an element, or the like may be removed from the configuration of the circuit NNC as appropriate. Alternatively, another circuit, another wiring, another element, or the like may be added to the configuration of the circuit NNC as appropriate.

Figure 7B:
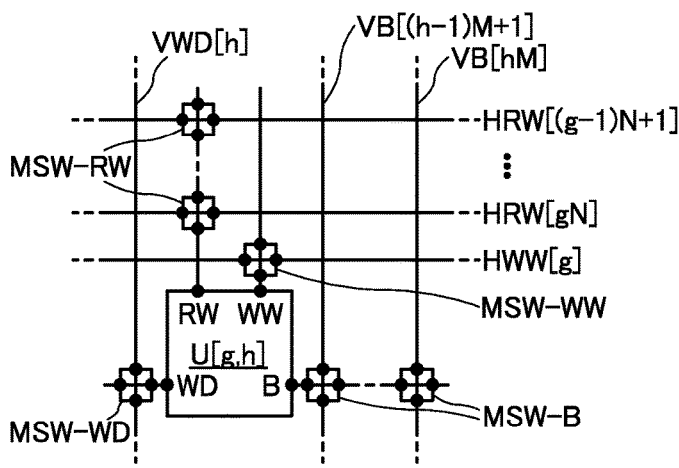

Next, the connection structure of the product-sum operation circuits U[1,1] to U[M,N], the above-described wirings, and the plurality of switch circuits MSW will be described. Note that for simplicity, the description will be made with a focus on the product-sum operation circuit U[g,h] illustrated in FIG. 7B. Each of the switch circuits MSW is denoted by a reference characters of a wiring connected to the switch circuit MSW, i.e., a switch circuit MSW-RW, a switch circuit MSW-WW, a switch circuit MSW-B, and a switch circuit MSW-WD.

The terminal RW of the product-sum operation circuit U[g,h] is electrically connected to N switch circuits MSW-RW. The N switch circuits MSW-RW are electrically connected to the respective wiring groups HRW[gN] to HRW[(g−1)N+1].

The terminal WW of the product-sum operation circuit U[g,h] is electrically connected to the switch circuit MSW-WW. The switch circuit MSW-WW is electrically connected to the wiring group HWW[g].

The terminal B of the product-sum operation circuit U[g,h] is electrically connected to M switch circuits MSW-B. The M switch circuits MSW-B are electrically connected to the respective wiring groups VB[(h−1)M+1] to VB[hM].

The terminal WD of the product-sum operation circuit U[g,h] is electrically connected to the switch circuit MSW-WD. The switch circuit MSW-WD is electrically connected to the wiring group VWD[h].

Configuration Example 1 of Switch Circuit MSW

Figure 8:
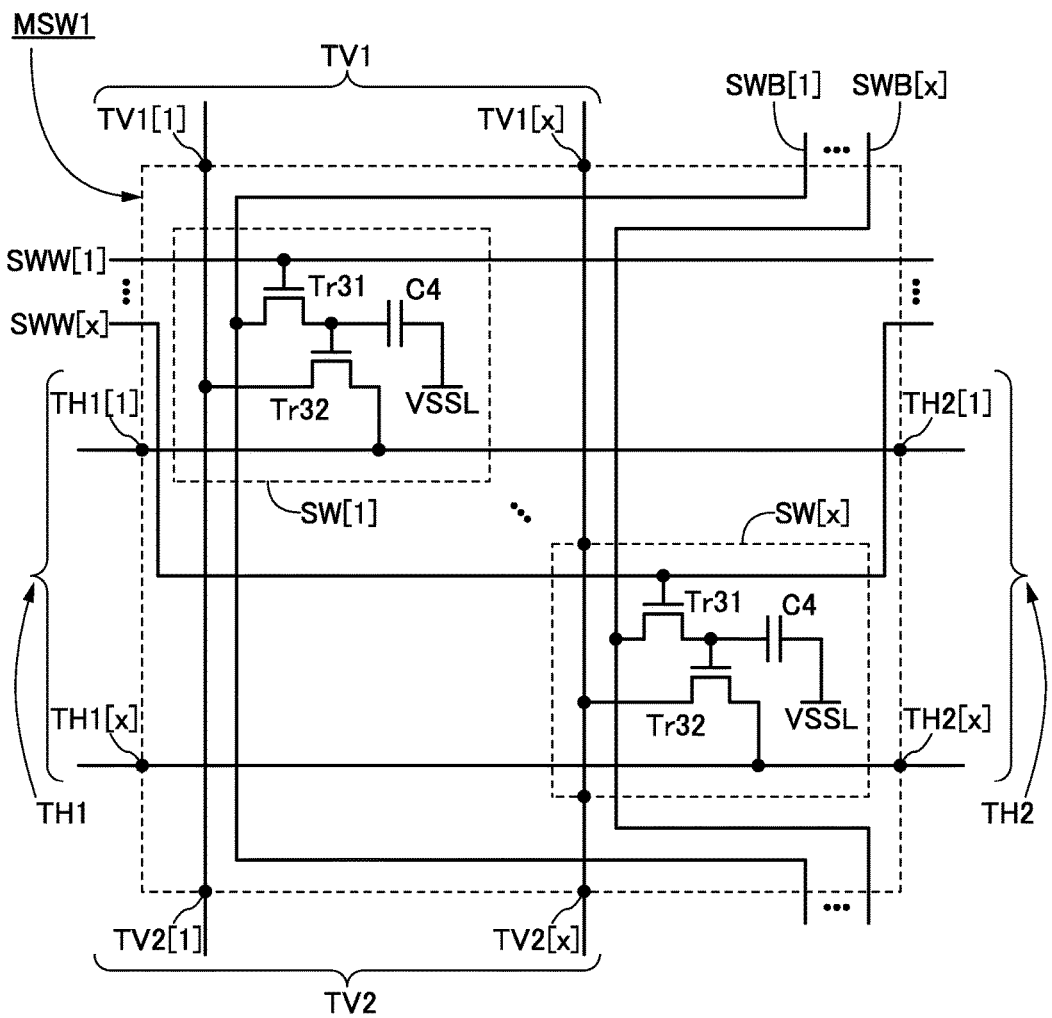
FIG. 8 is a circuit diagram illustrating a configuration example of a switch circuit.

FIG. 8 illustrates an example of the configuration of the switch circuit MSW. A switch circuit MSW1 illustrated in FIG. 8 electrically connects or disconnects x wirings to/from other x wirings. Note that x is an integer greater than or equal to 1 and is variable depending on the number of included wirings. For example, in the case where the switch circuit MSW1 is used for the switch circuit MSW-RW or the switch circuit MSW-WW, x may be n. Furthermore, for example, in the case where the switch circuit MSW1 is used for the switch circuit MSW-B or the switch circuit MSW-WD, x may be m.

The switch circuit MSW1 includes the terminal TV1, the terminal TV2, the terminal TH1, and the terminal TH2. The terminal TV1 includes terminals TV1[1] to TV1[x], the terminal TV2 includes terminals TV2[1] to TV2[x], the terminal TH1 includes terminals TH1[1] to TH1[x], and the terminal TH2 includes terminals TH2[1] to TH2[x].

A terminal TV1[$x_0$] (here, $x_0$ is an integer greater than or equal to 1 and less than or equal to x) is electrically connected to a terminal TV2[$x_0$], and a terminal TH1[$x_0$] is electrically connected to a terminal TH2[$x_0$]. Note that in FIG. 8, the terminals TV1 [$x_0$], TV2[$x_0$], TH1 [$x_0$], and TH2[$x_0$] are not illustrated.

The switch circuit MSW1 includes circuits SW[1] to SW[x]. Each of the circuits SW[1] to SW[x] includes a transistor Tr31, a transistor Tr32, and a capacitor C4.

Here, for the internal configuration of the circuits SW[1] to SW[x], the description will be made with a focus on the circuit SW[$x_0$]. A first terminal of the transistor Tr31 is electrically connected to a wiring SWB[$x_0$], a second terminal of the transistor Tr31 is electrically connected to a first terminal of the capacitor C4, and a gate of the transistor Tr31 is electrically connected to a wiring SWW[$x_0$]. A first terminal of the transistor Tr32 is electrically connected to the terminals TV1[$x_0$] and TV2[$x_0$], a second terminal of the transistor Tr32 is electrically connected to the terminals TH1[$x_0$] and TH2[$x_0$], and a gate of the transistor Tr32 is electrically connected to the first terminal of the capacitor C4. A second terminal of the capacitor C4 is electrically connected to a wiring VSSL. Note that a portion where the second terminal of the transistor Tr31, the first terminal of the capacitor C4, and the gate of the transistor Tr32 are connected is referred to as a holding node in the circuit SW[$x_0$].

The wiring SWW[$x_0$] supplies a selection signal to the circuit SW[$x_0$], and the wiring SWB[$x_0$] supplies configuration data to the circuit SW[$x_0$]. When a high-level potential is supplied from the wiring SWW[$x_0$], the high-level potential is supplied to the gate of the transistor Tr31 in the circuit SW[$x_0$]; accordingly, the transistor Tr31 is turned on. At this time, a potential corresponding to configuration data is supplied from the wiring SWB[$x_0$], and thus the potential is written in the holding node. Then, the transistor Tr31 is turned off by supplying a low-level potential from the wiring SWW[$x_0$]; accordingly, the potential corresponding to configuration data can be held. Since the potential corresponding to configuration data is supplied to the gate of the transistor Tr32, whether the transistor Tr32 is on or off is determined by the configuration data.

Note that wirings SWW[1] to SWW[x] are illustrated in FIG. 8; however, one embodiment of the present invention is not limited thereto. For example, when one wiring is provided to serve as the wirings SWW[1] to SWW[x], the circuits SW[1] to SW[x] can be selected all together. Accordingly, configuration data can be written to the circuits SW[1] to SW[x] at the same time.

Furthermore, wirings SWB[1] to SWB[x] are illustrated in FIG. 8; however, one embodiment of the present invention is not limited thereto. For example, when one wiring is provided to serve as the wirings SWB[1] to SWB[x], the area of the switch circuit MSW1 can be reduced. In this case, the circuits SW[1] to SW[x] are sequentially selected by the wirings SWW[1] to SWW[x], and predetermined configuration data is written to the selected circuit.

Note that in the switch circuit MSW1 in FIG. 8, only the following components are shown: the circuit SW[1]; the circuit SW[x]; the wiring SWW[1]; the wiring SWW[x]; the wiring SWB[1]; the wiring SWB[x]; the wiring VSSL; the terminal TV1; the terminal TV1[1]; the terminal TV1[x]; the terminal TV2; the terminal TV2[1]; the terminal TV2[x]; the terminal TH1; the terminal TH1[1]; the terminal TH1[x]; the terminal TH2; the terminal TH2[1]; the terminal TH2[x]; the transistor Tr31; the transistor Tr32; and the capacitor C4. Other wirings, circuits, and elements and reference numerals thereof are not shown.

Configuration Example 2 of Switch Circuit MSW

Figure 9:
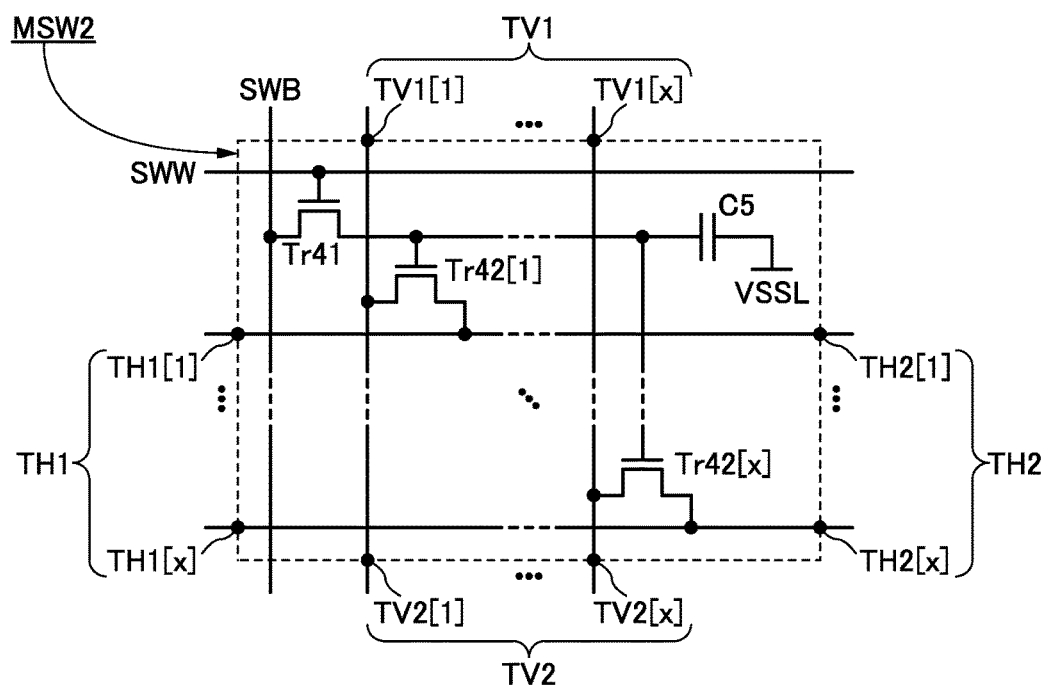
FIG. 9 is a circuit diagram illustrating a configuration example of a switch circuit.

FIG. 9 illustrates another example of the configuration of the switch circuit MSW, which is different from that in FIG. 8. Like the switch circuit MSW1, a switch circuit MSW2 illustrated in FIG. 9 electrically connects or disconnects x wirings to/from other x wirings. Note that x is variable depending on the number of included wirings.

The switch circuit MSW2 includes the terminal TV1, the terminal TV2, the terminal TH1, and the terminal TH2. The terminal TV1 includes terminals TV1[1] to TV1[x], the terminal TV2 includes terminals TV2[1] to TV2[x], the terminal TH1 includes terminals TH1[1] to TH1[x], and the terminal TH2 includes terminals TH2[1] to TH2[x].

The terminal TV1[$x_0$] is electrically connected to the terminal TV2[$x_0$], and the terminal TH1 [$x_0$] is electrically connected to the terminal TH2[$x_0$]. Note that in FIG. 9, the terminals TV1 [$x_0$], TV2[$x_0$], TH1 [$x_0$], and TH2[$x_0$] are not illustrated.

The switch circuit MSW2 includes a transistor Tr41, transistors Tr42[1] to Tr42[x], and a capacitor C5.

Here, the internal configuration of the switch circuit MSW2 will be described. A first terminal of the transistor Tr41 is electrically connected to a wiring SWB, a second terminal of the transistor Tr41 is electrically connected to gates of the transistors Tr42[1] to Tr42[x], and a gate of the transistor Tr41 is electrically connected to a wiring SWW. A first terminal of the transistor Tr42[$x_0$] is electrically connected to the terminals TV1[$x_0$] and TV2[$x_0$], and a second terminal of the transistor Tr42[$x_0$] is electrically connected to the terminals TH1 [$x_0$] and TH2[$x_0$]. A first terminal of the capacitor C5 is electrically connected to the second terminal of the transistor Tr41 and the wiring VSSL. Note that a portion where the second terminal of the transistor Tr41, the first terminal of the capacitor C4, and the gates of the transistors Tr42[1] to Tr42[x] are connected is referred to as a holding node in the switch circuit MSW2.

The wiring SWW supplies a potential to the gate of the transistor Tr41 in the switch circuit MSW2, and the wiring SWB supplies configuration data to the switch circuit MSW2. When the high-level potential is supplied from the wiring SWW, the high-level potential is supplied to the gate of the transistor Tr41; accordingly, the transistor Tr41 is turned on. At this time, a potential corresponding to configuration data is supplied from the wiring SWB, and thus the potential is written in the holding node. Then, the low-level potential is supplied to the wiring SWW so that the transistor Tr41 is turned off; accordingly, the potential corresponding to configuration data can be held. Since the potential corresponding to configuration data is supplied to the gates of the transistors Tr42[1] to Tr42[x], whether the transistors Tr42[1] to Tr42[x] are on or off is determined all at once by the configuration data.

Note that in the switch circuit MSW2 in FIG. 9, only the following components are shown: the wiring SWW; the wiring SWB; the wiring VSSL; the terminal TV1; the terminal TV1[1]; the terminal TV1[x]; the terminal TV2; the terminal TV2[1]; the terminal TV2[x]; the terminal TH1; the terminal TH1[1]; the terminal TH1[x]; the terminal TH2; the terminal TH2[1]; the terminal TH2[x]; the transistor Tr41; the transistor Tr42[1]; the transistor Tr42[x]; and the capacitor C5. Other wirings, circuits, and elements and the reference numerals thereof are not shown.

With use of the OS transistors as the transistors Tr31, Tr32, Tr41, and Tr42[1] to Tr42[x], the leakage current of each of the transistors Tr31, Tr32, Tr41, and Tr42[1] to Tr42[x] can be suppressed, which enables a product-sum operation circuit with high calculation accuracy to be fabricated in some cases. Furthermore, with use of the OS transistor as the transistor Tr31 or Tr41, the amount of leakage current from a holding node to any of the wirings SWB[1] to SWB[x] when the transistor Tr31 or Tr41 is off can be extremely small. In other words, the frequency of refresh operation at the holding node can be reduced; thus, power consumption of a semiconductor device including the product-sum operation circuit can be reduced. In particular, a CAC-OS to be described in Embodiment 9 is preferably used as an oxide semiconductor in the OS transistor.

Although an n-channel transistor is illustrated as the transistor Tr32 in FIG. 8, the transistor Tr32 may be a p-channel transistor. Similarly, although n-channel transistors are illustrated as the transistors Tr42[1] to Tr42[x] in FIG. 9, the transistors Tr42[1] to Tr42[x] may be p-channel transistors.

Configuration Example 2 of Hierarchical Neural Network

Figure 10:
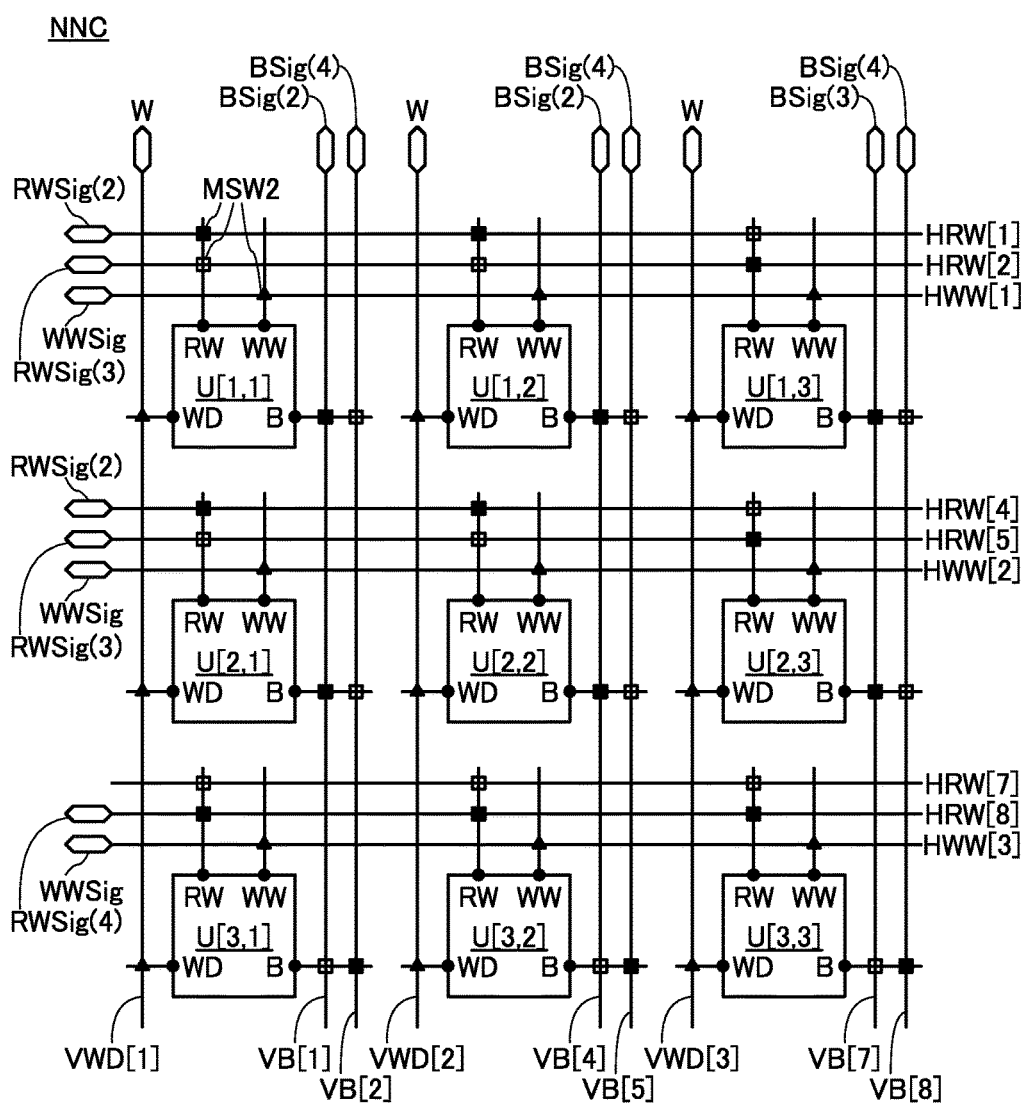
FIG. 10 is a block diagram illustrating an example of a product-sum operation circuit.

FIG. 10 illustrates a specific example of the circuit NNC illustrated in FIG. 7A.

The circuit NNC in FIG. 10 includes the product-sum operation circuits U[1,1], U[1,2], U[1,3], U[2,1], U[2,2], U[2,3], U[3,1], U[3,2], and U[3,3]. That is, the circuit NNC in FIG. 10 corresponds to the circuit NNC in FIG. 7A in which M is three and N is three.

As for the wirings of the circuit NNC in FIG. 10, the wiring groups HRW[3], HRW[6], HRW[9], VB[3], VB[6], and VB[9] are removed from the configuration of the circuit NNC in FIG. 7A in which M is three and N is three. In other words, the circuit NNC in FIG. 10 includes the wiring groups HRW[1], HRW[2], HRW[4], HRW[5], HRW[7], HRW[8], HWW[1], HWW[2], HWW[3], VB[1], VB[2], VB[4], VB[5], VB[7], VB[8], VWD[1], VWD[2], and VWD[3].

The memory cell array 720 in each of the product-sum operation circuits U[1,1] to U[3,3] includes $n^2$ memory cells AM. In the memory cell array 720 in each of the product-sum operation circuits U[1,1] to U[3,3], n (column direction)×n (row direction) memory cells AM are arranged in a matrix.

Each of the wiring groups HRW[1], HRW[2], HRW[4], HRW[5], HRW[7], HRW[8], HWW[1] to HWW[3], VB[1], VB[2], VB[4], VB[5], VB[7], VB[8], and VWD[1] to VWD[3] includes n wirings. Furthermore, each of the wiring groups HRW[1], HRW[2], HRW[4], HRW[5], HRW[7], HRW[8], and HWW[1] to HWW[3] is electrically connected to the terminals RW or the terminals WW of the product-sum operation circuits via the switch circuits MSW2. Similarly, each of the wiring groups VB[1], VB[2], VB[4], VB[5], VB[7], VB[8], and VWD[1] to VWD[3] is electrically connected to the terminals WD or the terminals B of the product-sum operation circuits via the switch circuits MSW2.

The details of the switch circuit MSW2 are the same as those of the hierarchical neural network of Configuration example 1, which is described above. Thus, when the high-level potential is supplied to the holding node of the switch circuit MSW2, wirings and terminals that are connected via the switch circuit MSW2 are electrically continuous. When the low-level potential is supplied to the holding node of the switch circuit MSW2, the wirings and the terminals that are connected via the switch circuit MSW2 are electrically noncontinuous. In FIG. 10, the switch circuit MSW2 that is in a conducting state is denoted by a black square, the switch circuit MSW2 that is in a non-conducting state is denoted by a white square, and the switch circuit MSW2 whose conducting and non-conducting states are switched during the operation of the circuit NNC is denoted by a black regular triangle. Note that instead of the switch circuit MSW2, the switch circuit MSW1 may be used.

In the circuit NNC in FIG. 10, an input layer (first layer) includes 2n neurons, a first hidden layer (second layer) includes 2n neurons, a second hidden layer (third layer) includes n neurons, and an output layer (fourth layer) includes 3n neurons.

Weight coefficients W(2) for inputs to neurons in the first hidden layer are stored in the memory cells AM of the product-sum operation circuits U[1,1], U[1,2], U[2,1], and U[2,2]. Weight coefficients W(3) for inputs to neurons in the second hidden layer are stored in the memory cells AM of the product-sum operation circuits U[1,3] and U[2,3]. Furthermore, weight coefficients W(4) for inputs to neurons in the output layer are stored in the memory cells AM of the product-sum operation circuits U[3,1], U[3,2], and U[3,3]. Note that each of the wiring groups HWW[1] to HWW[3] corresponds to wirings WW (3n signal lines), and each of the wiring groups VWD[1] to VWD[3] corresponds to wirings WD (3n signal lines). Selection signals WWSig are sequentially transmitted to the wirings WW, and data corresponding to the selection signals WWSig (denoted by W in FIG. 10) are supplied to the wirings WD, so that weight coefficients can be stored in the memory cells AM in the product-sum operation circuits.

Input of a signal to the first hidden layer and output of a signal from the first hidden layer will be described. The outputs of the 2n neurons of the input layer are stored as 2n signals RWSig(2) in the product-sum operation circuits U[1,1], U[1,2], U[2,1], and U[2,2] via 2n signal lines of the wiring groups HRW[1] and HRW[4]. The outputs of the product-sum operation circuits U[1,1], U[1,2], U[2,1], and U[2,2] are output as 2n signals BSig(2) via 2n signal lines of the wiring groups VB[1] and VB[4]. That is, each of the 2n signals BSig(2) has a value of the sum of products of signals input to the input layer and the weight coefficient W(2), which corresponds to the sum of inputs to the first hidden layer (also referred to as a net value). The 2n signals BSig(2) are output from the wiring groups VB[1] and VB[4], and then an activation function is obtained from the value of the sum of products, so that neuron signals output from the first hidden layer can be generated.

Inputs of signals to the second hidden layer and outputs of signals from the second hidden layer will be described. The outputs of the 2n neurons of the first hidden layer are stored as 2n signals RWSig(3) in the product-sum operation circuits U[1,3] and U[2,3] via 2n signal lines of the wiring groups HRW[2] and HRW[5]. The outputs of the product-sum operation circuits U[1,3] and U[2,3] are output as n signals BSig(3) via n signal lines of the wiring group VB[7]. That is, each of the n signals BSig(3) has a value of the sum of products of signals input to the input layer and the weight coefficient W(3), which corresponds to the sum of inputs to the second hidden layer. The n signals BSig(3) are output from the wiring group VB[7], and then an activation function is obtained from the value of the sum of products, so that neuron signals output from the second hidden layer can be generated.

Inputs of signals to the output layer and outputs of signals from the output layer will be described. The outputs of the n neurons of the second hidden layer are stored as n signals RWSig(4) in the product-sum operation circuits U[3,1], U[3,2], and U[3,3] via n signal lines of the wiring group HRW[8]. The outputs of the product-sum operation circuits U[3,1], U[3,2], and U[3,3] are output as 3n signals BSig(4) via 3n signal lines of the wiring groups VB[2], VB[5], and VB[8]. That is, each of the 3n signals BSig(4) has a value of the sum of products of signals input to the input layer and the weight coefficient W(4), which corresponds to the sum of inputs to the output layer. The 3n signals BSig(4) are output from the wiring groups VB[2], VB[5], and VB[8], and then an activation function is obtained from the value of the sum of products, so that neuron signals output from the output layer can be generated.

As described above, the switches that connect or disconnect the plurality of wirings to/from the plurality of product-sum operation circuits are provided between the wirings and the product-sum operation circuits, so that the connection of the circuits of the hierarchical neural network can be freely changed. Accordingly, a semiconductor device that can perform product-sum operation at high speed, with a small circuit size, and with low power consumption can be fabricated.

Configuration Example of Product-Sum Operation Circuit

Next, a configuration example of a product-sum operation circuit for constructing the above-described hierarchical neural network will be described.

Figure 11:
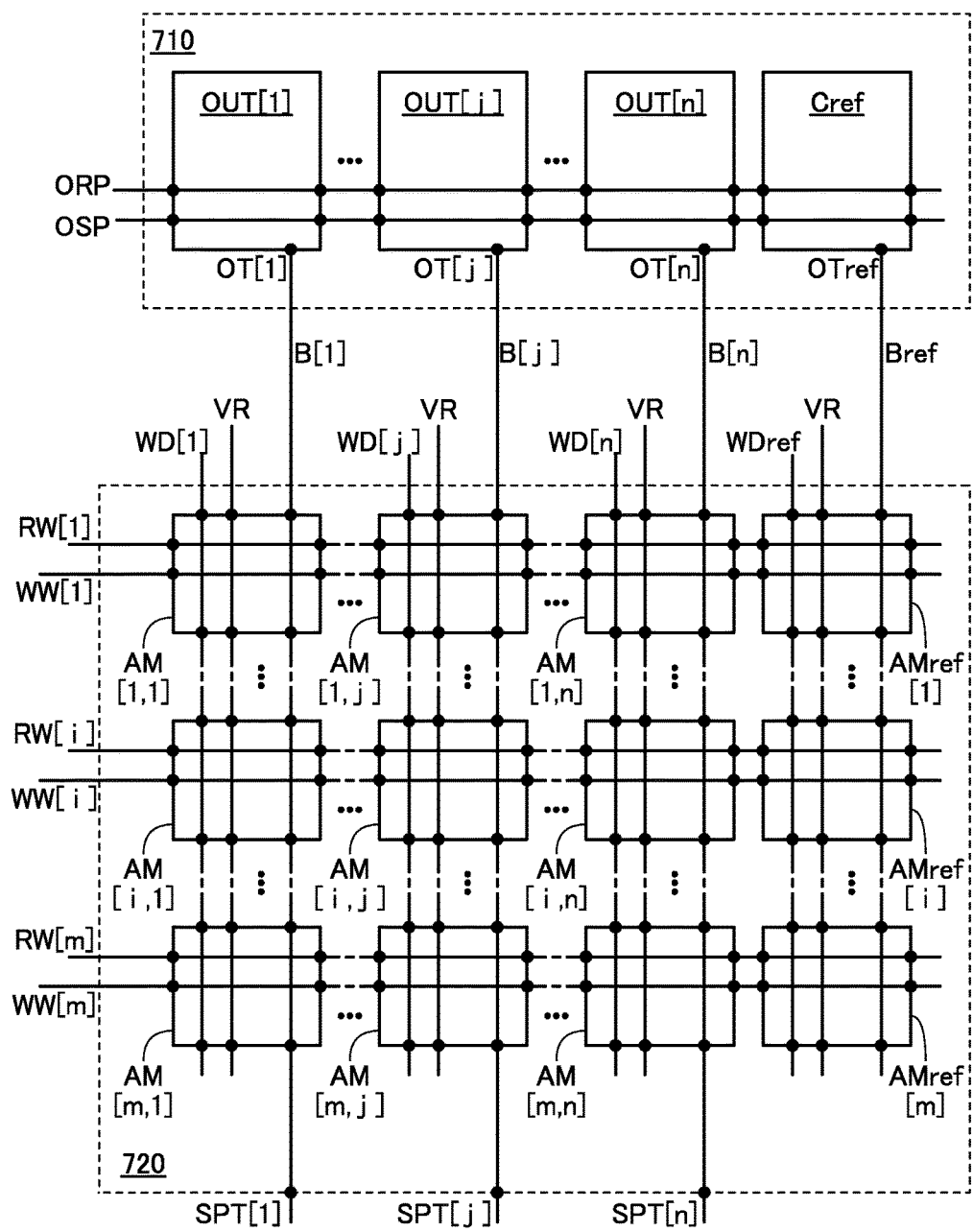
FIG. 11 is a block diagram illustrating an example of a product-sum operation circuit.

FIG. 11 shows an example of a circuit capable of carrying out product-sum operation. FIG. 11 is a block diagram of a product-sum operation circuit. The product-sum operation circuit 700 includes the offset circuit 710 and the memory cell array 720.

The offset circuit 710 includes column output circuits OUT[1] to OUT[n] (here, n is an integer greater than or equal to 1) and a reference column output circuit Cref.

In the memory cell array 720, m (here, m is an integer greater than or equal to 1) memory cells AM are arranged in the column direction and n memory cells AM are arranged in the row direction; that is, m×n memory cells AM are provided. In addition, m memory cells AMref are arranged in the column direction. The total number of the memory cells AM and the memory cells AMref arranged in a matrix in the memory cell array 720 is m×(n+1). In particular, in the memory cell array 720 in FIG. 11, the memory cell AM positioned in an i-th row and a j-th column is denoted by a memory cell AM[i,j] (here, i is an integer greater than or equal to 1 and less than or equal to m, and j is an integer greater than or equal to 1 and less than or equal to n), and the memory cell AMref positioned in the i-th row is denoted by a memory cell AMref[i].

Note that the memory cell array in the product-sum operation circuit of the hierarchical neural network of Configuration example 1 includes m×n analog memory cells arranged in a matrix, i.e., m analog memory cells are arranged in the column direction and n analog memory cells are arranged in the row direction, whereas the memory cell array in the product-sum operation circuit of this configuration example includes m×(n+1) analog memory cells arranged in a matrix, i.e., m analog memory cells are arranged in the column direction and (n+1) analog memory cells are arranged in the row direction as described above. Thus, when this configuration example is applied to the hierarchical neural network of Configuration example 1, the memory cell array in the product-sum operation circuit is an analog memory cell array in which memory cells are arranged in a matrix of m×(n+1), not m×n.

The memory cell AM holds a potential corresponding to first analog data, and the memory cell AMref holds a predetermined potential. Note that the predetermined potential is a potential necessary for the product-sum operation, and in this specification, data corresponding to this predetermined potential is referred to as reference analog data in some cases.

The memory cell array 720 includes output terminals SPT[1] to SPT[n].

The column output circuit OUT[j] includes an output terminal OT[j], and the reference column output circuit Cref includes an output terminal OTref.

A wiring ORP is electrically connected to the column output circuits OUT[1] to OUT[n], and a wiring OSP is electrically connected to the column output circuits OUT[1] to OUT[n]. The wiring ORP and the wiring OSP are wirings for supplying a control signal to the offset circuit 710.

An output terminal SPT[j] of the memory cell array 720 is electrically connected to a wiring B[j].

The output terminal OT[j] of the column output circuit OUT[j] is electrically connected to the wiring B[j].

The output terminal OTref of the reference column output circuit Cref is electrically connected to a wiring Bref.

The memory cell AM[i,j] is electrically connected to a wiring RW[i], a wiring WW[i], a wiring WD[j], the wiring B[k], and a wiring VR.

The memory cell AMref[i] is electrically connected to the wiring RW[i], the wiring WW[i], a wiring WDref, the wiring Bref, and the wiring VR.

The wiring WW[i] functions as a wiring for supplying a selection signal to memory cells AM[i,1] to AM[i,n] and the memory cell AMref[i]. The wiring RW[i] functions as a wiring for supplying either a reference potential or a potential corresponding to the second analog data to the memory cells AM[i,1] to AM[i,n] and the memory cell AMref[i]. The wiring WD[j] functions as a wiring for supplying writing data to the memory cells AM in the j-th column. The wiring VR functions as a wiring for supplying a predetermined potential to the memory cells AM or the memory cells AMref when data is read out from the memory cells AM or the memory cells AMref.

The wiring B[j] functions as a wiring for supplying a signal from the column output circuit OUT[j] to the memory cells AM in the j-th column in the memory cell array 720.

The wiring Bref functions as a wiring for supplying a signal from the reference column output circuit Cref to memory cells AMref[1] to AMref[m].

In the product-sum operation circuit 700 in FIG. 11, only the following components are shown: the offset circuit 710; the memory cell array 720; the column output circuit OUT[1]; the column output circuit OUT[j]; the column output circuit OUT[n]; the reference column output circuit Cref; an output terminal OT[1]; the output terminal OT[j]; an output terminal OT[n]; the output terminal OTref; the output terminal SPT[1]; the output terminal SPT[j]; the output terminal SPT[n]; a memory cell AM[1,1]; the memory cell AM[i,1]; a memory cell AM[m,1]; a memory cell AM[1,j]; the memory cell AM[i,j]; a memory cell AM[m,j]; a memory cell AM[1,n]; the memory cell AM[i,n]; a memory cell AM[m,n]; the memory cell AMref[1]; the memory cell AMref[i]; the memory cell AMref[m]; the wiring OSP; the wiring ORP; a wiring B[1]; the wiring B[j]; a wiring B[n]; the wiring Bref; a wiring WD[1]; the wiring WD[j]; a wiring WD[n]; the wiring WDref; the wiring VR; a wiring RW[1]; the wiring RW[i]; a wiring RW[m]; a wiring WW[1]; the wiring WW[i]; and a wiring WW[m]. Other circuits, wirings, elements, and reference numerals thereof are not shown.

Note that the configuration of the product-sum operation circuit 700 is not limited to that illustrated in FIG. 11. Depending on circumstances or conditions or as needed, the configuration of the product-sum operation circuit 700 can be changed. For example, depending on a circuit configuration of the product-sum operation circuit 700, one wiring may be provided to serve as the wiring WD[j] and the wiring VR. Alternatively, depending on a circuit configuration of the product-sum operation circuit 700, one wiring may be provided to serve as the wiring ORP and the wiring OSP.

<<Offset Circuit 710>>

Figure 12:
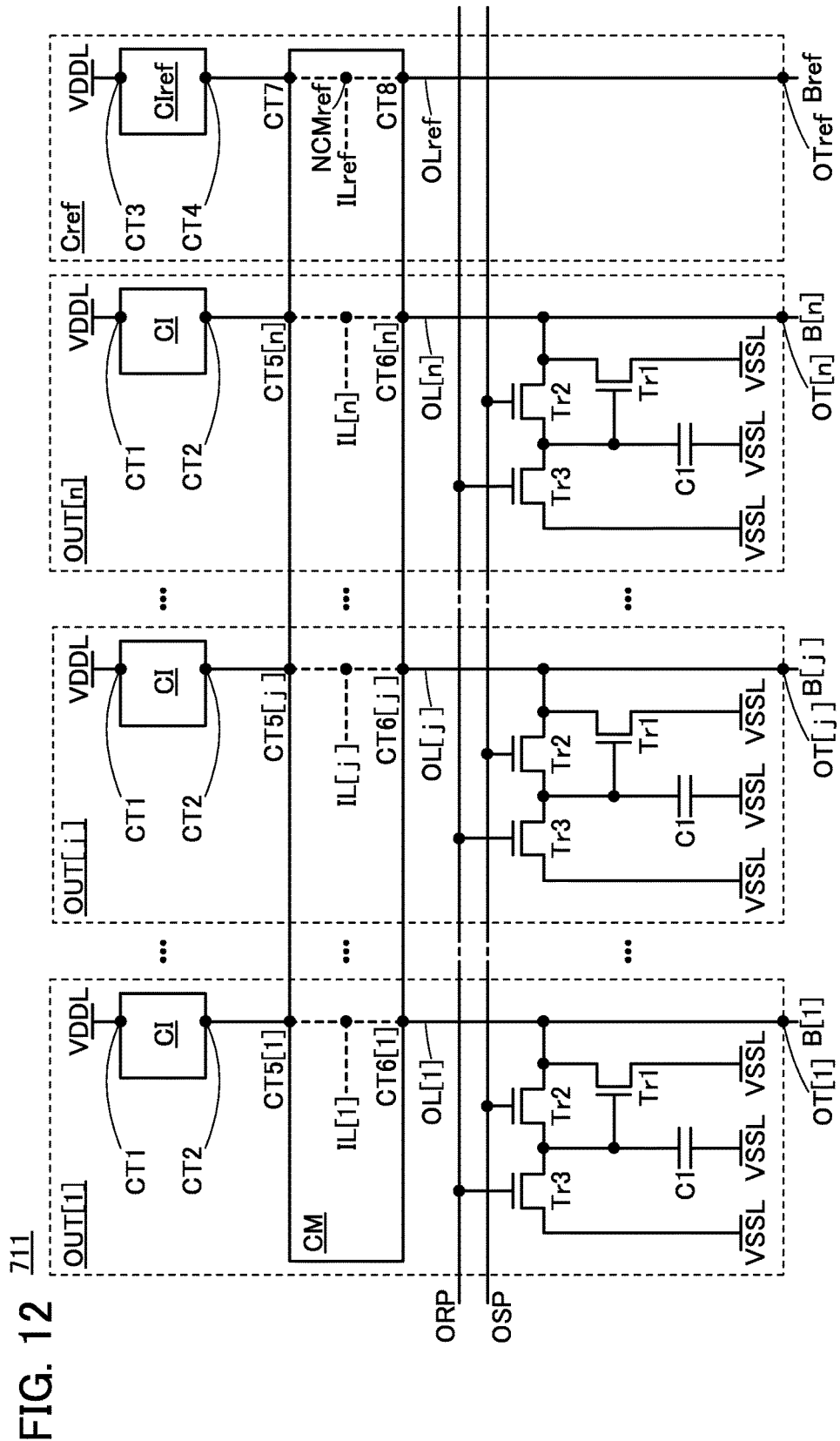
FIG. 12 is a circuit diagram illustrating an example of an offset circuit in the product-sum operation circuit in FIG. 11.

Next, an example of a circuit configuration that can be applied to the offset circuit 710 will be described. FIG. 12 shows an offset circuit 711 as an example of the offset circuit 710.

The offset circuit 711 is electrically connected to a wiring VDDL and the wiring VSSL for supplying a power supply voltage. Specifically, each of the column output circuits OUT[1] to OUT[n] is electrically connected to the wiring VDDL and the wiring VSSL, and the reference column output circuit Cref is electrically connected to the wiring VDDL. Note that a current mirror circuit CM to be described later is electrically connected to the wiring VSSL in some cases. The wiring VDDL supplies the high-level potential. The wiring VSSL supplies the low-level potential.

The circuit configuration of the inside of the column output circuit OUT[j] will be described below. The column output circuit OUT[j] includes a constant current circuit CI, transistors Tr1 to Tr3, a capacitor C1, and a wiring OL[j]. The current mirror circuit CM is shared between the column output circuits OUT[1] to OUT[n] and the reference column output circuit Cref.

The constant current circuit CI includes a terminal CT1 and a terminal CT2. The terminal CT1 functions as an input terminal of the constant current circuit CI, and the terminal CT2 functions as an output terminal of the constant current circuit CI. The current mirror circuit CM shared between the column output circuits OUT[1] to OUT[n] and the reference column output circuit Cref includes terminals CT5[1] to CT5[n], terminals CT6[1] to CT6[n], a terminal CT7, and a terminal CT8.

The constant current circuit CI has a function of keeping the amount of current flowing from the terminal CT1 to the terminal CT2 constant.

In the column output circuit OUT[j], a first terminal of the transistor Tr1 is electrically connected to the wiring OL[j], a second terminal of the transistor Tr1 is electrically connected to the wiring VSSL, and a gate of the transistor Tr1 is electrically connected to a first terminal of the capacitor C1. A first terminal of a transistor Tr2 is electrically connected to the wiring OL[j], a second terminal of the transistor Tr2 is electrically connected to the first terminal of the capacitor C1, and a gate of the transistor Tr2 is electrically connected to the wiring OSP. A first terminal of the transistor Tr3 is electrically connected to the first terminal of the capacitor C1, a second terminal of the transistor Tr3 is electrically connected to the wiring VSSL, and a gate of the transistor Tr3 is electrically connected to the wiring ORP. A second terminal of the capacitor C1 is electrically connected to the wiring VSSL.

Note that each of the transistors Tr1 to Tr3 is preferably an OS transistor. In addition, a channel formation region in each of the transistors Tr1 to Tr3 is preferably formed using an oxide containing at least one of indium, zinc, and the element M (the element M is aluminum, gallium, yttrium, or tin).

The OS transistor has a characteristic of an extremely low off-state current. Thus, when the OS transistor is in an off state, the amount of leakage current flowing between a source and a drain can be extremely small. In particular, when an OS transistor is used as the transistor Tr2, the electric charge held in the capacitor C1 can be prevented from flowing between a source and a drain of the transistor Tr2 that is off. Furthermore, when an OS transistor is used as the transistor Tr3, the electric charge held in the capacitor C1 can be prevented from flowing between a source and a drain of the transistor Tr3 that is off. Accordingly, the potential of a gate of the transistor Tr1 can be held for a long time; thus, a stable constant current can flow between a source and a drain of the transistor Tr1. As a result, the product-sum operation circuit can have high calculation accuracy in some cases.

In the column output circuit OUT[j], the terminal CT1 of the constant current circuit CI is electrically connected to the wiring VDDL, and the terminal CT2 of the constant current circuit CI is electrically connected to the terminal CT5[j] of the current mirror circuit CM. The terminal CT6[j] of the current mirror circuit CM is electrically connected to the output terminal OT[j].

Note that the wiring OL[j] is a wiring for electrically connecting the terminal CT2 of the constant current circuit CI to the output terminal OT[j] through the terminal CT5[j] and the terminal CT6[j] of the current mirror circuit CM.

Next, the reference column output circuit Cref will be described. The reference column output circuit Cref includes a constant current circuit CIref and a wiring OLref. As described above, the reference column output circuit Cref includes the current mirror circuit CM that is shared with the column output circuits OUT[1] to OUT[n].

The constant current circuit CIref includes a terminal CT3 and a terminal CT4. The terminal CT3 functions as an input terminal of the constant current circuit CIref, and the terminal CT4 functions as an output terminal of the constant current circuit CIref.

The constant current circuit CIref has a function of keeping the amount of current flowing from the terminal CT3 to the terminal CT4 constant.

In the reference column output circuit Cref, the terminal CT3 of the constant current circuit CIref is electrically connected to the wiring VDDL, and the terminal CT4 of the constant current circuit CIref is electrically connected to the terminal CT7 of the current mirror circuit CM. The terminal CT8 of the current mirror circuit CM is electrically connected to the output terminal OTref.

The wiring OLref is a wiring for electrically connecting the terminal CT4 of the constant current circuit CIref to the output terminal OTref, and the terminals CT7 and CT8 in the current mirror circuit CM are on the wiring OLref.

In the current mirror circuit CM, the terminal CT5[j] is electrically connected to the terminal CT6[j], and the terminal CT7 is electrically connected to the terminal CT8. In addition, a wiring IL[j] is electrically connected between the terminal CT5[j] and the terminal CT6[j], and a wiring ILref is electrically connected between the terminal CT7 and the terminal CT8. Furthermore, a connection portion of the wiring ILref between the terminal CT7 and the terminal CT8 is a node NCMref. The current mirror circuit CM has a function of equalizing the amount of current flowing in the wiring ILref and the amount of current flowing in each of wirings IL[1] to IL[n] with reference to the potential at the node NCMref.

In the offset circuit 711 in FIG. 12, only the following components are shown: the column output circuit OUT[1]; the column output circuit OUT[j]; the column output circuit OUT[n]; the reference column output circuit Cref; the constant current circuit CI; the constant current circuit CIref; the current mirror circuit CM; the output terminal OT[1]; the output terminal OT[j]; the output terminal OT[n]; the output terminal OTref; the terminal CT1; the terminal CT2; the terminal CT3; the terminal CT4; the terminal CT5[1]; the terminal CT5[j]; the terminal CT5[n]; the terminal CT6[1]; the terminal CT6[i]; the terminal CT6[n]; the terminal CT7; the terminal CT8; the transistor Tr1; the transistor Tr2; the transistor Tr3; the capacitor C1; a wiring OL[1]; the wiring OL[i]; a wiring OL[n]; the wiring OLref, the wiring ORP; the wiring OSP; the wiring B[1]; the wiring B[j]; the wiring B[n]; the wiring Bref; the wiring IL[1]; the wiring IL[j]; the wiring IL[n]; the wiring ILref; the node NCMref; the wiring VDDL; and the wiring VSSL. Other circuits, wirings, elements, and reference numerals thereof are not shown.

Note that the configuration of the offset circuit 711 is not limited to that illustrated in FIG. 12. Depending on circumstances or conditions or as needed, the configuration of the offset circuit 711 can be changed.

[Constant Current Circuits CI and CIref]

Next, an example of internal configurations of the constant current circuit CI and the constant current circuit CIref will be described.

Figure 13:
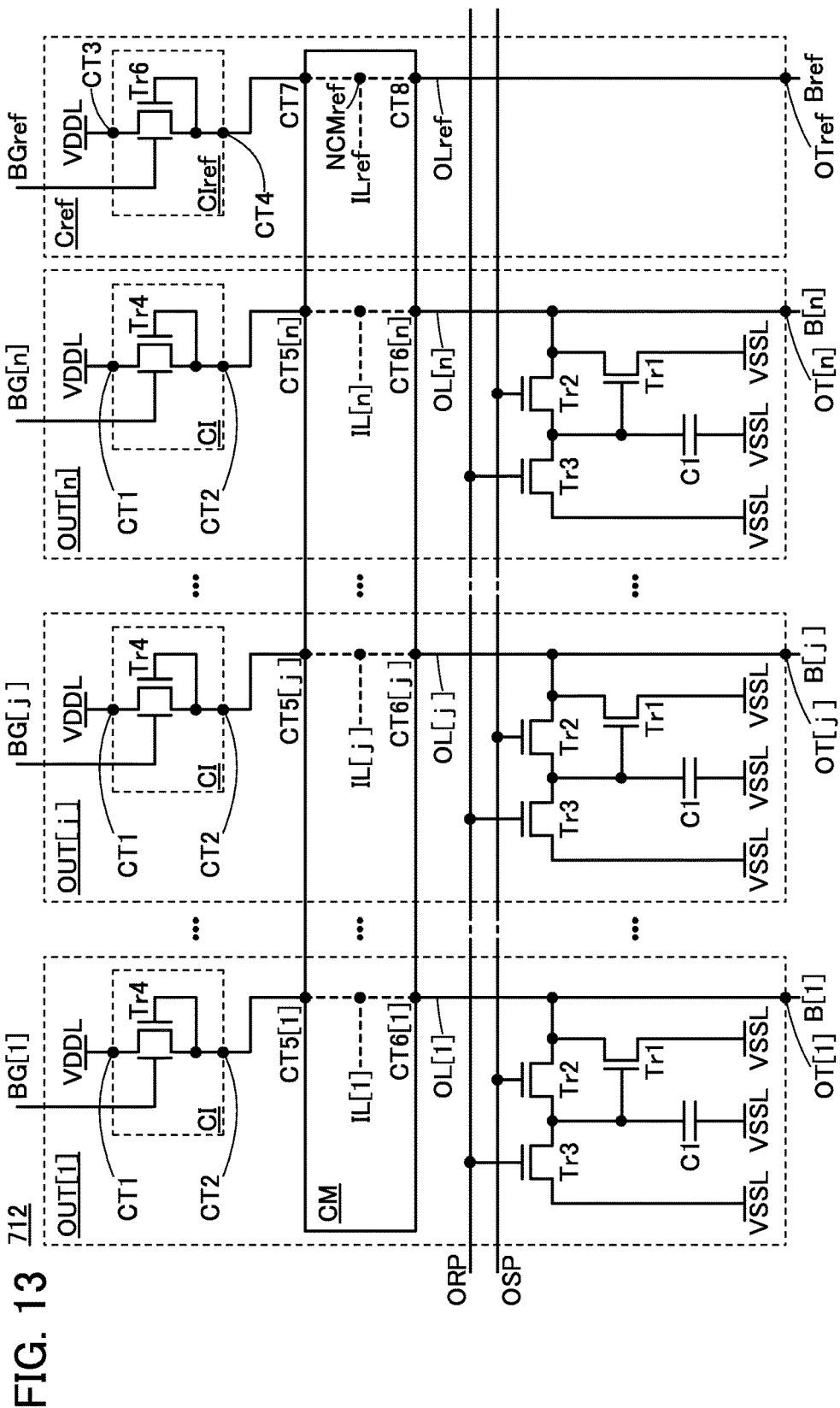
FIG. 13 is a circuit diagram illustrating an example of an offset circuit in the product-sum operation circuit in FIG. 11.

An offset circuit 712 shown in FIG. 13 is a circuit diagram showing an example of internal configurations of the constant current circuit CI and the constant current circuit CIref included in the offset circuit 711 shown in FIG. 12.

In the column output circuit OUT[j], the constant current circuit CI includes a transistor Tr4. The transistor Tr4 has a dual-gate structure including a first gate and a second gate.

Note that in this specification, the first gate in the transistor having a dual-gate structure indicates a front gate, and a term "first gate" can be replaced with a simple term "gate". Besides, the second gate in the transistor having a dual-gate structure indicates a back gate, and a term "second gate" can be replaced with a term "back gate".

A first terminal of the transistor Tr4 is electrically connected to the terminal CT1 of the constant current circuit CI. A second terminal of the transistor Tr4 is electrically connected to the terminal CT2 of the constant current circuit CI. A gate of the transistor Tr4 is electrically connected to the terminal CT2 of the constant current circuit CI. A back gate of the transistor Tr4 is electrically connected to a wiring BG[j].

In the reference column output circuit Cref, the constant current circuit CIref includes a transistor Tr6. The transistor Tr6 has a dual-gate structure including a gate and a back gate.

A first terminal of the transistor Tr6 is electrically connected to the terminal CT3 of the constant current circuit CIref. A second terminal of the transistor Tr6 is electrically connected to the terminal CT4 of the constant current circuit CIref. The gate of the transistor Tr6 is electrically connected to the terminal CT4 of the constant current circuit CIref. The back gate of the transistor Tr6 is electrically connected to a wiring BGref.

In the above connection structure, the threshold voltages of the transistor Tr4 and the transistor Tr6 can be controlled by supplying a potential to the wiring BG[j] and the wiring BGref.

Each of the transistor Tr4 and the transistor Tr6 is preferably an OS transistor. In addition, a channel formation region in each of the transistors Tr4 and Tr6 is preferably formed using an oxide containing at least one of indium, zinc, and the element M (the element M is aluminum, gallium, yttrium, or tin).

In the offset circuit 712 shown in FIG. 13, only the following components are shown: the column output circuit OUT[1]; the column output circuit OUT[j]; the column output circuit OUT[n]; the reference column output circuit Cref; the constant current circuit CI; the constant current circuit CIref; the current mirror circuit CM; the output terminal OT[1]; the output terminal OT[j]; the output terminal OT[n]; the output terminal OTref; the terminal CT1; the terminal CT2; the terminal CT3; the terminal CT4; the terminal CT5[1]; the terminal CT5[j]; the terminal CT5[n]; the terminal CT6[1]; the terminal CT6[j]; the terminal CT6[n]; the terminal CT7; the terminal CT8; the transistor Tr1; the transistor Tr2; the transistor Tr3; the transistor Tr4; the transistor Tr6; the capacitor C1; the wiring OL[1]; the wiring OL[j]; the wiring OL[n]; the wiring OLref; the wiring ORP; the wiring OSP; the wiring B[1]; the wiring B[j]; the wiring B[n]; the wiring Bref; a wiring BG[1]; the wiring BG[j]; a wiring BG[n]; the wiring BGref; the wiring IL[1]; the wiring IL[j]; the wiring IL[n]; the wiring ILref; the node NCMref; the wiring VDDL; and the wiring VSSL. Other circuits, wirings, elements, and reference numerals thereof are not shown.

Note that the configurations of the constant current circuits CI and CIref in the offset circuit of one embodiment of the present invention are not limited to those in the offset circuit 712 in FIG. 13. For example, depending on circumstances, conditions, or necessity, the component, such as a circuit, an element, or a wiring, of the offset circuit 712 can be removed; another component, such as a circuit, an element, or a wiring, can be added to the offset circuit 712; or the connection structure of the offset circuit 712 can be changed. For example, as illustrated in an offset circuit 715 of FIG. 14, the configuration of the constant current circuit CI in the offset circuit 712 may be changed and the constant current circuit CIref may be removed.

Figure 14:
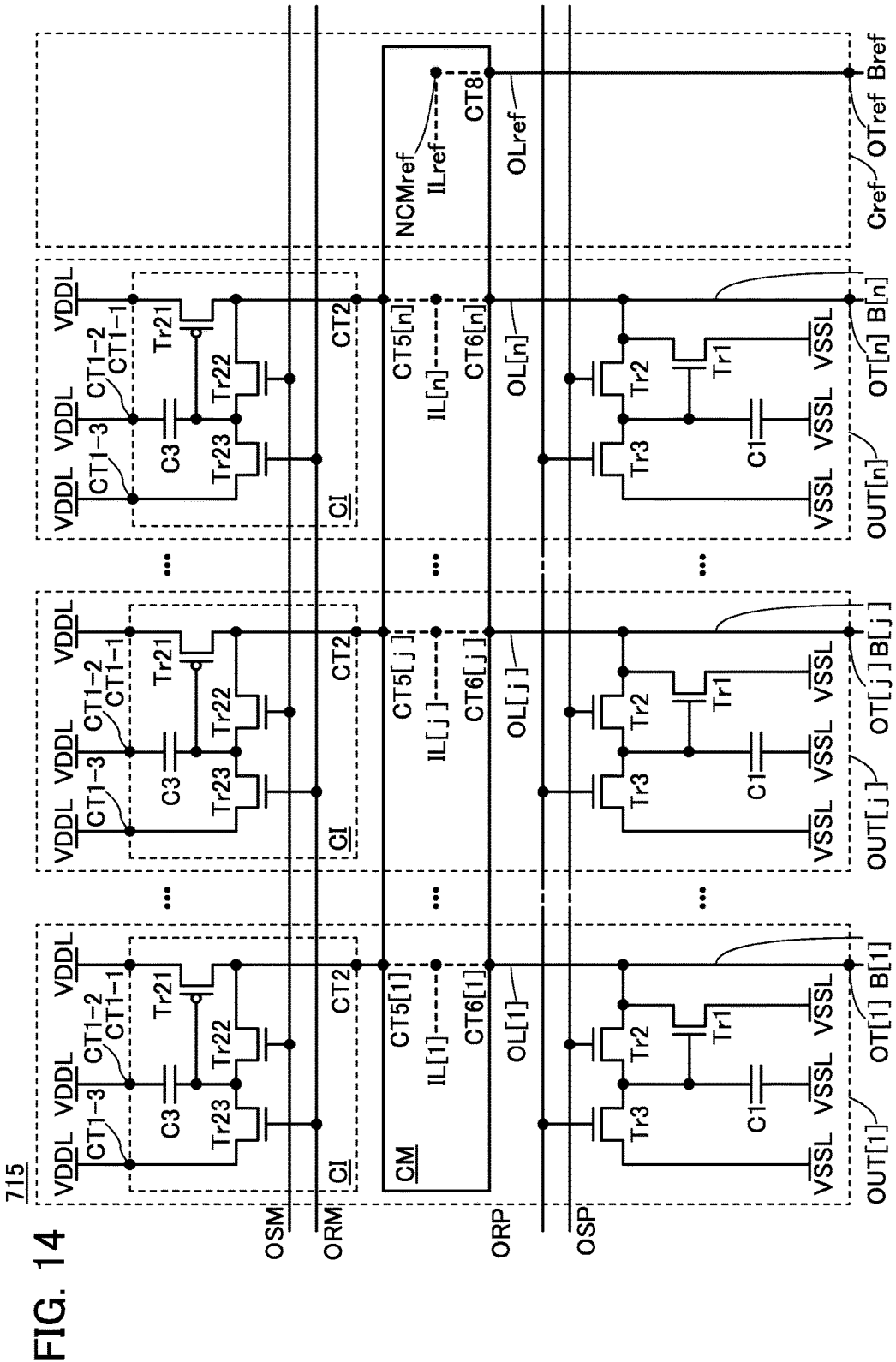
FIG. 14 is a circuit diagram illustrating an example of an offset circuit in the product-sum operation circuit in FIG. 11.

The constant current circuit CI of the offset circuit 715 in FIG. 14 includes transistors Tr21 to Tr23 and a capacitor C3. The constant current circuits CI in the offset circuit 715 include terminals CT1-1, CT1-2, and CT1-3, instead of the terminals CT1 of the constant current circuits CI in the offset circuit 712. Furthermore, the offset circuit 715 is electrically connected to wirings OSM and ORM.

Note that the transistor Tr21 is a p-channel transistor, and the transistors Tr22 and Tr23 are n-channel transistors. In particular, the transistors Tr22 and Tr23 are preferably OS transistors. In addition, the channel formation region in each of the transistors Tr22 and Tr23 preferably includes an oxide containing at least one of indium, zinc, and the element M (the element M is aluminum, gallium, yttrium, or tin).

As described above, an OS transistor has a characteristic of an extremely small off-state current. In particular, when an OS transistor is used as the transistor Tr22, the electric charge held in the capacitor C3 can be prevented from flowing between a source and a drain of the transistor Tr22 that is off. In addition, when an OS transistor is used as the transistor Tr23, the electric charge held in the capacitor C3 can be prevented from flowing between a source and a drain of the transistor Tr23 that is off. Accordingly, the potential of a gate of the transistor Tr21 can be held for a long time; thus, a stable constant current can flow between a source and a drain of the transistor Tr21. As a result, the product-sum operation circuit can have high calculation accuracy in some cases.

A first terminal of the transistor Tr21 is electrically connected to the terminal CT1-1, a second terminal of the transistor Tr21 is electrically connected to the terminal CT2, and a gate of the transistor Tr21 is electrically connected to a first terminal of the capacitor C3. A first terminal of the transistor Tr22 is electrically connected to the terminal CT2, a second terminal of the transistor Tr22 is electrically connected to the first terminal of the capacitor C3, and a gate of the transistor Tr22 is electrically connected to the wiring OSM. A first terminal of the transistor Tr23 is electrically connected to the first terminal of the capacitor C3, a second terminal of the transistor Tr23 is electrically connected to the terminal CT1-3, and a gate of the transistor Tr23 is electrically connected to the wiring ORM. A second terminal of the capacitor C3 is electrically connected to the terminal CT1-2.

The terminals CT1-1 to CT1-3 are each electrically connected to the wiring VDDL.

In the offset circuit 715 shown in FIG. 14, only the following components are shown: the column output circuit OUT[1]; the column output circuit OUT[j]; the column output circuit OUT[n]; the reference column output circuit Cref; the constant current circuit CI; the current mirror circuit CM; the output terminal OT[1]; the output terminal OT[j]; the output terminal OT[n]; the output terminal OTref; the terminal CT1-1; the terminal CT1-2; the terminal CT1-3; the terminal CT2; the terminal CT5[1]; the terminal CT5[j]; the terminal CT5[n]; the terminal CT6[1]; the terminal CT6[j]; the terminal CT6[n]; the terminal CT8; the transistor Tr1; the transistor Tr2; the transistor Tr3; the transistor Tr21; the transistor Tr22; the transistor Tr23; the capacitor C1; the capacitor C3; the wiring OL[1]; the wiring OL[j]; the wiring OL[n]; the wiring OLref; the wiring ORP; the wiring OSP;

the wiring OSM; the wiring ORM; the wiring B[1]; the wiring B[j]; the wiring B[n]; the wiring Bref; the wiring IL[1]; the wiring IL[j]; the wiring IL[n]; the wiring ILref; the node NCMref; the wiring VDDL; and the wiring VSSL. Other circuits, wirings, elements, and reference numerals thereof are not shown.

The operation of the constant current circuit CI in the offset circuit 715 will be described below.

When the high-level potential is supplied to the wiring ORM and the low-level potential is supplied to the wiring OSM, the transistor Tr23 is turned on and the transistor Tr22 is turned off. At this time, the first terminal of the capacitor C3 is supplied with the high-level potential from the wiring VDDL via the transistor Tr23. The second terminal of the capacitor C3 is supplied with the high-level potential from the wiring VDDL; thus, the holding potential of the capacitor C3 becomes 0. That is, by supplying the wiring ORM with the high-level potential and supplying the wiring OSM with the low-level potential, electric charge held in the capacitor C3 is released, so that the constant current circuit CI can be initialized.

When the low-level potential is supplied to the wiring ORM and the high-level potential is supplied to the wiring OSM, the transistor Tr23 is turned off and the transistor Tr22 is turned on. At this time, the second terminal of the transistor Tr21 is electrically connected to the gate of the transistor Tr21 via the transistor Tr22. That is, the transistor Tr21 has a diode-connected structure. The potential of the first terminal of the capacitor C3 becomes equal to that of the second terminal of the transistor Tr21 over time.

With this state, the low-level potential is supplied to the wiring OSM, and the transistor Tr22 is turned off, so that a potential equal to that of the second terminal of the transistor Tr21 is held in the capacitor C3. Accordingly, the potential is held in the gate of the transistor Tr21, and thus a constant current based on the potential flows through the transistor Tr21.

[Current Mirror Circuit CM]

Next, an internal configuration example of the current mirror circuit CM will be described.

Figure 15:
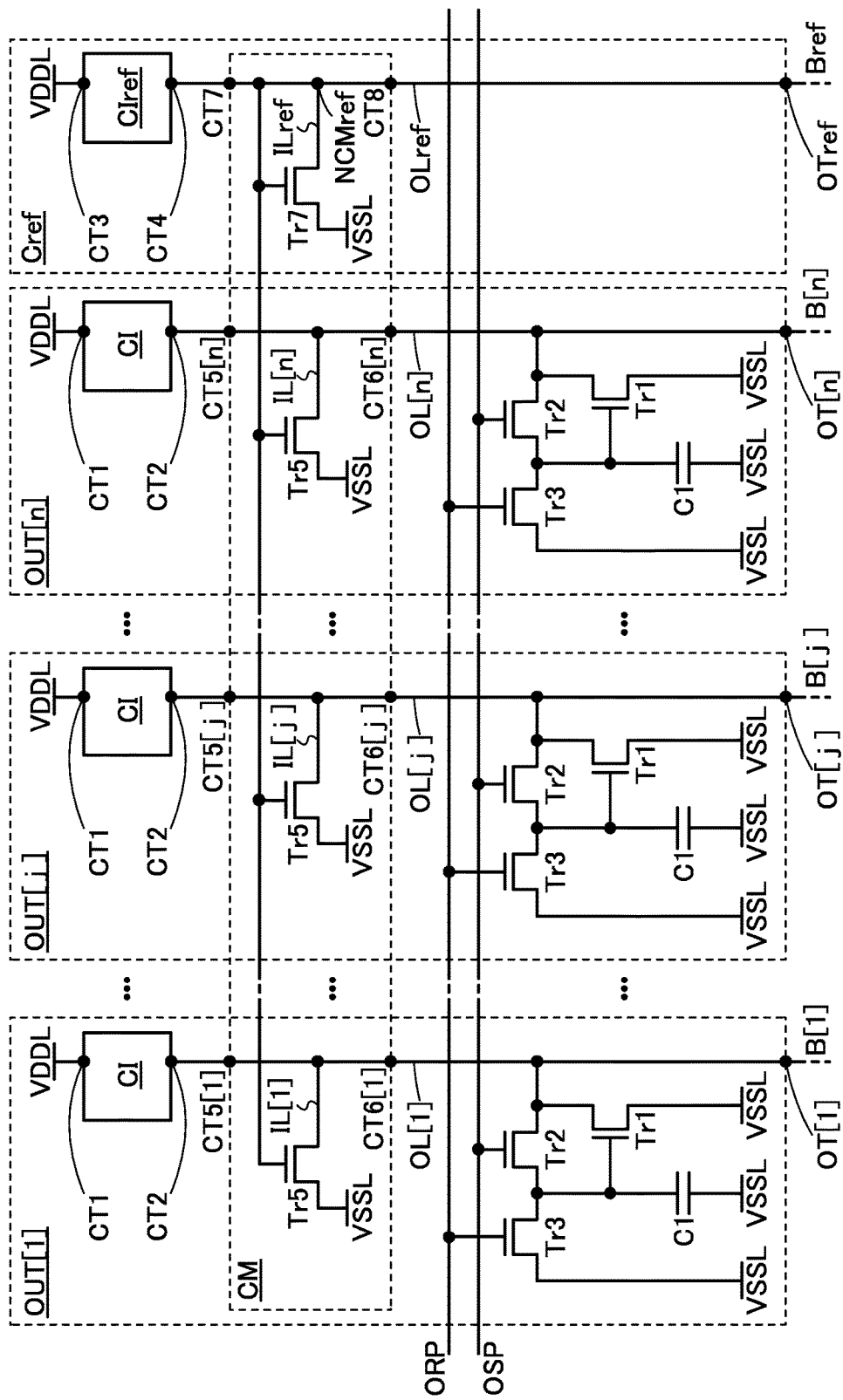
FIG. 15 is a circuit diagram illustrating an example of an offset circuit in the product-sum operation circuit in FIG. 11.

An offset circuit 713 shown in FIG. 15 is a circuit diagram of an internal configuration example of the current mirror circuit CM included in the offset circuit 711 shown in FIG. 12.

In the current mirror circuit CM, each of the column output circuits OUT[1] to OUT[n] includes a transistor Tr5, and the reference column output circuit Cref includes a transistor Tr7. Note that the transistors Tr5 and Tr7 are each an n-channel transistor.

A first terminal of the transistor Tr5 in the column output circuit OUT[j] is electrically connected to the terminal CT5[j] and the terminal CT6[j] of the current mirror circuit CM. A second terminal of the transistor Tr5 in the column output circuit OUT[j] is electrically connected to the wiring VSSL. A gate of the transistor Tr5 in the column output circuit OUT[j] is electrically connected to the terminal CT7 and the terminal CT8 in the current mirror circuit CM.

A first terminal of the transistor Tr7 in the reference column output circuit Cref is electrically connected to the terminal CT7 and the terminal CT8 of the current mirror circuit CM. A second terminal of the transistor Tr7 in the reference column output circuit Cref is electrically connected to the wiring VSSL. A gate of the transistor Tr7 in the reference column output circuit Cref is electrically connected to the terminal CT7 and the terminal CT8 of the current mirror circuit CM.

In the above connection structure, the potential of the node NCMref can be supplied to the gate of the transistor Tr5 in each of the column output circuits OUT[1] to OUT[n], and the amount of current flowing between a source and a drain of the transistor Tr7 can be equalized to the amount of current flowing between a source and a drain of the transistor Tr5 in each of the column output circuits OUT[1] to OUT[n]. Note that the transistors Tr5 and Tr7 of the current mirror circuit CM in the offset circuit 713 are n-channel transistors and are connected to the wiring VSSL to which the low-level potential is supplied, and thus the current mirror circuit CM function as a current sink.

Each of the transistor Tr5 and the transistor Tr7 is preferably an OS transistor. In addition, a channel formation region in each of the transistors Tr5 and Tr7 is preferably formed using an oxide containing at least one of indium, zinc, and the element M (the element M is aluminum, gallium, yttrium, or tin).

In the offset circuit 713 shown in FIG. 15, only the following components are shown: the column output circuit OUT[1]; the column output circuit OUT[j]; the column output circuit OUT[n]; the reference column output circuit Cref; the constant current circuit CI; the constant current circuit CIref; the current mirror circuit CM; the output terminal OT[1]; the output terminal OT[j]; the output terminal OT[n]; the output terminal OTref; the terminal CT1; the terminal CT2; the terminal CT3; the terminal CT4; the terminal CT5[1]; the terminal CT5[j]; the terminal CT5[n]; the terminal CT6[1]; the terminal CT6[j]; the terminal CT6[n]; the terminal CT7; the terminal CT8; the transistor Tr1; the transistor Tr2; the transistor Tr3; the transistor Tr5; the transistor Tr7; the capacitor C1; the wiring OL[1]; the wiring OL[j]; the wiring OL[n]; the wiring OLref; the wiring ORP; the wiring OSP; the wiring B[1]; the wiring B[j]; the wiring B[n]; the wiring Bref; the wiring IL[1]; the wiring IL[j]; the wiring IL[n]; the wiring ILref; the node NCMref; the wiring VDDL; and the wiring VSSL. Other circuits, wirings, elements, and reference numerals thereof are not shown.

Note that the configuration of the current mirror circuit CM of the offset circuit of one embodiment of the present invention is not limited to that of the offset circuit 713 in FIG. 15. For example, depending on circumstances, conditions, or necessity, the component, such as a circuit, an element, or a wiring, of the offset circuit 713 can be removed; another component, such as a circuit, an element, or a wiring, can be added to the offset circuit 713; or the internal connection structure of the offset circuit 713 can be changed. For example, as illustrated in an offset circuit 716 of FIG. 16, the configuration of the current mirror circuit CM may be changed.

Figure 16:
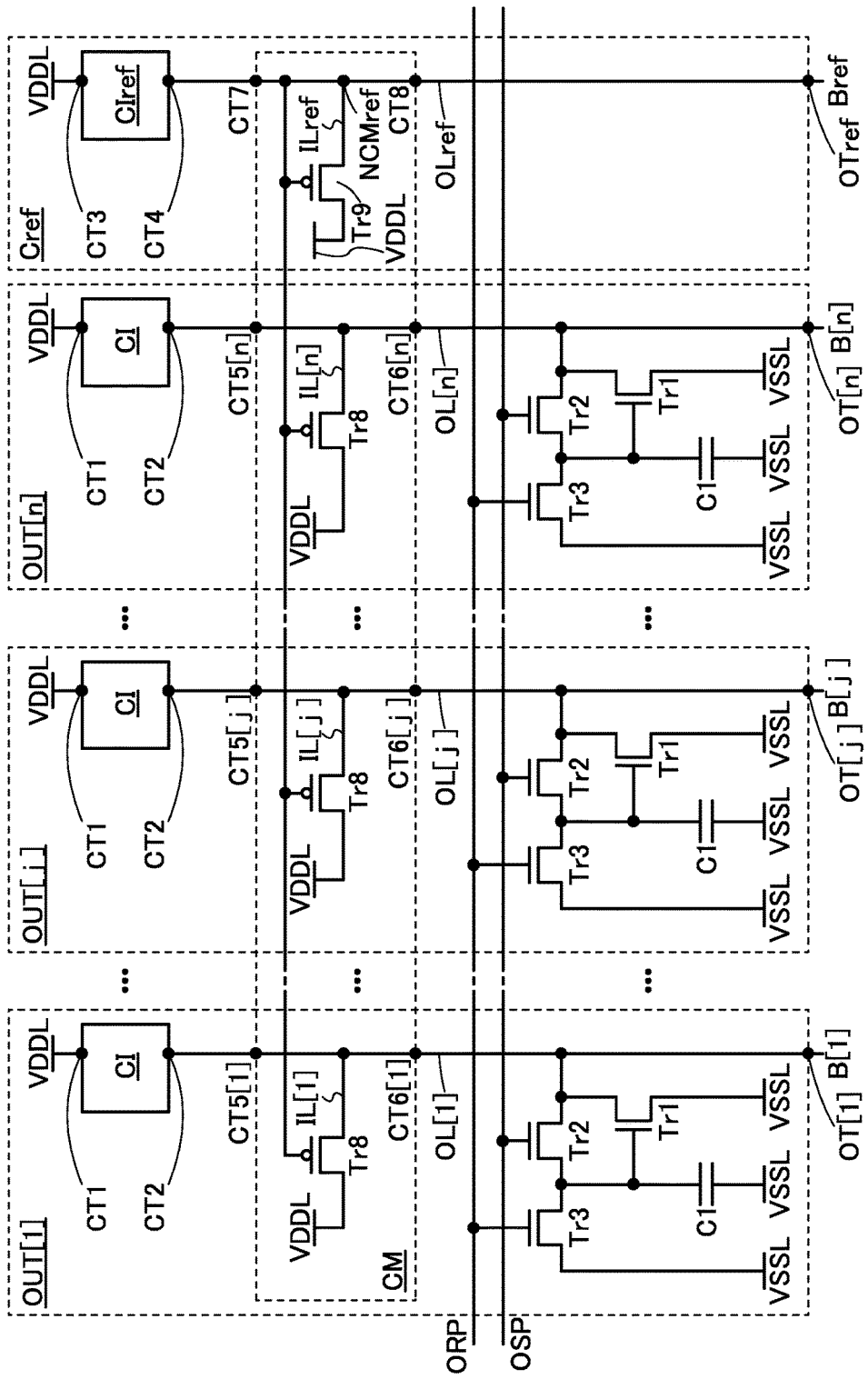
FIG. 16 is a circuit diagram illustrating an example of an offset circuit in the product-sum operation circuit in FIG. 11.

In the current mirror circuit CM of the offset circuit 716 illustrated in FIG. 16, each of the column output circuits OUT[1] to OUT[n] includes a transistor Tr8, and the reference column output circuit Cref includes a transistor Tr9. Note that the transistors Tr8 and Tr9 are each a p-channel transistor.

A first terminal of the transistor Tr8 in the column output circuit OUT[j] is electrically connected to the terminal CT5[j] and the terminal CT6[j] of the current mirror circuit CM. A second terminal of the transistor Tr8 in the column output circuit OUT[j] is electrically connected to the wiring VDDL. A gate of the transistor Tr8 in the column output circuit OUT[j] is electrically connected to the terminal CT7 and the terminal CT8 in the current mirror circuit CM.

A first terminal of the transistor Tr9 in the reference column output circuit Cref is electrically connected to the terminal CT7 and the terminal CT8 of the current mirror circuit CM. A second terminal of the transistor Tr9 in the reference column output circuit Cref is electrically connected to the wiring VDDL. A gate of the transistor Tr9 in the reference column output circuit Cref is electrically connected to the terminal CT7 and the terminal CT8 of the current mirror circuit CM.

In the above connection structure, the potential of the node NCMref can be supplied to the gate of the transistor Tr8 in each of the column output circuits OUT[1] to OUT[n], and the amount of current flowing between a source and a drain of the transistor Tr9 can be equalized to the amount of current flowing between a source and a drain of the transistor Tr8 in each of the column output circuits OUT[1] to OUT[n]. Note that the transistors Tr8 and Tr9 of the current mirror circuit CM in the offset circuit 713 are p-channel transistors and are connected to the wiring VDDL to which the high-level potential is supplied, and thus the current mirror circuit CM function as a current source.

In the offset circuit 716 shown in FIG. 16, only the following components are shown: the column output circuit OUT[1]; the column output circuit OUT[j]; the column output circuit OUT[n]; the reference column output circuit Cref; the constant current circuit CI; the constant current circuit CIref; the current mirror circuit CM; the output terminal OT[1]; the output terminal OT[j]; the output terminal OT[n]; the output terminal OTref; the terminal CT1; the terminal CT2; the terminal CT3; the terminal CT4; the terminal CT5[1]; the terminal CT5[j]; the terminal CT5[n]; the terminal CT6[1]; the terminal CT6[j]; the terminal CT6[n]; the terminal CT7; the terminal CT8; the transistor Tr1; the transistor Tr2; the transistor Tr3; the transistor Tr8; the transistor Tr9; the capacitor C1; the wiring OL[1]; the wiring OL[j]; the wiring OL[n]; the wiring OLref; the wiring ORP; the wiring OSP; the wiring B[1]; the wiring B[j]; the wiring B[n]; the wiring Bref; the wiring IL[1]; the wiring IL[j]; the wiring IL[n]; the wiring ILref; the node NCMref; the wiring VDDL; and the wiring VSSL. Other circuits, wirings, elements, and reference numerals thereof are not shown.

<<Memory Cell Array 720>>

Figure 17:
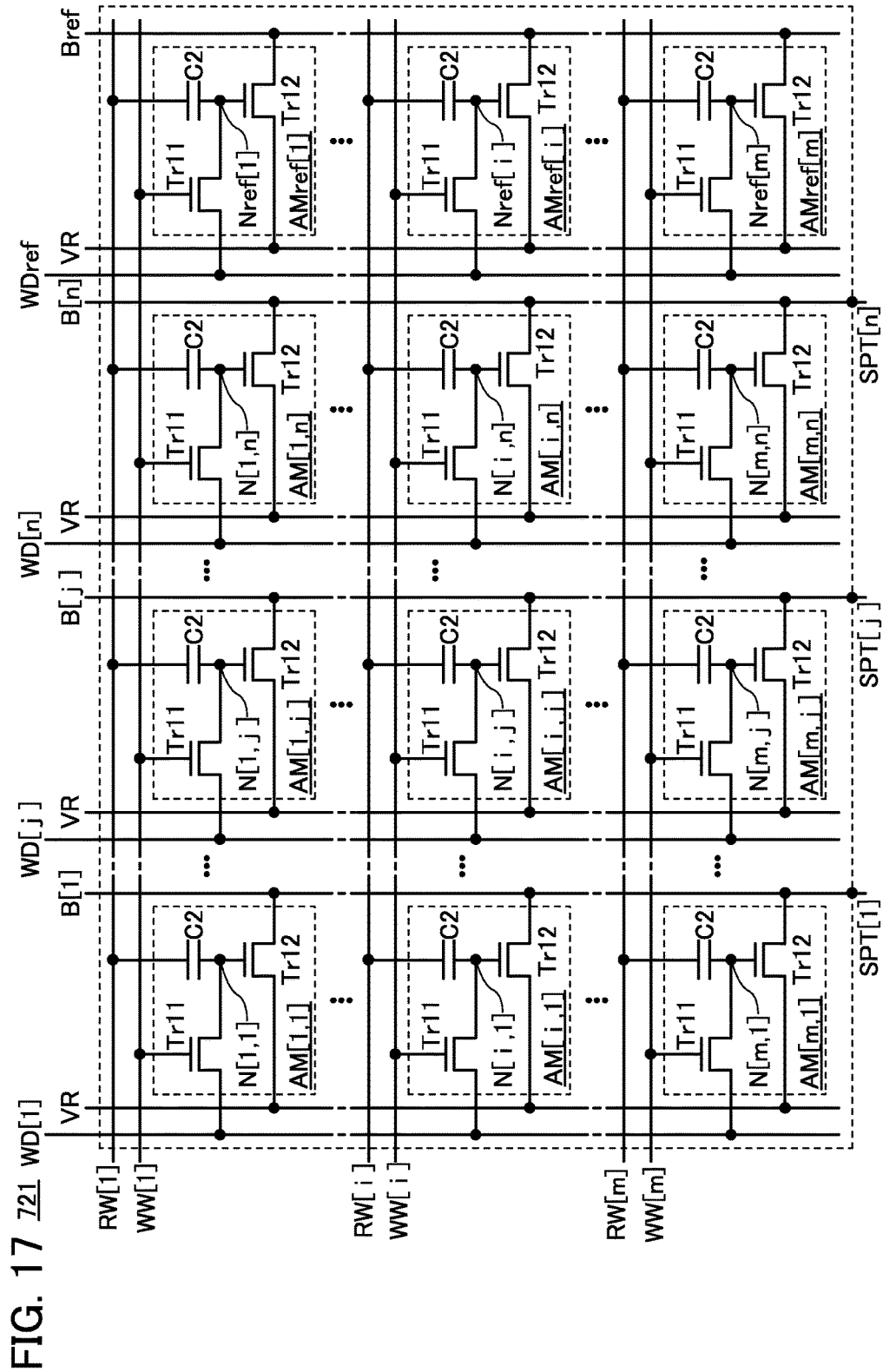
FIG. 17 is a circuit diagram illustrating an example of a memory cell array in the product-sum operation circuit in FIG. 11.

Next, a circuit configuration example that can be employed in the memory cell array 720 will be described. FIG. 17 shows a memory cell array 721 as an example of the memory cell array 720.

The memory cell array 721 includes the memory cells AM and the memory cells AMref Each of the memory cells AM included in the memory cell array 721 includes a transistor Tr11, a transistor Tr12, and a capacitor C2. The memory cells AMref[1] to AMref[m] each include the transistor Tr11, the transistor Tr12, and the capacitor C2.

For the connection structure in the memory cell array 721, the description will be made with a focus on the memory cell AM[i,j]. A first terminal of the transistor Tr11 is electrically connected to a gate of the transistor Tr12 and a first terminal of the capacitor C2. A second terminal of the transistor Tr11 is electrically connected to the wiring WD[j]. A gate of the transistor Tr11 is electrically connected to the wiring WW[i]. A first terminal of the transistor Tr12 is electrically connected to the wiring B[j], and a second terminal of the transistor Tr12 is electrically connected to the wiring VR. A second terminal of the capacitor C2 is electrically connected to the wiring RW[i].

In the memory cell AM[i,j], a connection portion of the first terminal of the transistor Tr11, the gate of the transistor Tr12, and the first terminal of the capacitor C2 is a node N[i,j]. In this embodiment, a potential corresponding to the first analog data is held at the node N[i,j].

Next, the description will be made with a focus on the memory cell AMref[i]. The first terminal of the transistor Tr11 is electrically connected to the gate of the transistor Tr12 and the first terminal of the capacitor C2. A second terminal of the transistor Tr1 is electrically connected to the wiring WDref. A gate of the transistor Tr11 is electrically connected to the wiring WW[i]. A first terminal of the transistor Tr12 is electrically connected to the wiring Bref. A second terminal of the transistor Tr12 is electrically connected to the wiring VR. A second terminal of the capacitor C2 is electrically connected to the wiring RW[i].

In the memory cell AMref[i], a connection portion of the first terminal of the transistor Tr11, the gate of the transistor Tr12, and the first terminal of the capacitor C2 is a node Nref[i].

Note that each of the transistor Tr11 and the transistor Tr12 is preferably an OS transistor. In addition, a channel formation region in each of the transistors Tr11 and Tr12 is preferably formed using an oxide containing at least one of indium, zinc, and the element M (the element M is aluminum, gallium, yttrium, or tin).

With use of the OS transistors as the transistors Tr11 and Tr12, the leakage current of each of the transistors Tr11 and Tr12 can be suppressed, which enables a product-sum operation circuit with high accuracy to be fabricated in some cases. Furthermore, with use of the OS transistor as the transistor Tr11, the amount of leakage current from a holding node to a writing word line can be extremely small when the transistor Tr11 is in an off state. In other words, frequency of refresh operation at the holding node can be reduced; thus, power consumption of a semiconductor device including a product-sum operation circuit can be reduced.

Furthermore, when all of the above-described transistors Tr1 to Tr7, Tr11, Tr12, Tr22, and Tr23 are OS transistors, a manufacturing process of semiconductor devices each including a product-sum operation circuit can be shortened. Thus, time needed for manufacturing the semiconductor devices can be shortened, and the number of devices manufactured in a certain time period can be increased.

Note that the transistors Tr1, Tr4 to Tr9, Tr12, and Tr21 operate in a saturation region unless otherwise specified. In other words, the gate voltage, source voltage, and drain voltage of each of the transistors Tr1, Tr4 to Tr9, Tr12, and Tr21 are appropriately biased so that the transistors operate in the saturation region. Note that even when the operations of the transistors Tr1, Tr4 to Tr9, Tr12, and Tr21 are deviated from ideal operation in a saturation region, the gate voltage, source voltage, and drain voltage of each of the transistors are regarded as being appropriately biased as long as the accuracy of output data is within a desired range.

In the memory cell array 721 shown in FIG. 17, only the following components are shown: the memory cell AM[1,1]; the memory cell AM[i,1]; the memory cell AM[m,1]; the memory cell AM[1,j]; the memory cell AM[i,j]; the memory cell AM[m,j]; the memory cell AM[1,n]; the memory cell AM[i,n]; the memory cell AM[m,n]; the memory cell AMref[1]; the memory cell AMref[i]; the memory cell AMref[m]; the wiring RW[1]; the wiring RW[i]; the wiring RW[m]; the wiring WW[1]; the wiring WW[i]; the wiring WW[m]; the wiring WD[1]; the wiring WD[j]; the wiring WD[n]; the wiring WDref; the wiring B[1]; the wiring B[j]; the wiring B[n]; the wiring Bref; the wiring VR; the output terminal SPT[1]; the output terminal SPT[i]; the output terminal SPT[n]; a node N[1,1]; a node N[i,1]; a node N[m,1]; a node N[1,j]; the node N[i,j]; a node N[m,j]; a node N[1,n]; a node N[i,n]; a node N[m,n]; a node Nref[1]; the node Nref[i]; a node Nref[m]; the transistor Tr11; the transistor Tr12; and the capacitor C2. Other circuits, wirings, elements, and reference numerals thereof are not shown.

Depending on circumstances or conditions or as needed, the product-sum operation circuit of this embodiment may have a combined structure of the above configuration examples.

Operation Example

An example of operation of the product-sum operation circuit 700 will be described. Note that the product-sum operation circuit 700 described in this operation example includes an offset circuit 751 shown in FIG. 18 as the offset circuit 710 and a memory cell array 760 shown in FIG. 19 as the memory cell array 720 of the product-sum operation circuit 700.

Figure 18:
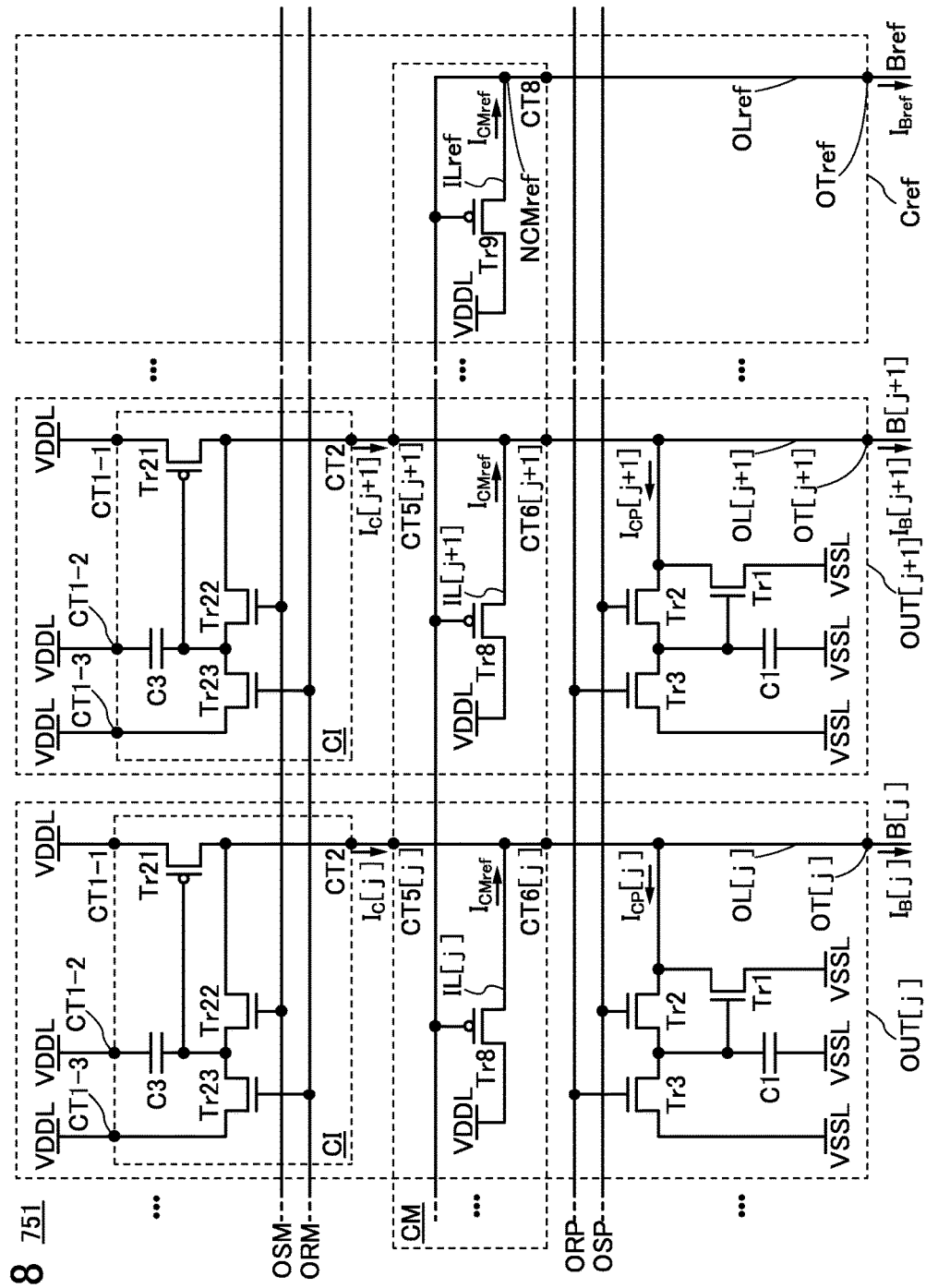
FIG. 18 is a circuit diagram illustrating an example of an offset circuit in the product-sum operation circuit in FIG. 11.

The offset circuit 751 shown in FIG. 18 has a circuit configuration where the constant current circuit CI of the offset circuit 715 in FIG. 14 and the current mirror circuit CM of the offset circuit 716 in FIG. 16 are used. For the description of this operation example, FIG. 18 shows the column output circuit OUT[j], a column output circuit OUT[j+1], and the reference column output circuit Cref.

Note that in FIG. 18, current flowing from the terminal CT2 of the constant current circuit CI to the terminal CT5[j] of the current mirror circuit CM in the column output circuit OUT[j] is denoted by $I_C[j]$, and current flowing from the terminal CT2 of the constant current circuit CI to the terminal CT5[j+1] of the current mirror circuit CM in the column output circuit OUT[j+1] is denoted by $I_C[/+1]$. Furthermore, in the current mirror circuit CM, current flowing from the first terminal of the transistor Tr8 to the wiring IL[j] in the column output circuit OUT[j], current flowing from the first terminal of the transistor Tr8 to the wiring IL[j+1] in the column output circuit OUT[j+1], and current flowing from the first terminal of the transistor Tr9 to the wiring ILref in the reference column output circuit Cref are denoted by $I_{CMref}$. That is, current that is the sum of $I_C[j]$ and $I_{CMref}$ is Output to the Terminal CT6[j], and current that is the sum of $I_C[j+1]$ and $I_{CMref}$ is output to the terminal CT6[j+1]. Current flowing from the wiring OL[j] to the first terminal of the transistor Tr1 or the first terminal of the transistor Tr2 in the column output circuit OUT[j] is denoted by $I_{CP}[j]$, and current flowing from a wiring OL[j+1] to the first terminal of the transistor Tr1 or the first terminal of the transistor Tr2 in the column output circuit OUT[j+1] is denoted by $I_{CP}[j+1]$. Current output from the output terminal OT[j] to the wiring B[j] in the column output circuit OUT[j] is denoted by $I_B[j]$, current output from an output terminal OT[j+1] to the wiring B[j+1] in the column output circuit OUT[j+1] is denoted by $I_B[j+1]$, and current output from the output terminal OTref to the wiring Bref in the reference column output circuit Cref is denoted by $I_{Bref}$.

Figure 19:
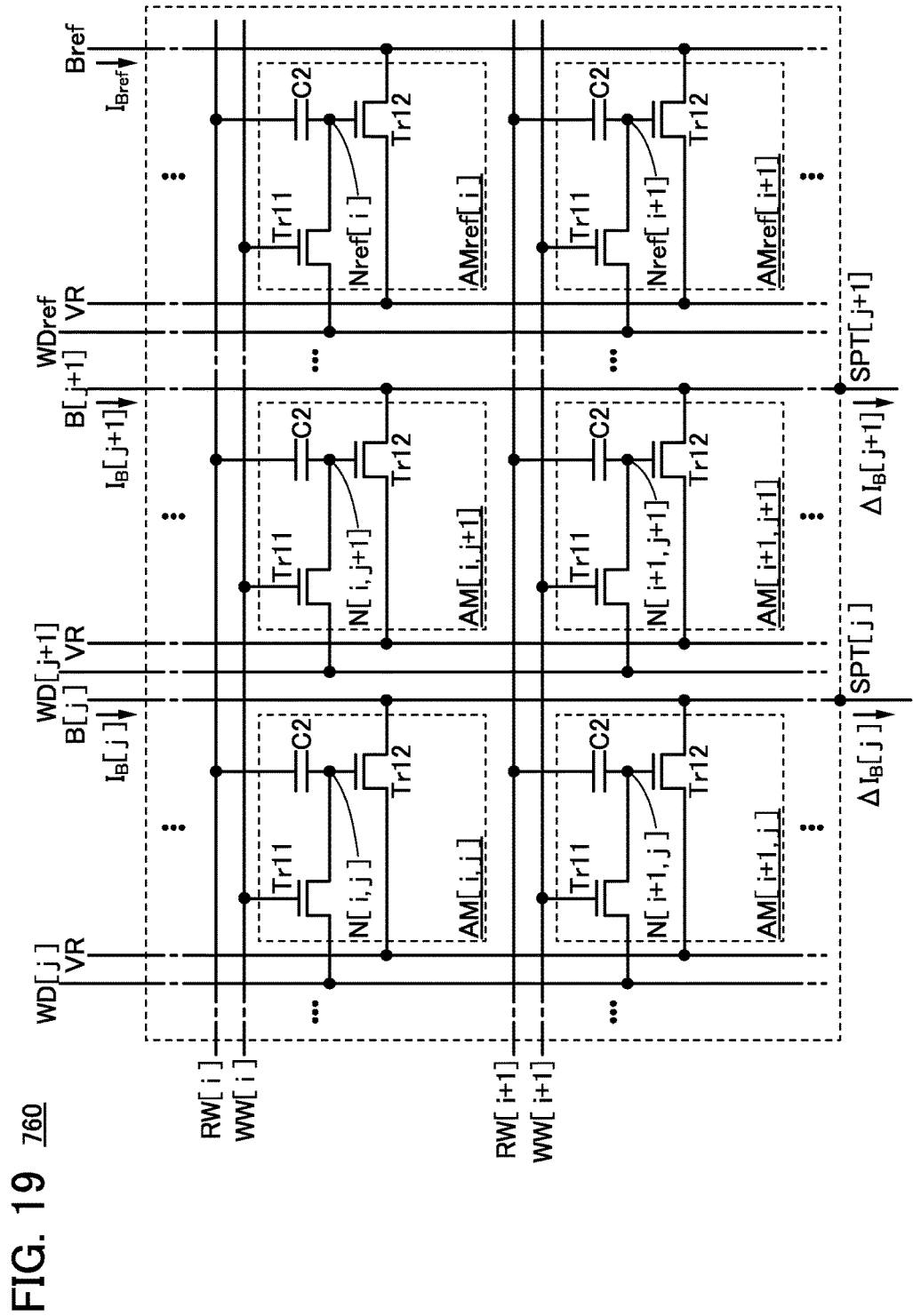
FIG. 19 is a circuit diagram illustrating an example of a memory cell array in the product-sum operation circuit in FIG. 11.

The memory cell array 760 shown in FIG. 19 has a structure similar to that of the memory cell array 721 shown in FIG. 17. For the description of this operation example, FIG. 19 shows the memory cell AM[i,j], a memory cell AM[i+1,j], a memory cell AM[i,j+1], a memory cell AM[i+1,j+1], the memory cell AMref[i], and a memory cell AMref[i+1].

In FIG. 19, $I_B[j]$ denotes a current that is input from the wiring B[j], $I_B[j+1]$ denotes a current that is input from the wiring B[j+1], and $I_{Bref}$ denotes a current that is input from the wiring Bref In addition, $\Delta I_B[L]$ denotes a current that is output from the output terminal SPT[j] that is electrically connected to the wiring B[j], and $\Delta I_B[j+1]$ denotes a current that is output from an output terminal SPT[j+1] that is electrically connected to the wiring B[j+1].

Figure 20:
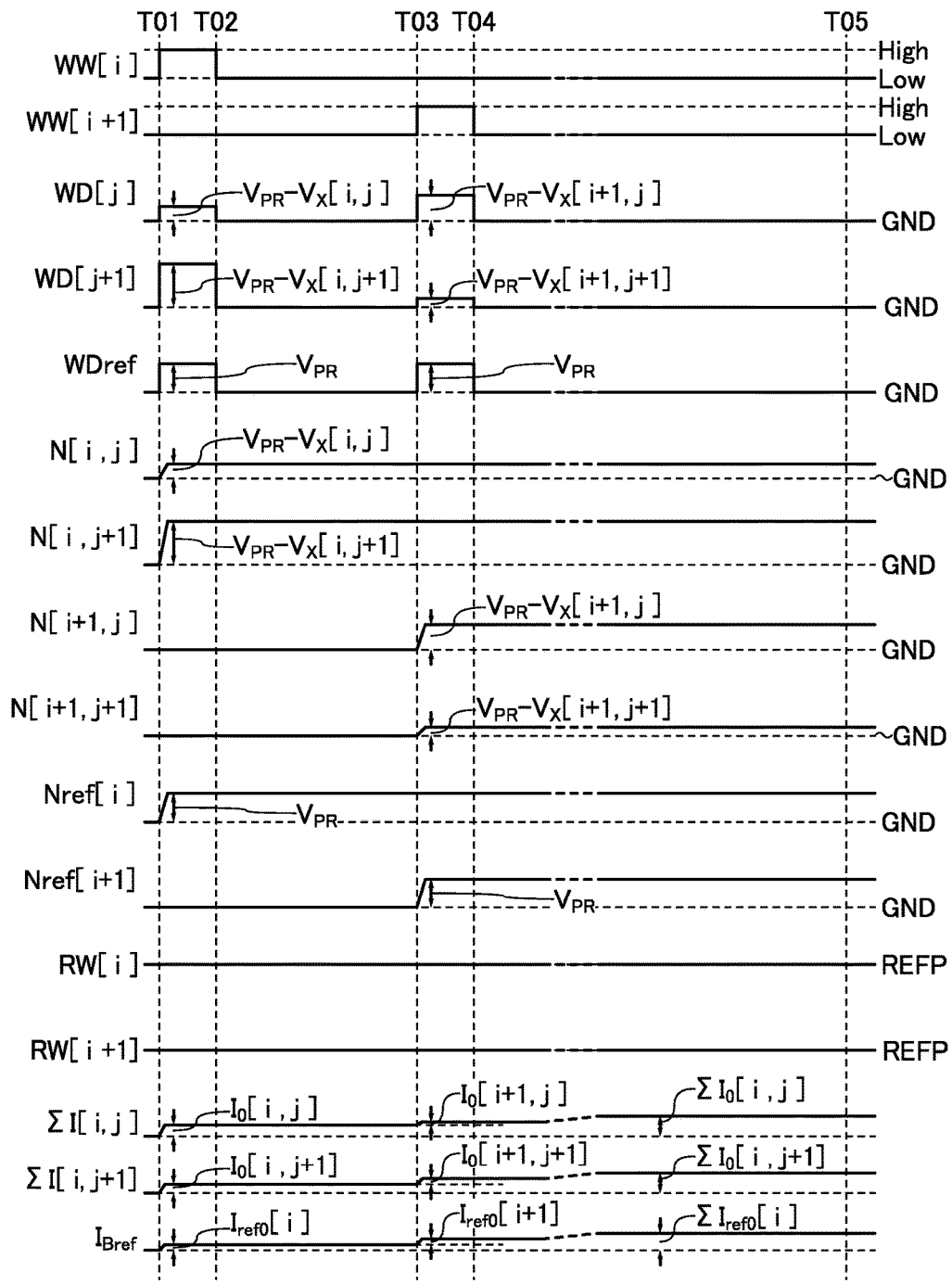
FIG. 20 is a timing chart showing an operation example of a product-sum operation circuit.
Figure 21:
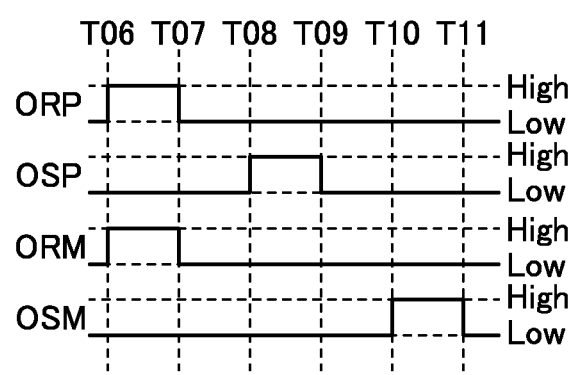
FIG. 21 is a timing chart showing an operation example of a product-sum operation circuit.
Figure 22:
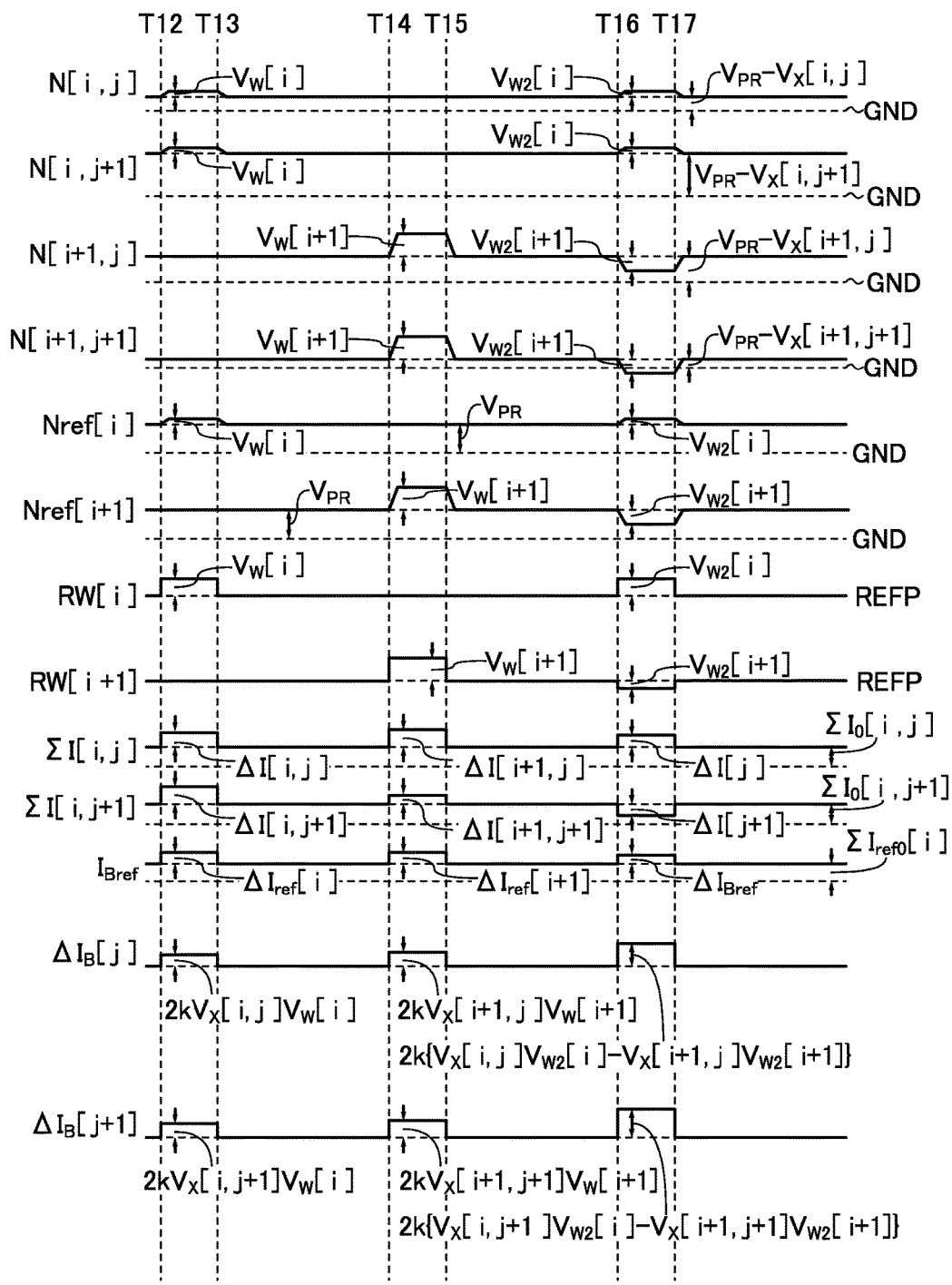
FIG. 22 is a timing chart showing an operation example of a product-sum operation circuit.

FIG. 20 to FIG. 22 are timing charts showing the operation example of the product-sum operation circuit 700. The timing chart in FIG. 20 shows changes in potentials during a period from Time T01 to Time T05 of the wiring WW[i], a wiring WW[i+1], the wiring WD[j], a wiring WD[j+1], the wiring WDref, the node N[i,j], a node N[i,j+1], a node N[i+1,j], a node N[i+1,j+1], the node Nref[i], a node Nref [i+1], the wiring RW[i], and a wiring RW[i+1]. This timing chart also shows the amount of changes in a current $\Sigma I[i,j]$, a current $\Sigma I[i,j+1]$, and a current $I_{Bref}$. Note that the current $\Sigma I[i,j]$ is the summation of current I[i,j] over i from 1 to m. Here, the current I[i,j] is current flowing in the transistor Tr12 in the memory cell AM[i,j]. The current $\Sigma I[i,j+1]$ is the summation of current I[i,j+1] over i from 1 to m. Here, the current I[i,j+1] is current flowing in the transistor Tr12 in the memory cell AM[i,j+1]. In the timing chart of FIG. 20, the potentials of the wirings ORP, OSP, ORM, and OSM are constantly low-level potentials (not shown).

The timing chart in FIG. 21 shows the operation during the period after Time T05, which is shown in the timing chart in FIG. 20, to Time T11. The timing chart in FIG. 21 shows the changes in potentials during a period from Time T06 to Time T11 of the wirings ORP, OSP, ORM, and OSM. Note that in Time T06 to Time T11, the potentials of the wiring WW[i], the wiring WW[i+1], the wiring WD[j], the wiring WD[j+1], the wiring WDref, the node N[i,j], the node N[i,j+1], the node N[i+1,j], the node N[i+1,j+1], the node Nref[i], the node Nref[i+1], the wiring RW[i], and the wiring RW[i+1] and the amounts of the current $\Sigma I[i,j]$, the current $\Sigma I[i,j+1]$, and the current $I_{Bref}$ are not changed; thus, the changes in the potentials of the wirings and the nodes and in the currents are not shown in FIG. 21.

The timing chart in FIG. 22 shows the operation during the period after Time T12, which is shown in the timing chart in FIG. 21, to Time T17. The timing chart in FIG. 22 shows the changes in potentials during a period from Time T12 to Time T17 of the node N[i,j], the node N[i,j+1], the node N[i+1,j], the node N[i+1,j+1], the node Nref[i], the node Nref[i+1], the wiring RW[i], and the wiring RW[i+1] and the amounts of the current $\Sigma I[i,j]$, the current $\Sigma I[i,j+1]$, and the current $I_{Bref}$. Note that each of the potentials of the wirings WW[i], WW[i+1], ORP, OSP, ORM, and OSM remains the low-level potential, and each of the potentials of the wirings WD[j], WD[j+1], and WDref remains a ground potential; thus, the potential changes in the wirings WW[i], WW[i+1], WD[j], WD[j+1], WDref, ORP, OSP, ORM, and OSM are not shown in the timing chart in FIG. 22. The timing chart in FIG. 22 also shows the changes in the current $\Delta I_B[j]$ and the current $\Delta I_B[j+1]$, which will be described later.

<<Period from Time T01 to Time T02>>

During a period from Time T01 to Time T02, the high-level potential (denoted by High in FIG. 20) is supplied to the wiring WW[i], and the low-level potential (denoted by Low in FIG. 20) is supplied to the wiring WW[i+1]. Furthermore, a potential higher than the ground potential (denoted by GND in FIG. 20) by $V_{PR}-V_X[i,j]$ is supplied to the wiring WD[j], the potential higher than the ground potential by $V_{PR}-V_X[i,j+1]$ is supplied to the wiring WD[j+1], and a potential higher than the ground potential by $V_{PR}$ is supplied to the wiring WDref. Moreover, a reference potential (denoted by REFP in FIG. 20) is supplied to the wiring RW[i] and the wiring RW[i+1].

The potential $V_X[i,j]$ and the potential $V_X[i,j+1]$ each correspond to the first analog data. The potential $V_{PR}$ corresponds to the reference analog data.

In this period, the high-level potential is supplied to the gates of the transistors Tr11 in the memory cell AM[i,j], the memory cell AM[i,j+1], and the memory cell AMref[i]; accordingly, the transistors Tr11 in the memory cell AM[i,j], the memory cell AM[i,j+1], and the memory cell AMref[i] are turned on. Thus, in the memory cell AM[i,j], the wiring WD[j] and the node N[i,j] are electrically connected to each other, and the potential of the node N[i,j] is $V_{PR}-V_X[i,j]$. Similarly, in the memory cell AM[i,j+1], the wiring WD[j+1] and the node N[i,j+1] are electrically connected to each other, and the potential of the node N[i,j+1] is $V_{PR}-V_X[i,j+1]$. In the memory cell AMref[i], the wiring WDref and the node Nref[i] are electrically connected to each other, and the potential of the node Nref[i] is $V_{PR}$.

A current flowing from the first terminal to the second terminal of the transistor Tr12 in each of the memory cell AM[i,j], the memory cell AM[i,j+1], and the memory cell AMref[i] will be described. The current $I_0[i,j]$ flowing from the wiring B[i] to the second terminal of the transistor Tr12 in the memory cell AM[i,j] through the first terminal thereof can be expressed by the following formula.

[Formula 7]

$$I_0[i,j] = k(V_{PR} - V_X[i,j] - V_{th})^2 \quad (E1)$$

In the formula, k is a constant determined by the channel length, the channel width, the mobility, the capacitance of a gate insulating film, and the like of the transistor Tr12. Furthermore, $V_{th}$ is the threshold voltage of the transistor Tr12.

At this time, the current flowing from the output terminal OT[j] of the column output circuit OUT[j] to the wiring B[j] is $I_0[i,j]$.

Similarly, the current $I_0[i,j+1]$ flowing from the wiring B[j+1] to the second terminal of the transistor Tr12 in the memory cell AM[i,j+1] through the first terminal thereof can be expressed by the following formula.

[Formula 8]

$$I_0[i,j+1] = k(V_{PR} - V_X[i,j+1] - V_{th})^2 \quad (E2)$$

At this time, the current flowing from the output terminal OT[j+1] of the column output circuit OUT[j+1] to the wiring B[j+1] is $I_0[i,j+1]$.

The current $I_{ref0}[i]$ flowing from the wiring Bref to the second terminal of the transistor Tr12 in the memory cell AMref[i] through the first terminal thereof can be expressed by the following formula.

[Formula 9]

$$I_{ref0}[i] = k(V_{PR} - V_{th})^2 \quad (E3)$$

At this time, the current flowing from the output terminal OTref of the reference column output circuit Cref to the wiring Bref is $I_{ref0}[i]$.

Note that since the low-level potential is supplied to the gates of the transistors Tr11 in the memory cell AM[i+1,j], the memory cell AM[i+1,j+1], and the memory cell AMref[i+1], the transistors Tr11 in the memory cell AM[i+1,j], the memory cell AM[i+1,j+1], and the memory cell AMref[i+1] are turned off. Thus, the potentials are not held at the node N[i+1,j], the node N[i+1,j+1], and the node Nref[i+1].

<<Period from Time T02 to Time T03>>

During a period from Time T02 to Time T03, the low-level potential is supplied to the wiring WW[i]. At this time, the low-level potential is supplied to the gates of the transistors Tr11 in the memory cell AM[i,j], the memory cell AM[i,j+1], and the memory cell AMref[i], and accordingly, the transistors Tr11 in the memory cells AM[i,j], AM[i,j+1], and AMref[i] are turned off.

The low-level potential has been supplied to the wiring WW[i+1] continuously since before Time T02. Thus, the transistors Tr11 in the memory cell AM[i+1,j], the memory cell AM[i+1,j+1], and the memory cell AMref[i+1] have been kept in an off state since before Time T02.

Since the transistors Tr11 in the memory cell AM[i,j], the memory cell AM[i,j+1], the memory cell AM[i+1,j], the memory cell AM[i+1,j+1], the memory cell AMref[i], and the memory cell AMref[i+1] are each in an off state as described above, the potentials at the node N[i,j], the node N[i,j+1], the node N[i+1,j], the node N[i+1, j+1], the node Nref[i], and the node Nref[i+1] are held in a period from Time T02 to Time T03.

In particular, when an OS transistor is used as each of the transistors Tr11 in the memory cell AM[i,j], the memory cell AM[i,j+1], the memory cell AM[i+1,j], the memory cell AM[i+1,j+1], the memory cell AMref[i], and the memory cell AMref[i+1] as described in the circuit configuration of the product-sum operation circuit 700, the amount of leakage current flowing between the source and the drain of each of the transistors Tr11 can be made small, which makes it possible to hold the potentials at the nodes for a long time.

During the period from Time T02 to Time T03, the ground potential is supplied to the wiring WD[j], the wiring WD[j+1], and the wiring WDref Since the transistors Tr11 in the memory cell AM[i,j], the memory cell AM[i,j+1], the memory cell AM[i+1,j], the memory cell AM[i+1,j+1], the memory cell AMref[i], and the memory cell AMref[i+1] are each in an off state, the potentials held at the nodes in the memory cell AM[i,j], the memory cell AM[i,j+1], the memory cell AM[i+1,j], the memory cell AM[i+1,j+1], the memory cell AMref[i], and the memory cell AMref[i+1] are not rewritten by supplying potentials from the wiring WD[j], the wiring WD[j+1], and the wiring WDref.

<<Period from Time T03 to Time T04>>

During a period from Time T03 to Time T04, the low-level potential is supplied to the wiring WW[i], and the high-level potential is supplied to the wiring WW[i+1]. Furthermore, the potential higher than the ground potential by $V_{PR}-V_X[i+1,j]$ is supplied to the wiring WD[j], the potential higher than the ground potential by $V_{PR}-V_X[i+1,j+1]$ is supplied to the wiring WD[j+1], and the potential higher than the ground potential by $V_{PR}$ is supplied to the wiring WDref. Moreover, the reference potential has continuously been supplied to the wiring RW[i] and the wiring RW[i+1] since Time T02.

Note that the potential $V_X[i+1,j]$ and the potential $V_X[i+1,j+1]$ are each a potential corresponding to the first analog data.

In this period, the high-level potential is supplied to the gates of the transistors Tr11 in the memory cell AM[i+1,j], the memory cell AM[i+1,j+1], and the memory cell AMref[i+1], and accordingly, the transistors Tr11 in the memory cell AM[i+1,j], the memory cell AM[i+1,j+1], and the memory cell AMref[i+1] are each turned on. Thus, in the memory cell AM[i+1,j], the node N[i+1,j] and the wiring WD[j] are electrically connected to each other, and the potential of the node N[i+1,j] becomes $V_{PR}-V_X[i+1,j]$. Similarly, in the memory cell AM[i+1,j+1], the wiring WD[j+1] and the node N[i+1,j+1] are electrically connected to each other, and the potential of the node N[i+1,j+1] becomes $V_{PR}-V_X[i+1,j+1]$. In the memory cell AMref[i+1], the wiring WDref and the node Nref[i+1] are electrically connected to each other, and the potential of the node Nref[i+1] becomes $V_{PR}$.

The current flowing from the first to second terminal of the transistor Tr12 in each of the memory cell AM[i+1,j], the memory cell AM[i+1,j+1], and the memory cell AMref[i+1] is considered. The current $I_0[i+1,j]$ flowing from the wiring B[j] to the second terminal of the transistor Tr12 in the memory cell AM[i+1,j] through the first terminal thereof can be expressed by the following formula.

[Formula 10]

$$I_0[i+1,j]=k(V_{PR}-V_X[i+1,j]-V_{th})^2 \quad (E4)$$

At this time, the current flowing from the output terminal OT[j] of the column output circuit OUT[L] to the wiring B[i] is $I_0[i,j]+I_0[i+1,j]$.

Similarly, the current $I_0[i+1,j+1]$ flowing from the wiring B[j+1] to the second terminal of the transistor Tr12 in the memory cell AM[i+1,j+1] through the first terminal thereof can be expressed by the following formula.

[Formula 11]

$$I_0[i+1,j+1]=k(V_{PR}-V_X[i+1,j+1]-V_{th})^2 \quad (E5)$$

At this time, the current flowing from the wiring B[j+1] to the second terminal of the transistor Tr12 in the memory cell AM[i+1,j+1] through the first terminal thereof is $I_0[i,j+1]+I_0[i+1,j+1]$.

The current $I_{ref0}[i+1]$ flowing from the wiring Bref to the second terminal of the transistor Tr12 in the memory cell AMref[i+1] through the first terminal thereof can be expressed by the following formula.

[Formula 12]

$$I_{ref0}[i+1]=k(V_{PR}-V_{th})^2 \quad (E6)$$

At this time, the current flowing from the output terminal OTref of the reference column output circuit Cref to the wiring Bref is $I_{ref0}[i]+I_{ref0}[i+1]$.

<<Period from Time T04 to Time T05>>

During a period from Time T04 to Time T05, the potential corresponding to the first analog data is written to the rest of the memory cells AM, and the potential $V_{PR}$ is written to the rest of memory cells AMref, in a manner similar to that of the operation during the period from Time T01 to Time T02 or that of the operation during the period from Time T03 to Time T04. Thus, the total amount of currents flowing in the transistors Tr12 in all of the memory cells AM corresponds to the amount of current flowing from the output terminal OT[j] of the column output circuit OUT[j] to the wiring B[j] that is denoted by $\Sigma I_0[i,j]$ ($\Sigma I_0[i,j]$ represents the summation of the current $I_0[i,j]$ over i from 1 to m).

Here, the description will be made with a focus on the reference column output circuit Cref. The wiring OLref of the reference column output circuit Cref is electrically connected to the wiring Bref via the output terminal OTref; thus, current flowing through the wiring Bref is current flowing through the wiring OLref. The total amount of current flowing through the transistors Tr12 in the memory cells AMref[1] to AMref[m] flows into the wiring Bref That is, the current $I_{Bref}$, which is the current $\Sigma I_{ref0}[i]$, flows into the wiring Bref (here, $\Sigma I_{ref0}[i]$ is the summation of $I_{ref0}[i]$ over i from 1 to m); thus, the current also flows through the wiring OLref In the current mirror circuit CM, the current is output in the direction from the first terminal of the transistor Tr9 to the node NCMref in accordance with the potential of the node NCMref.

Although the current flowing through the wiring ILref is denoted by $I_{CMref}$ in FIG. 18, the current flowing through the wiring ILref before Time T09 is denoted by $I_{CMref}$ in this specification.

Thus, the current $I_{CMref0}$ flowing through the wiring ILref can be expressed by the following formula.

[Formula 13]

$$I_{CMref0} = I_{Bref} = \sum_i I_{ref0}[i] \quad (E7)$$

Note that since the potential of the gate of the transistor Tr9 (the potential of the node NCMref) is used as a reference in the current mirror circuit CM, the current $I_{CMref0}$ also flows in the wirings IL[1] to IL[n] of the column output circuits OUT[1] to OUT[n].

<<Period from Time T06 to Time T07>>

A period from Time T06 to Time T11 will be described with reference to FIG. 21. During the period from Time T06 to Time T07, the wiring ORP is set at the high-level potential, and the wiring ORM is set at the high-level potential. At this time, the high-level potential is supplied to the gates of the transistors Tr3 in the column output circuits OUT[1] to OUT[n], so that the transistors Tr3 are turned on. Thus, the low-level potential is supplied to the first terminals of the capacitors C1 in the column output circuits OUT[1] to OUT[n], and thus the potentials of the capacitors C1 are initialized. Moreover, the high-level potential is supplied to the gates of the transistors Tr23 in the column output circuits OUT[1] to OUT[n], so that the transistors Tr23 are turned on. Thus, the high-level potential is supplied to the first terminals of the capacitors C3 in the column output circuits OUT[1] to OUT[n], and thus the potentials of the capacitors C3 are initialized. When Time T06 starts, the low-level potential is supplied to the wiring OSP, so that the transistors Tr2 in the column output circuits OUT[1] to OUT[n] are turned off, and the low-level potential is supplied to the wiring OSM, so that the transistors Tr22 in the column output circuits OUT[1] to OUT[n] are turned off.

<<Period from Time T07 to Time T08>>

During a period from Time T07 to Time T08, the wirings ORP and ORM are each set at the low-level potential. At this time, the low-level potential is supplied to the gates of the transistors Tr3 in the column output circuits OUT[1] to OUT[n], so that the transistors Tr3 are turned off. Furthermore, the low-level potential is supplied to the gates of the transistors Tr23 in the column output circuits OUT[1] to OUT[n], so that the transistors Tr23 are turned off.

<<Period from Time T08 to Time T09>>

During a period from Time T08 to Time T09, the wiring OSP is set at the high-level potential. At this time, the high-level potential is supplied to the gates of the transistors Tr2 in the column output circuits OUT[1] to OUT[n], so that the transistors Tr2 are turned on. The current $I_B[j]$ output from the column output circuit OUT[j] is $\Sigma I_0[i,j]$ (here, $\Sigma I_0[i,j]$ is the summation of $I_0[i,j]$ over i from 1 to m). When the current $I_{CMref0}$ is greater than the current $I_B[j]$, current flows into the first terminals of the capacitors C1 from the first terminals of the transistors Tr2 through the second terminals of the transistors Tr2, and positive potentials are held in the capacitors C1. Thus, the potentials of the gates of the transistors Tr1 are held, so that the current depending on the potential of the gate of each of the transistors Tr1 flows between the source and the drain of the transistor Tr1.

When Time T09 starts, the low-level potential is supplied to the wiring OSP, so that the transistors Tr2 in the column output circuits OUT[1] to OUT[n] are turned off. The potentials of the gates of the transistors Tr1 are held in the capacitors C1, so that even after Time T09, the same amount of current keeps flowing between the source and the drain of each of the transistors Tr1.

<<Period from Time T10 to Time T11>>

During a period from Time T10 to Time T11, the wiring OSM is set at the high-level potential. At this time, the high-level potential is supplied to the gates of the transistors Tr22 in the column output circuits OUT[1] to OUT[n], so that the transistors Tr22 are turned on. The current $I_B[j]$ output from the column output circuit OUT[j] is $\Sigma I_0[i,j]$ (here, $\Sigma I_0[i,j]$ is the summation of $I_0[i,j]$ over i from 1 to m). When the current $I_{CMref0}$ is smaller than the current $I_B[j]$, the current flows into the first terminals of the transistors Tr22 from the first terminals of the capacitors C3 through the second terminals of the transistors Tr22, and potentials are held in the capacitors C3. Thus, the potentials of the gates of the transistors Tr21 are held, so that the current depending on the potential of the gate of each of the transistors Tr21 flows between the source and the drain of the transistor Tr21.

When Time T11 starts, the low-level potential is supplied to the wiring OSM, so that the transistors Tr22 in the column output circuits OUT[1] to OUT[n] are turned off. The potentials of the gates of the transistors Tr21 are held in the capacitors C3, so that even after Time T11, the same amount of current keeps flowing between the source and the drain of each of the transistors Tr21.

Note that in the timing chart in FIG. 21, the operation for switching the conducting and non-conducting states of the transistor Tr2 (during the period from Time T08 to Time T09) is performed before the operation for switching the conducting and non-conducting states of the transistor Tr22 (during the period from Time T10 to Time T11); however, the order of the operation of the offset circuit 751 is not limited thereto. For example, the operation for switching the conducting and non-conducting states of the transistor Tr22 (during the period from Time T10 to Time T11) may be performed first, and then the operation for switching the conducting and non-conducting states of the transistor Tr2 (during the period from Time T08 to Time T09) may be performed.

Here, the description will be made with a focus on the column output circuit OUT[/] during a period from Time T06 to Time T12 (shown in FIG. 22). In the column output circuit OUT[j], the current flowing between the source and the drain of the transistor Tr1 is denoted by $I_{CP}[i]$, and the current flowing between the source and the drain of the transistor Tr21 of the constant current circuit CI (current flowing from the terminal CT2 to the terminal CT5[j]) is denoted by $I_C[i]$. The current flowing between the source and the drain of the transistor Tr8 through the current mirror circuit CM is $I_{CMref0}$. On the assumption that the current is not output from the output terminal SPT[j] during the period from Time T01 to Time T12, the sum of the amounts of current flowing through each of the transistors Tr12 in the memory cells AM[1,j] to AM[n,j] flows in the wiring B[j] electrically connected to the column output circuit OUT[j]. During the period from Time T06 to Time T12, in the column output circuit OUT[j], the current $I_{CMref0}$ that is input is different from $\Sigma I_0[i,j]$ that is output, the current $I_C[j]$ flowing from the second terminal of the transistor Tr21 is supplied to the wiring OL[j], or the current $I_{CP}[j]$ flowing from the wiring OL[j] is supplied to the first terminal of the transistor Tr1. Thus, the above satisfies the following formula.

[Formula 14]

$$I_{CMref0} + I_C[j] - I_{CP}[j] = \sum_i I_0[i,j] \quad (E8)$$

<<Period from Time T12 to Time T13>>

The operation after Time T12 will be described with reference to FIG. 22. During a period from Time T12 to Time T13, a potential higher than the reference potential (denoted by REFP in FIG. 22) by $V_W[i]$ is supplied to the wiring RW[i]. At this time, the potential $V_W[i]$ is supplied to the second terminals of the capacitors C2 in the memory cells AM[i,1] to AM[i,n] and the memory cell AMref[i], so that the potentials of the gates of the transistors Tr12 increase.

Note that the potential $V_W[i]$ is a potential corresponding to the second analog data.

An increase in the potential of the gate of the transistor Tr12 corresponds to the potential obtained by multiplying a change in potential of the wiring RW[i] by a capacitive coupling coefficient determined by the memory cell configuration. The capacitive coupling coefficient is calculated on the basis of the capacitance of the capacitor C2, the gate capacitance of the transistor Tr2, and the parasitic capacitance. In this operation example, to avoid complexity of description, an increase in potential of the wiring RW[i] is equal to an increase in potential of the gate of the transistor Tr12, which corresponds to a case where the capacitive coupling coefficient in each of the memory cells AM and the memory cell AMref is set to 1.

When the potential $V_W[i]$ is supplied to the second terminals of the capacitors C2 in the memory cell AM[i,j], the memory cell AM[i,j+1], and the memory cell AMref[i] on the assumption that the capacitive coupling coefficient is 1, the potentials of the node N[i,j], the node N[i,j+1], and the node Nref[i] each increase by $V_W[i]$.

The current flowing from the first to second terminal of the transistor Tr12 in each of the memory cell AM[i,j], the memory cell AM[i,j+1], and the memory cell AMref[i] will be described. The current I[i,j] flowing from the wiring B[j] to the second terminal of the transistor Tr12 in the memory cell AM[i,j] through the first terminal thereof can be expressed by the following formula.

[Formula 15]

$$I[i,j]=k(V_{PR}-V_X[i,j]+V_W[i]-V_{th})^2 \quad (E9)$$

In other words, by supplying the potential $V_W[i]$ to the wiring RW[i], the current flowing from the wiring B[j] to the second terminal of the transistor Tr12 in the memory cell AM[i,j] through the first terminal thereof increases by I[i, j]−$I_0$[i,j] (denoted by ΔI[i,j] in FIG. 22).

Similarly, the current I[i,j+1] flowing from the wiring B[j+1] to the second terminal of the transistor Tr12 in the memory cell AM[i,j+1] through the first terminal thereof can be expressed by the following formula.

[Formula 16]

$$I[i,j+1]=k(V_{PR}-V_X[i,j+1]+V_W[i]-V_{th})^2 \quad (E10)$$

In other words, by supplying the potential $V_W[i]$ to the wiring RW[i], the current flowing from the wiring B[j+1] to the second terminal of the transistor Tr12 in the memory cell AM[i,j+1] through the first terminal thereof increases by I[i,j+1]−I$_0$[i,j+1] (denoted by ΔI[i,j+1] in FIG. 22).

Furthermore, the current I$_{ref}$[i] flowing from the wiring Bref to the second terminal of the transistor Tr12 in the memory cell AMref[i] through the first terminal thereof can be expressed by the following formula.

[Formula 17]

$$I_{ref}[i] = k(V_{PR} + V_W[i] - V_{th})^2 \tag{E11}$$

In other words, by supplying the potential V$_W$[i] to the wiring RW[i], the current flowing from the wiring Bref to the second terminal of the transistor Tr12 in the memory cell AMref[i] through the first terminal thereof increases by I$_{ref}$[i]−I$_{ref0}$[i] (denoted by ΔI$_{ref}$[i] in FIG. 22).

Here, the description will be made with a focus on the reference column output circuit Cref. The total amount of current flowing through the transistors Tr12 in the memory cells AMref[1] to AMref[m] flows into the wiring Bref. The wiring OLref is electrically connected to the wiring Bref via the output terminal OTref, and thus the current I$_{Bref}$, which is the current ΣI$_{ref}$[i], flows through the wiring OLref In the current mirror circuit CM, the current is output in the direction from the first terminal of the transistor Tr9 to the node NCMref in accordance with the potential of the node NCMref.

Thus, the current I$_{CMref}$ flowing from the wiring ILref through the terminal CT8 in the current mirror circuit CM can be expressed by the following formula.

[Formula 18]

$$I_{CMref} = \sum_i I_{ref}[i] \tag{E12}$$

Here, the current ΔI$_B$[j] that is output from the wiring B[j] will be described. During the period from Time T11 to Time T12, Formula (E8) is satisfied, and the current ΔI$_B$[j] is not output from the terminal SPT[j] that is electrically connected to the wiring B[j].

During the period from Time T12 to Time T13, a potential higher than the reference potential by V$_W$[i] is supplied to the wiring RW[i], and the current flowing between the source and the drain of the transistor Tr12 in the memory cell AM[i,j] changes. Then, the current ΔI$_B$[j] is output from the output terminal SPT[i] that is electrically connected to the wiring B[i]. Specifically, in the column output circuit OUT [j], the current I$_C$[i] is output from the terminal CT2 of the constant current circuit CI, the current I$_{CM}$ flows between the source and the drain of the transistor Tr8, and the current I$_{CP}$[j] flows between the source and the drain of the transistor Tr1. Thus, the current ΔI$_B$[j] can be expressed by the following formula using ΣI[i,j], which is the summation of current I[i,j] over i from 1 to m. Here, the current I[i,j] is current flowing between the source and the drain of the transistor Tr12 in the memory cell AM[i,j].

[Formula 19]

$$\Delta I_B[j] = (I_C[j] + I_{CMref} - I_{CP}[j]) - \sum_i I[i,j] \tag{E13}$$

Formulae (E1), (E3), (E7) to (E9), (E11), and (E12) are used in Formula (E13), so that the following formula can be obtained.

[Formula 20]

$$\Delta I_B[j] = 2k \sum_i (V_X[i,j] V_W[i]) \tag{E14}$$

According to Formula (E14), the current ΔI$_B$[j] is a value corresponding to the sum of products of the potential V$_X$[i,j] that is the first analog data and the potential V$_W$[i] that is the second analog data. That is, when the current ΔI$_B$[j] is calculated, the value of the sum of products of the first analog data and the second analog data can be obtained.

During the period from Time T12 to Time T13, when all of the wirings RW[1] to RW[m] except the wiring RW[i] are set to have a reference potential, the relation, V$_W$[g]=0 (here, g is an integer that is greater than or equal to 1 and less than or equal to m and not i), is satisfied. Thus, according to Formula (E14), ΔI$_B$[j]=2 kV$_X$[i,j]V$_W$[i] is output. In other words, the data corresponding to the product of the first analog data stored in the memory cell AM[i,j] and the second analog data corresponding to a selection signal supplied to the wiring RW[i] is output from the output terminal SPT[j] that is electrically connected to the wiring B[i].

Furthermore, similarly, a differential current that is output from the output terminal SPT[j+1] electrically connected to the wiring B[j+1] is expressed as ΔI$_B$[j+1]=2 kV$_X$[i,j+1]V$_W$[i]. The data corresponding to the product of the first analog data stored in the memory cell AM[i,j+1] and the second analog data corresponding to a selection signal supplied to the wiring RW[i] is output from the output terminal SPT[i+1] that is electrically connected to the wiring B[i+1].

<<Period from Time T13 to Time T14>>

During a period from Time T13 to Time T14, the ground potential is supplied to the wiring RW[i]. The ground potential is supplied to the second terminals of the capacitors C2 in the memory cells AM[i,1] to AM[i,n] and the memory cell AMref[i]. Thus, the potentials of the nodes N[i,1] to N[i,n] and the node Nref[i] return to the potentials during the period from Time T11 to Time T12.

<<Period from Time T14 to Time T15>>

During a period from Time T14 to Time T15, the wirings RW[1] to RW[m] except the wiring RW[i+1] are set to have the reference potential, and a potential higher than the reference potential by V$_W$[i+1] is supplied to the wiring RW[i+1]. At this time, as in the operation during the period from Time T12 to Time T13, the potential V$_W$[i+1] is supplied to the second terminals of the capacitors C2 in the memory cells AM[i+1,1] to AM[i+1,n] and the memory cell AMref[i+1], so that the potentials of the gates of the transistors Tr12 increase.

The potential V$_W$[i+1] corresponds to the second analog data.

As described above, the capacitive coupling coefficients of the memory cells AM and the memory cell AMref are each 1. When the potential V$_W$[i+1] is supplied to the second terminals of the capacitors C2 in the memory cell AM[i+1,j], the memory cell AM[i+1,j+1], and the memory cell AMref [i+1], the potentials of the node N[i+1,j], the node N[i+1, j+1], and the node Nref[i+1] each increase by V$_W$[i+1].

When the potentials of the node N[i+1,j], the node N[i+1,j+1], and the node Nref[i+1] increase by V$_W$[i+1], the amount of current flowing in each of the transistors Tr12 in the memory cell AM[i+1,j], the memory cell AM[i+1,j+1], and the memory cell AMref[i+1] increases. When the current flowing in the transistor Tr12 in the memory cell AM[i+1,j] is denoted by I[i+1,j], the current flowing from the output terminal OT[j] of the column output circuit OUT[j] to the wiring B[j] increases by I[i+1,j]−I$_0$[i+1,j] (denoted by ΔI[i+1,j] in FIG. 22). Similarly, when the current flowing in the transistor Tr12 in the memory cell AM[i+1,j+1] is denoted by I[i+1,j+1], the current flowing from the output terminal OT[i+1] of the column output circuit OUT[j+1] to the wiring B[i+1] increases by I[i+1,j+1]−I$_0$[i+1,j+1] (denoted by ΔI[i+1,j+1] in FIG. 22). When the current flowing in the transistor Tr12 in the memory cell AMref[i+1] is denoted by I$_{ref}$[i+1], the current flowing from the output terminal OTref of the reference column output circuit Cref to the wiring Bref increases by I$_{ref}$[i+1]−I$_{ref0}$[i+1] (denoted by ΔI$_{ref}$[i+1] in FIG. 22).

The operation during the period from Time T14 to Time T15 can be similar to the operation during the period from Time T12 to Time T13. Thus, when Formula (E14) is applied to the operation during the period from Time T14 to Time T15, the differential current that is output from the wiring B[i] is expressed as ΔI$_B$[j]=2 kV$_X$[i+1,j]V$_W$[i+1]. In other words, the data corresponding to the product of the first analog data stored in the memory cell AM[i+1,j] and the second analog data corresponding to a selection signal supplied to the wiring RW[i+1] is output from the output terminal SPT[j] that is electrically connected to the wiring B[j].

Furthermore, similarly, the differential current that is output from the wiring B[j+1] is expressed as ΔI$_B$[U+l]=2 kV$_X$[i+1,j+1]V$_W$[i+1]. The data corresponding to the product of the first analog data stored in the memory cell AM[i+1,j+1] and the second analog data corresponding to a selection signal supplied to the wiring RW[i+1] is output from the output terminal SPT[j+1] that is electrically connected to the wiring B[j+1].

<<Period from Time T15 to Time T16>>

During a period from Time T15 to Time T16, the ground potential is supplied to the wiring RW[i+1]. In this period, the ground potential is supplied to the second terminals of the capacitors C2 in the memory cells AM[i+1,1] to AM[i+1,n] and the memory cell AMref[i+1], and the potentials of nodes N[i+1,1] to N[i+1,n] and the node Nref[i+1] return to the potentials in the period from Time T13 to Time T14.

<<Period from Time T16 to Time T17>>

During a period from Time T16 to Time T17, the wirings RW[1] to RW[m] except the wiring RW[i] and the wiring RW[i+1] are set to have the reference potential, a potential higher than the reference potential by V$_{W2}$[i] is supplied to the wiring RW[i], and a potential lower than the reference potential by V$_{W2}$[i+1] is supplied to the wiring RW[i+1]. At this time, as in the operation during the period from Time T12 to Time T13, the potential V$_{W2}$[i] is supplied to the second terminals of the capacitors C2 in the memory cells AM[i,1] to AM[i,n] and the memory cell AMref[i], so that potentials of the gates of the transistors Tr12 in the memory cells AM[i,1] to AM[i,n] and the memory cell AMref[i] increase. Concurrently, the potential −V$_{W2}$[i+1] is supplied to the second terminals of the capacitors C2 in the memory cells AM[i+1,1] to AM[i+1,n] and the memory cell AMref[i+1], so that the potentials of the gates of the transistors Tr12 in the memory cells AM[i+1,1] to AM[i+1,n] and the memory cell AMref[i+1] decrease.

The potential V$_{W2}$[i] and the potential V$_{W2}$[i+1] are potentials each corresponding to the second analog data.

Note that the capacitive coupling coefficients of the memory cell AM and the memory cell AMref are each 1. When the potential V$_{W2}$[i] is supplied to the second terminals of the capacitors C2 in the memory cell AM[i,j], the memory cell AM[i,j+1], and the memory cell AMref[i], the potentials of the node N[i,j], the node N[i,j+1], and the node Nref[i] each increase by V$_{W2}$[i]. When the potential −V$_{W2}$[i+1] is supplied to the second terminals of the capacitors C2 in the memory cell AM[i+1,j], the memory cell AM[i+1,j+1], and the memory cell AMref[i+1], the potentials of the node N[i+1,j], the node N[i+1,j+1], and the node Nref[i+1] each decrease by V$_{W2}$[i+1].

When each of the potentials of the node N[i,j], the node N[i,j+1], and the node Nref[i] increases by V$_{W2}$[i], the amount of current flowing in each of the transistors Tr12 in the memory cell AM[i,j], the memory cell AM[i,j+1], and the memory cell AMref[i] increases. Here, the current flowing in the transistor Tr12 in the memory cell AM[i,j] is denoted by I[i,j], the current flowing in the transistor Tr12 in the memory cell AM[i,j+1] is denoted by I[i,j+1], and the current flowing in the transistor Tr12 in the memory cell AMref[i] is denoted by I$_{ref}$[i].

When the potentials of the node N[i+1,j], the node N[i+1,j+1], and the node Nref[i+1] each decrease by V$_{W2}$[i+1], the amount of current flowing in each of the transistors Tr12 in the memory cell AM[i+1,j], the memory cell AM[i+1,j+1], and the memory cell AMref[i+1] decreases. Here, the current flowing in the transistor Tr12 in the memory cell AM[i+1,j] is denoted by I$_2$[i,j], the current flowing in the transistor Tr12 in the memory cell AM[i+1,j+1] is denoted by I$_2$[i,j+1], and the current flowing in the transistor Tr12 in the memory cell AMref[i+1] is denoted by I$_{2ref}$[i+1].

At this time, the current flowing from the output terminal OT[j] of the column output circuit OUT[j] to the wiring B[j] increases by (I$_2$[i,j]−I$_0$[i,j])+(I$_2$[i+1,j]−I$_0$[i+1,j]) (denoted by ΔI[i] in FIG. 22). The current flowing from the output terminal OT[i+1] of the column output circuit OUT[j+1] to the wiring B[i+1] increases by (I$_2$[i,j+1]−I$_0$[i,j+1])+(I$_2$[i+1,j+1]−I$_0$[i+1,j+1]) (denoted by ΔI[i+1] in FIG. 22, which is a negative current). The current flowing from the output terminal OTref of the reference column output circuit Cref to the wiring Bref increases by (I$_{2ref}$[i]−I$_{ref0}$[i,j])+(I$_{2ref}$[i+1,j]−I$_{ref0}$[i+1,j]) (denoted by ΔI$_{Bref}$ in FIG. 22).

The operation during the period from Time T16 to Time T17 can be similar to the operation during the period from Time T12 to Time T13. When Formula (E14) is applied to the operation during the period from Time T16 to Time T17, the differential current that is output from the wiring B[j] is expressed as ΔI$_B$[j]=2k{V$_X$[i,j]V$_{W2}$[i]−V$_X$[i+1,j]V$_{W2}$[i+1]}. Thus, the data corresponding to the sum of products of the first analog data stored in each of the memory cell AM[i,j] and the memory cell AM[i+1,j] and the second analog data corresponding to a selection signal supplied to each of the wiring RW[i] and the wiring RW[i+1] is output from the output terminal SPT[j] that is electrically connected to the wiring B[j].

Furthermore, similarly, the differential current that is output from the wiring B[j+1] is expressed as ΔI$_B$[j+1]=2k{V$_X$[i,j+1]V$_{W2}$[i]−V$_X$[i+1,j+1]V$_{W2}$[i+1]}. The data corresponding to the product of the first analog data stored in each of the memory cell AM[i,j+1] and the memory cell AM[i+1,j+1] and the second analog data corresponding to a selection signal supplied to each of the wiring RW[i] and the wiring RW[i+1] is output from the output terminal SPT[j+1] that is electrically connected to the wiring B[j+1].

<<After Time T17>>

After Time T17, the ground potential is supplied to the wiring RW[i] and the wiring RW[i+1]. At this time, the ground potential is supplied to the second terminals of the capacitors C2 in the memory cells AM[i,1] to AM[i,n], the memory cells AM[i+1,1] to AM[i+1,n], the memory cell AMref[i], and the memory cell AMref[i+1]. Thus, the potentials of the nodes N[i,1] to N[i,n], the nodes N[i+1,1] to N[i+1,n], the node Nref[i], and the node Nref[i+1] return to the potentials in the period from Time T15 to Time T16.

Operation Example 2

An operation example that is different from Operation example 1 will be described. Note that the product-sum operation circuit 700 described in this operation example includes an offset circuit 750 shown in FIG. 23 as the offset circuit 710 and a memory cell array 760 shown in FIG. 17 as the memory cell array 720 of the product-sum operation circuit 700.

Figure 23:
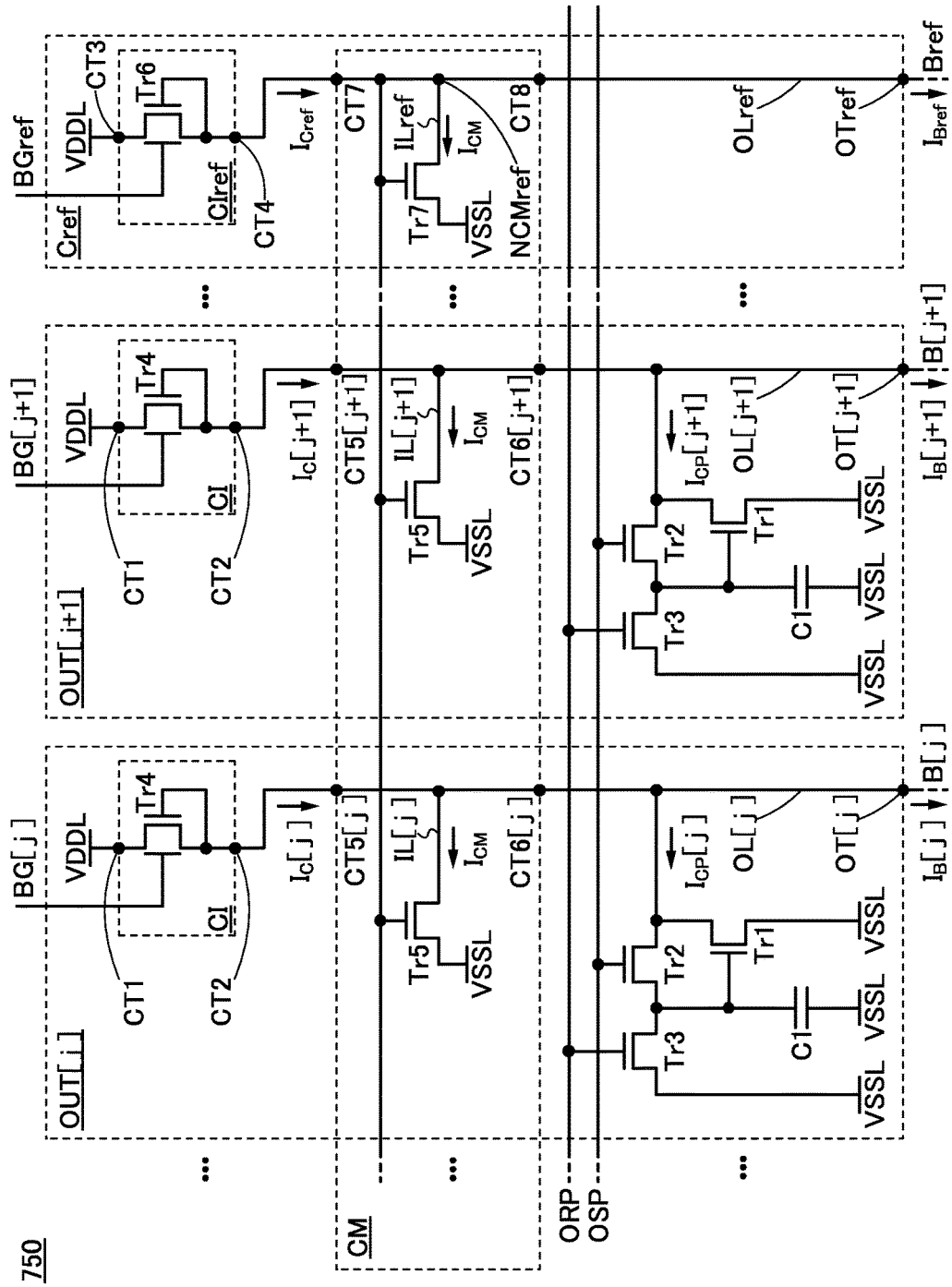
FIG. 23 is a circuit diagram illustrating an example of an offset circuit in the product-sum operation circuit in FIG. 11.

The offset circuit 750 shown in FIG. 23 has a circuit configuration where the constant current circuit CI and the constant current circuit CIref of the offset circuit 712 in FIG. 13 and the current mirror circuit CM of the offset circuit 713 in FIG. 15 are used. With use of the configuration shown in FIG. 23, all of the transistors in the offset circuit 750 can have the same polarity. For the description of this operation example, FIG. 23 shows the column output circuit OUT[j], a column output circuit OUT[j+1], and the reference column output circuit Cref.

In FIG. 23, $I_C$[j] denotes a current flowing from the first to second terminal of the transistor Tr4 in the constant current circuit CI of the column output circuit OUT[j], $I_C$[j+1] denotes a current flowing from the first to second terminal of the transistor Tr4 in the constant current circuit CI of the column output circuit OUT[j+1], and $I_{Cref}$ denotes a current flowing from the first to second terminal of the transistor Tr6 in the constant current circuit $CI_{ref}$ of the reference column output circuit Cref. In the current mirror circuit CM, $I_{CM}$ collectively denotes a current flowing to the first terminal of the transistor Tr5 through the wiring IL[L] in the column output circuit OUT[j], a current flowing to the first terminal of the transistor Tr5 through a wiring IL[j+1] in the column output circuit OUT[j+1], and a current flowing in the transistor Tr7 through the wiring ILref in the reference column output circuit Cref. Furthermore, $I_{CP}$[j] denotes a current flowing from the wiring OL[j] to the first terminal of the transistor Tr1 or Tr2 in the column output circuit OUT[j], and $I_{CP}$[j+1] denotes a current flowing from a wiring OL[j+1] to the first terminal of the transistor Tr1 or Tr2 in the column output circuit OUT[j+1]. Moreover, $I_B$[j] denotes a current output from the output terminal OT[j] of the column output circuit OUT[j] to the wiring B[j], $I_B$[j+1] denotes a current output from an output terminal OT[j+1] of the column output circuit OUT[j+1] to a wiring B[j+1], and $I_{Bref}$ denotes a current output from the output terminal $OT_{ref}$ of the reference column output circuit $C_{ref}$ to the wiring $B_{ref}$.

In this operation example, the memory cell array 760 in FIG. 19 described in Operation example 1 is used as the memory cell array 720. Thus, for the memory cell array 760 in this operation example, the description of Operation example 1 can be referred to.

Figure 24:
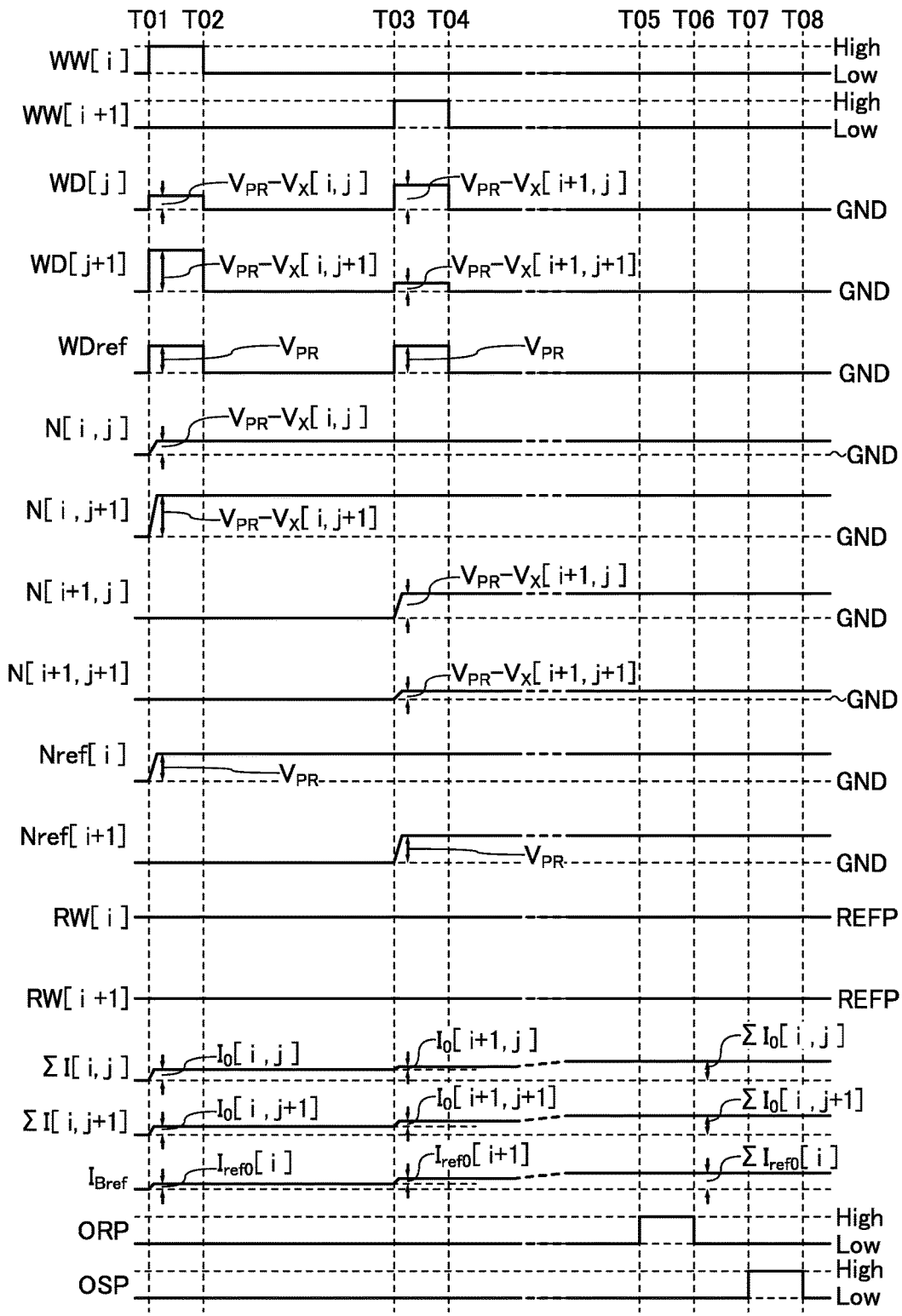
FIG. 24 is a timing chart showing an operation example of a product-sum operation circuit.
Figure 25:
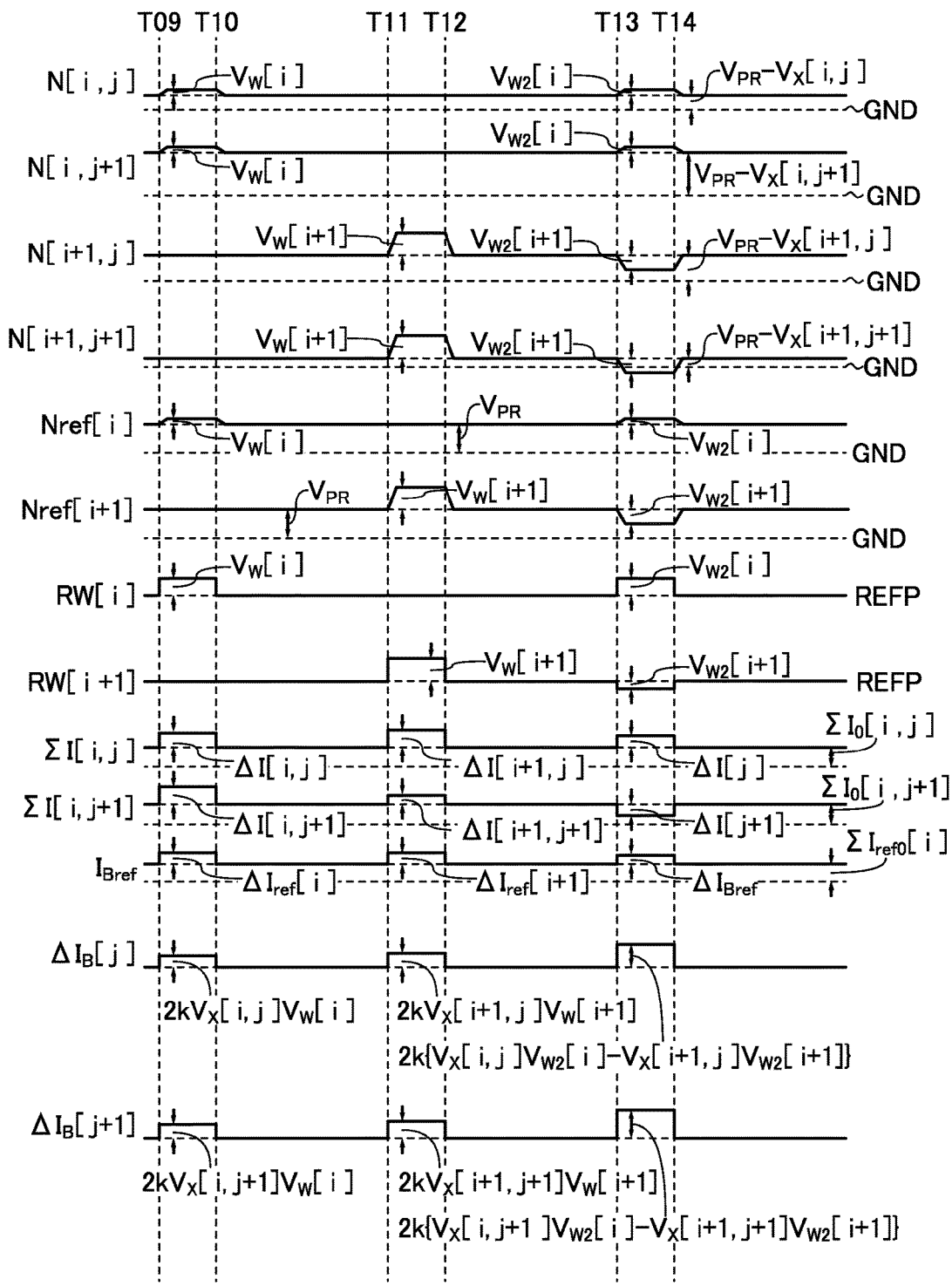
FIG. 25 is a timing chart showing an operation example of a product-sum operation circuit.

FIG. 24 and FIG. 25 are timing charts showing the operation example of the product-sum operation circuit 700. The timing chart in FIG. 24 shows changes in potentials from Time T01 to Time T08 of the wiring WW[i], a wiring WW[i+1], the wiring WD[j], a wiring WD[j+1], the wiring WDref, the node N[i,j], a node N[i,j+1], a node N[i+1,j], a node N[i+1,j+1], the node Nref[i], a node Nref[i+1], the wiring RW[i], a wiring RW[i+1], the wiring OSP, and the wiring ORP. This timing chart also shows the amount of changes in a current $\Sigma I[i,j]$, a current $\Sigma I[i,j+1]$, and a current $I_{Bref}$ from Time T01 to Time T08. Note that the current I[i,j] is the summation of current I[i,j] over i from 1 to m. Here, the current I[i,j] is current flowing in the transistor Tr12 in the memory cell AM[i,j]. The current $\Sigma I[i,j+1]$ is the summation of current I[i,j+1] over i from 1 to m. Here, the current I[i,j+1] is current flowing in the transistor Tr12 in the memory cell AM[i,j+1]. The operation example from Time T09 to Time T14 is shown in FIG. 25 as the rest of the operation shown in the timing chart in FIG. 24. At and after Time T09, the potentials of the wiring WW[i], the wiring WW[i+1], the wiring ORP, and the wiring OSP are kept at a low level without any change, and the potentials of the wiring WD[j], the wiring WD[j+1], and the wiring WDref are kept at a ground potential without any change. Thus, in the timing chart in FIG. 25, the changes in potentials of the wiring WW[i], the wiring WW[i+1], the wiring WD[j], the wiring WD[j+1], the wiring $WD_{ref}$, the wiring ORP, and the wiring OSP are not shown. Furthermore, the timing chart in FIG. 25 shows variations in the amount of current $\Delta I_B$[j] and the amount of current $\Delta I_B$[j+1] to be described later.

<<Period from Time T01 to Time T02>>

During a period from Time T01 to Time T02, the high-level potential (denoted by High in FIG. 24) is supplied to the wiring WW[i], and the low-level potential (denoted by Low in FIG. 24) is supplied to the wiring WW[i+1]. Furthermore, a potential higher than the ground potential (denoted by GND in FIG. 24) by $V_{PR}-V_X[i,j]$ is supplied to the wiring WD[j], the potential higher than the ground potential by $V_{PR}-V_X[i,j+1]$ is supplied to the wiring WD[j+1], and a potential higher than the ground potential by $V_{PR}$ is supplied to the wiring WDref. Moreover, a reference potential (denoted by REFP in FIG. 24) is supplied to the wiring RW[i] and the wiring RW[i+1].

The potential $V_X[i,j]$ and the potential $V_X[i,j+1]$ each correspond to the first analog data. The potential $V_{PR}$ corresponds to the reference analog data.

In this period, the high-level potential is supplied to the gates of the transistors Tr11 in the memory cell AM[i,j], the memory cell AM[i,j+1], and the memory cell AMref[i]; accordingly, the transistors Tr11 in the memory cell AM[i,j], the memory cell AM[i,j+1], and the memory cell AMref[i] are turned on. Thus, in the memory cell AM[i,j], the wiring WD[j] and the node N[i,j] are electrically connected to each other, and the potential of the node N[i,j] is $V_{PR}-V_X[i,j]$. Similarly, in the memory cell AM[i,j+1], the wiring WD[j+1] and the node N[i,j+1] are electrically connected to each other, and the potential of the node N[i,j+1] is $V_{PR}-V_X[i,j+1]$. In the memory cell AMref[i], the wiring WDref and the node Nref[i] are electrically connected to each other, and the potential of the node Nref[i] is $V_{PR}$.

A current flowing from the first terminal to the second terminal of the transistor Tr12 in each of the memory cell AM[i,j], the memory cell AM[i,j+1], and the memory cell AMref[i] will be described. The current $I_0[i,j]$ flowing from the wiring B[j] to the second terminal of the transistor Tr12 in the memory cell AM[i,j] through the first terminal thereof can be expressed by Formula (E1) as in Operation example 1.

At this time, the current flowing from the output terminal OT[j] of the column output circuit OUT[j] to the wiring B[j] is $I_0[i,j]$.

Similarly, the current $I_0[i,j+1]$ flowing from the wiring B[j+1] to the second terminal of the transistor Tr12 in the memory cell AM[i,j+1] through the first terminal thereof can be expressed by Formula (E2) as in Operation example 1.

At this time, the current flowing from the output terminal OT[j+1] of the column output circuit OUT[j+1] to the wiring B[j+1] is $I_0[i,j+1]$.

The current $I_{ref0}[i]$ flowing from the wiring Bref to the second terminal of the transistor Tr12 in the memory cell AMref[i] through the first terminal thereof can be expressed by Formula (E3) as in Operation example 1.

At this time, the current flowing from the output terminal OTref of the reference column output circuit Cref to the wiring Bref is $I_{ref0}[i]$.

Note that since the low-level potential is supplied to the gates of the transistors Tr11 in the memory cell AM[i+1,j], the memory cell AM[i+1,j+1], and the memory cell AMref[i+1], the transistors Tr11 in the memory cell AM[i+1,j], the memory cell AM[i+1,j+1], and the memory cell AMref[i+1] are turned off. Thus, the potentials are not held at the node N[i+1,j], the node N[i+1,j+1], and the node Nref[i+1].

<<Period from Time T02 to Time T03>>

During a period from Time T02 to Time T03, the low-level potential is supplied to the wiring WW[i]. At this time, the low-level potential is supplied to the gates of the transistors Tr11 in the memory cell AM[i,j], the memory cell AM[i,j+1], and the memory cell AMref[i], and accordingly, the transistors Tr11 in the memory cells AM[i,j], AM[i,j+1], and AMref[i] are turned off.

The low-level potential has been supplied to the wiring WW[i+1] continuously since before Time T02. Thus, the transistors Tr11 in the memory cell AM[i+1,j], the memory cell AM[i+1,j+1], and the memory cell AMref[i+1] have been kept in an off state since before Time T02.

Since the transistors Tr11 in the memory cell AM[i,j], the memory cell AM[i,j+1], the memory cell AM[i+1,j], the memory cell AM[i+1,j+1], the memory cell AMref[i], and the memory cell AMref[i+1] are each in an off state as described above, the potentials at the node N[i,j], the node N[i,j+1], the node N[i+1,j], the node N[i+1, j+1], the node Nref[i], and the node Nref[i+1] are held in a period from Time T02 to Time T03.

In particular, when an OS transistor is used as each of the transistors Tr1 in the memory cell AM[i,j], the memory cell AM[i,j+1], the memory cell AM[i+1,j], the memory cell AM[i+1,j+1], the memory cell AMref[i], and the memory cell AMref[i+1] as described in the circuit configuration of the product-sum operation circuit 700, the amount of leakage current flowing between the source and the drain of each of the transistors Tr11 can be made small, which makes it possible to hold the potentials at the nodes for a long time.

During the period from Time T02 to Time T03, the ground potential is supplied to the wiring WD[j], the wiring WD[j+1], and the wiring WDref Since the transistors Tr11 in the memory cell AM[i,j], the memory cell AM[i,j+1], the memory cell AM[i+1,j], the memory cell AM[i+1,j+1], the memory cell AMref[i], and the memory cell AMref[i+1] are each in an off state, the potentials held at the nodes in the memory cell AM[i,j], the memory cell AM[i,j+1], the memory cell AM[i+1,j], the memory cell AM[i+1,j+1], the memory cell AMref[i], and the memory cell AMref[i+1] are not rewritten by supplying potentials from the wiring WD[j], the wiring WD[j+1], and the wiring WDref.

<<Period from Time T03 to Time T04>>

During a period from Time T03 to Time T04, the low-level potential is supplied to the wiring WW[i], and the high-level potential is supplied to the wiring WW[i+1].

Furthermore, the potential higher than the ground potential by $V_{PR}-V_X[i+1,j]$ is supplied to the wiring WD[j], the potential higher than the ground potential by $V_{PR}-V_X[i+1,j+1]$ is supplied to the wiring WD[j+1], and the potential higher than the ground potential by $V_{PR}$ is supplied to the wiring WDref. Moreover, the reference potential has continuously been supplied to the wiring RW[i] and the wiring RW[i+1] since Time T02.

Note that the potential $V_X[i+1,j]$ and the potential $V_X[i+1,j+1]$ are each a potential corresponding to the first analog data.

In this period, the high-level potential is supplied to the gates of the transistors Tr11 in the memory cell AM[i+1,j], the memory cell AM[i+1,j+1], and the memory cell AMref[i+1], and accordingly, the transistors Tr11 in the memory cell AM[i+1,j], the memory cell AM[i+1,j+1], and the memory cell AMref[i+1] are each turned on. Thus, in the memory cell AM[i+1,j], the node N[i+1,j] and the wiring WD[j] are electrically connected to each other, and the potential of the node N[i+1,j] becomes $V_{PR}-V_X[i+1,j]$. Similarly, in the memory cell AM[i+1,j+1], the wiring WD[j+1] and the node N[i+1,j+1] are electrically connected to each other, and the potential of the node N[i+1,j+1] becomes $V_{PR}-V_X[i+1,j+1]$. In the memory cell AMref[i+1], the wiring WDref and the node Nref[i+1] are electrically connected to each other, and the potential of the node Nref[i+1] becomes $V_{PR}$.

The current flowing from the first to second terminal of the transistor Tr12 in each of the memory cell AM[i+1,j], the memory cell AM[i+1,j+1], and the memory cell AMref[i+1] is considered. The current $I_0[i+1,j]$ flowing from the wiring B[j] to the second terminal of the transistor Tr12 in the memory cell AM[i+1,j] through the first terminal thereof can be expressed by Formula (E4) as in Operation example 1.

At this time, the current flowing from the output terminal OT[j] of the column output circuit OUT[j] to the wiring B[j] is $I_0[i,j]+I_0[i+1,j]$.

Similarly, the current $I_0[i+1,j+1]$ flowing from the wiring B[j+1] to the second terminal of the transistor Tr12 in the memory cell AM[i+1,j+1] through the first terminal thereof can be expressed by Formula (E5) as in Operation example 1.

At this time, the current flowing from the output terminal OT[j+1] of the column output circuit OUT[j+1] to the wiring B[j+1] is $I_0[i,j+1]+I_0[i+1,j+1]$.

The current $I_{ref0}[i+1]$ flowing from the wiring Bref to the second terminal of the transistor Tr12 in the memory cell AMref[i+1] through the first terminal thereof can be expressed by Formula (E6) as in Operation example 1.

At this time, the current flowing from the output terminal OTref of the reference column output circuit Cref to the wiring Bref is $I_{ref0}[i]+I_{ref0}[i+1]$.

<<Period from Time T04 to Time T05>>

During a period from Time T04 to Time T05, the potential corresponding to the first analog data is written to the rest of the memory cells AM, and the potential $V_{PR}$ is written to the rest of memory cells AMref, in a manner similar to that of the operation during the period from Time T01 to Time T02 or that of the operation during the period from Time T03 to Time T04. Thus, the total amount of currents flowing in the transistors Tr12 in all of the memory cells AM corresponds to the amount of current flowing from the output terminal OT[j] of the column output circuit OUT[j] to the wiring B[j] that is denoted by $\Sigma I_0[i,j]$ ($\Sigma I_0[i,j]$ represents the summation of the current $I_0[i,j]$ over i from 1 to m).

Here, the description will be made with a focus on the reference column output circuit Cref. The total amount of current flowing through the transistors Tr12 in the memory cells AMref[1] to AMref[m] flows into the wiring Bref of the reference column output circuit Cref That is, the current $I_{Bref}$, which is the current $\Sigma I_{ref0}[i]$, flows into the wiring Bref (here, $\Sigma I_{ref0}[i]$ is the summation of $I_{ref0}[i]$ over i from 1 to m).

Although the current flowing through the wiring ILref is denoted by $I_{CM}$ in FIG. 23, the current flowing through the wiring ILref before Time T09 is denoted by $I_{CM0}$ in this specification.

The current $I_{Cref}$ is output from the terminal CT4 of the constant current circuit $CI_{ref}$. Thus, $I_{CM0}$ is determined by setting the potential of the gate of the transistor Tr7 (the potential of the node $NCM_{ref}$) such that the following formula is satisfied.

[Formula 21]

$$I_{Cref} - I_{CM0} = \sum_i I_{ref0}[i] \qquad (F1)$$

Note that since the potential of the gate of the transistor Tr7 (the potential of the node NCMref) is used as a reference in the current mirror circuit CM, the current $I_{CM0}$ also flows in the wirings IL[1] to IL[n] of the column output circuits OUT[1] to OUT[n].

<<Period from Time T05 to Time T06>>

During the period from Time T05 to Time T06, the wiring ORP is set at the high-level potential. At this time, the high-level potential is supplied to the gates of the transistors Tr3 in the column output circuits OUT[1] to OUT[n], so that the transistors Tr3 are turned on. Thus, the low-level potential is supplied to the first terminals of the capacitors C1 in the column output circuits OUT[1] to OUT[n], and thus the potentials of the capacitors C1 are initialized. When Time T06 starts, the low-level potential is supplied to the wiring ORP, so that the transistors Tr3 in the column output circuits OUT[1] to OUT[n] are turned off.

<<Period from Time T06 to Time T07>>

During a period from Time T06 to Time T07, the wiring ORP is set at the low-level potential. As described above, the low-level potential is supplied to the gates of the transistors Tr3 in the column output circuits OUT[1] to OUT[n], so that the transistors Tr3 are turned off.

<<Period from Time T07 to Time T08>>

During a period from Time T07 to Time T08, the wiring OSP is set at the high-level potential. As described above, the high-level potential is supplied to the gates of the transistors Tr2 in the column output circuits OUT[1] to OUT[n], so that the transistors Tr2 are turned on. At this time, current flows into the first terminals of the capacitors C1 from the first terminals of the transistors Tr2 through the second terminals of the transistors Tr2, and positive potentials are held in the capacitors C1. Thus, the potentials of the gates of the transistors Tr1 are held, so that the current depending on the potential of the gate of each of the transistors Tr1 flows between the source and the drain of the transistor Tr1.

When Time T08 starts, the low-level potential is supplied to the wiring OSP, so that the transistors Tr2 in the column output circuits OUT[1] to OUT[n] are turned off. The potentials of the gates of the transistors Tr1 are held in the capacitors C1, so that even after Time T08, the same amount of current keeps flowing between the source and the drain of each of the transistors Tr1.

Here, the description will be made with a focus on the column output circuit OUT[j]. In the column output circuit OUT[j], the current flowing between the source and the drain of the transistor Tr1 is denoted by $I_{CP}[j]$, and the current flowing between the source and the drain of the transistor Tr4 of the constant current circuit CI is denoted by $I_C[j]$. The current flowing between the source and the drain of the transistor Tr5 through the current mirror circuit CM is $I_{CM0}$. On the assumption that the current is not output from the output terminal SPT[j] during the period from Time T01 to Time T08, the sum of the amounts of current flowing through each of the transistors Tr12 in the memory cells AM[1,j] to AM[n,j] flows in the wiring B[j] of the column output circuit OUT[j]. That is, the current $\Sigma I_0[i,j]$ flows into the wiring B[j] (here, $\Sigma I_0[i,j]$ is the summation of $I_0[i,j]$ over i from 1 to m). Thus, the above satisfies the following formula.

[Formula 22]

$$I_C[j] - I_{CM0} - I_{CP}[j] = \sum_i I_0[i, j] \qquad (F2)$$

<<Period from Time T09 to Time T10>>

The operation after Time T09 will be described with reference to FIG. 25. During a period from Time T09 to Time T10, a potential higher than the reference potential (denoted by REFP in FIG. 25) by $V_W[i]$ is supplied to the wiring RW[i]. At this time, the potential $V_W[i]$ is supplied to the second terminals of the capacitors C2 in the memory cells AM[i,1] to AM[i,n] and the memory cell AMref[i], so that the potentials of the gates of the transistors Tr12 increase.

Note that the potential $V_W[i]$ is a potential corresponding to the second analog data.

An increase in the potential of the gate of the transistor Tr12 corresponds to the potential obtained by multiplying a change in potential of the wiring RW[i] by a capacitive coupling coefficient determined by the memory cell configuration. The capacitive coupling coefficient is calculated on the basis of the capacitance of the capacitor C2, the gate capacitance of the transistor Tr2, and the parasitic capacitance. In this operation example, to avoid complexity of description, an increase in potential of the wiring RW[i] is equal to an increase in potential of the gate of the transistor Tr12, which corresponds to a case where the capacitive coupling coefficient in each of the memory cells AM and the memory cell AMref is set to 1.

When the potential $V_W[i]$ is supplied to the second terminals of the capacitors C2 in the memory cell AM[i,j], the memory cell AM[i,j+1], and the memory cell AMref[i] on the assumption that the capacitive coupling coefficient is 1, the potentials of the node N[i,j], the node N[i,j+1], and the node Nref[i] each increase by $V_W[i]$.

The current flowing from the first to second terminal of the transistor Tr12 in each of the memory cell AM[i,j], the memory cell AM[i,j+1], and the memory cell AMref[i] will be described. The current I[i,j] flowing from the wiring B[i] to the second terminal of the transistor Tr12 in the memory cell AM[i,j] through the first terminal thereof can be expressed by Formula (E9) as in Operation example 1.

In other words, by supplying the potential $V_W[i]$ to the wiring RW[i], the current flowing from the wiring B[j] to the second terminal of the transistor Tr12 in the memory cell AM[i,j] through the first terminal thereof increases by I[i,j]−I$_0$[i,j] (denoted by ΔI[i,j] in FIG. 25).

Similarly, the current I[i,j+1] flowing from the wiring B[i+1] to the second terminal of the transistor Tr12 in the memory cell AM[i,j+1] through the first terminal thereof can be expressed by Formula (E10) as in Operation example 1.

In other words, by supplying the potential V$_W$[i] to the wiring RW[i], the current flowing from the wiring B[i+1] to the second terminal of the transistor Tr12 in the memory cell AM[i,j+1] through the first terminal thereof increases by I[i,j+1]−I$_0$[i,j+1] (denoted by ΔI[i,j+1] in FIG. 25).

Furthermore, the current I$_{ref}$[i] flowing from the wiring Bref to the second terminal of the transistor Tr12 in the memory cell AMref[i] through the first terminal thereof can be expressed by Formula (E11) as in Operation example 1.

In other words, by supplying the potential V$_W$[i] to the wiring RW[i], the current flowing from the wiring Bref to the second terminal of the transistor Tr12 in the memory cell AMref[i] through the first terminal thereof increases by I$_{ref}$[i]−I$_{ref0}$[i] (denoted by ΔI$_{ref}$[i] in FIG. 25).

Here, the description will be made with a focus on the reference column output circuit Cref. The total amount of current flowing through the transistors Tr12 in the memory cells AMref[1] to AMref[m] flows into the wiring Bref of the reference column output circuit Cref. In other words, the current I$_{Bref}$=ΣI$_{ref0}$[i] flows into the wiring B$_{ref}$.

The current I$_{Cref}$ is output from the terminal CT4 of the constant current circuit CI$_{ref}$. Thus, I$_{CM}$ is determined by setting the potential of the gate of the transistor Tr7 (the potential of the node NCM$_{ref}$) such that the following formula is satisfied.

[Formula 23]

$$I_{Cref} - I_{CM} = \sum_i I_{ref}[i] \quad (F3)$$

Here, the current ΔI$_B$[j] that is output from the wiring B[j] will be described. During the period from Time T08 to Time T09, Formula (F2) is satisfied, and the current ΔI$_B$[j] is not output from the wiring B[j].

During the period from Time T09 to Time T10, a potential higher than the reference potential by V$_W$[i] is supplied to the wiring RW[i], and the current flowing between the source and the drain of the transistor Tr12 in the memory cell AM[i,j] changes. Then, the current ΔI$_B$[j] is output from the output terminal SPT[j] that is electrically connected to the wiring B[j]. Specifically, in the column output circuit OUT[j], the current I$_C$[i] is output from the terminal CT2 of the constant current circuit CI, the current I$_{CM}$ flows between the source and the drain of the transistor Tr5, and the current I$_{CP}$[j] flows between the source and the drain of the transistor Tr1. Thus, the current ΔI$_B$[j] can be expressed by the following formula using ΣI[i,j], which is the summation of current I[i,j] over i from 1 to m. Here, the current I[i,j] is current flowing between the source and the drain of the transistor Tr12 in the memory cell

[Formula 24]

$$\Delta I_B[j] = (I_C[j] + I_{CM} - I_{CP}[j]) - \sum_i I[i,j] \quad (F4)$$

Formulae (E1), (E3), (E9), (E11), and (F1) to (F3) are used in Formula (F4), so that the following formula can be obtained.

[Formula 25]

$$\Delta I_B[j] = 2k \sum_i (V_X[i,j] V_W[i]) \quad (F5)$$

That is, Formula (F5) is the same as Formula (E14) in Operation example 1. Thus, the current ΔI$_B$[j] is a value corresponding to the sum of products of the potential V$_X$[i,j] that is the first analog data and the potential V$_W$[i] that is the second analog data. That is, when the current ΔI$_B$[j] is calculated, the value of the sum of products of the first analog data and the second analog data can be obtained.

During the period from Time T09 to Time T10, when all of the wirings RW[1] to RW[m] except the wiring RW[i] are set to have a reference potential, the relation, V$_W$[g]=0 (here, g is an integer that is greater than or equal to 1 and less than or equal to m and not i), is satisfied. Thus, according to Formula (F5), ΔI$_B$[j]=2 kV$_X$[i,j]V$_W$[i] is output. In other words, the data corresponding to the product of the first analog data stored in the memory cell AM[i,j] and the second analog data corresponding to a selection signal supplied to the wiring RW[i] is output from the output terminal SPT[i] that is electrically connected to the wiring B[j].

Furthermore, similarly, a differential current that is output from the output terminal SPT[j+1] electrically connected to the wiring B[i+1] is expressed as ΔI$_B$[i+1]=2 kV$_X$[i,j+1]V$_W$[i]. The data corresponding to the product of the first analog data stored in the memory cell AM[i,j+1] and the second analog data corresponding to a selection signal supplied to the wiring RW[i] is output from the output terminal SPT[j+1] that is electrically connected to the wiring B[j+1].

<<Period from Time T10 to Time T11>>

During a period from Time T10 to Time T11, the ground potential is supplied to the wiring RW[i]. The ground potential is supplied to the second terminals of the capacitors C2 in the memory cells AM[i,1] to AM[i,n] and the memory cell AMref[i]. Thus, the potentials of the nodes N[i,1] to N[i,n] and the node Nref[i] return to the potentials during the period from Time T08 to Time T09.

<<Period from Time T11 to Time T12>>

During a period from Time T11 to Time T12, the wirings RW[1] to RW[m] except the wiring RW[i+1] are set to have the reference potential, and a potential higher than the reference potential by V$_W$[i+1] is supplied to the wiring RW[i+1]. At this time, as in the operation during the period from Time T09 to Time T10, the potential V$_W$[i+1] is supplied to the second terminals of the capacitors C2 in the memory cells AM[i+1,1] to AM[i+1,n] and the memory cell AMref[i+1], so that the potentials of the gates of the transistors Tr12 increase.

The potential V$_W$[i+1] corresponds to the second analog data.

As described above, the capacitive coupling coefficients of the memory cells AM and the memory cell AMref are each 1. When the potential V$_W$[i+1] is supplied to the second terminals of the capacitors C2 in the memory cell AM[i+1,j], the memory cell AM[i+1,j+1], and the memory cell AMref[i+1], the potentials of the node N[i+1,j], the node N[i+1,j+1], and the node Nref[i+1] each increase by V$_W$[i+1].

When the potentials of the node N[i+1,j], the node N[i+1,j+1], and the node Nref[i+1] increase by $V_W[i+1]$, the amount of current flowing in each of the transistors Tr12 in the memory cell AM[i+1,j], the memory cell AM[i+1,j+1], and the memory cell AMref[i+1] increases. When the current flowing in the transistor Tr12 in the memory cell AM[i+1,j] is denoted by I[i+1,j], the current flowing from the output terminal OT[l] of the column output circuit OUT[j] to the wiring B[j] increases by I[i+1,j]−$I_0$[i+1,j] (denoted by ΔI[i+1,j] in FIG. 25). Similarly, when the current flowing in the transistor Tr12 in the memory cell AM[i+1,j+1] is denoted by I[i+1,j+1], the current flowing from the output terminal OT[j+1] of the column output circuit OUT[j+1] to the wiring B[j+1] increases by I[i+1,j+1]−$I_0$[i+1,j+1] (denoted by ΔI[i+1,j+1] in FIG. 25). When the current flowing in the transistor Tr12 in the memory cell AMref[i+1] is denoted by $I_{ref}$[i+1], the current flowing from the output terminal OTref of the reference column output circuit Cref to the wiring Bref increases by $I_{ref}$[i+1]−$I_{ref0}$[i+1] (denoted by Δ$I_{ref}$[i+1] in FIG. 25).

The operation during the period from Time T11 to Time T12 can be similar to the operation during the period from Time T09 to Time T10. Thus, when Formula (F5) is applied to the operation during the period from Time T11 to Time T12, the differential current that is output from the wiring B[j] is expressed as Δ$I_B$[j]=2 $kV_X$[i+1,j]$V_W$[i+1]. In other words, the data corresponding to the product of the first analog data stored in the memory cell AM[i+1,j] and the second analog data corresponding to a selection signal supplied to the wiring RW[i+1] is output from the output terminal SPT[i] that is electrically connected to the wiring B[j].

Furthermore, similarly, the differential current that is output from the wiring B[i+1] is expressed as Δ$I_B$[i+1]=2 $kV_X$[i+1,j+1]$V_W$[i+1]. The data corresponding to the product of the first analog data stored in the memory cell AM[i+1,j+1] and the second analog data corresponding to a selection signal supplied to the wiring RW[i+1] is output from the output terminal SPT[j+1] that is electrically connected to the wiring B[i+1].

<<Period from Time T12 to Time T13>>

During a period from Time T12 to Time T13, the ground potential is supplied to the wiring RW[i+1]. In this period, the ground potential is supplied to the second terminals of the capacitors C2 in the memory cells AM[i+1,1] to AM[i+1,n] and the memory cell AMref[i+1], and the potentials of nodes N[i+1,1] to N[i+1,n] and the node Nref[i+1] return to the potentials in the period from Time T10 to Time T11.

<<Period from Time T13 to Time T14>>

During a period from Time T13 to Time T14, the wirings RW[1] to RW[m] except the wiring RW[i] and the wiring RW[i+1] are set to have the reference potential, a potential higher than the reference potential by $V_{W2}$[i] is supplied to the wiring RW[i], and a potential lower than the reference potential by $V_{W2}$[i+1] is supplied to the wiring RW[i+1]. At this time, as in the operation during the period from Time T09 to Time T10, the potential $V_{W2}$[i] is supplied to the second terminals of the capacitors C2 in the memory cells AM[i,1] to AM[i,n] and the memory cell AMref[i], so that potentials of the gates of the transistors Tr12 in the memory cells AM[i,1] to AM[i,n] and the memory cell AMref[i] increase. Concurrently, the potential −$V_{W2}$[i+1] is supplied to the second terminals of the capacitors C2 in the memory cells AM[i+1,1] to AM[i+1,n] and the memory cell AMref[i+1], so that the potentials of the gates of the transistors Tr12 in the memory cells AM[i+1,1] to AM[i+1,n] and the memory cell AMref[i+1] decrease.

The potential $V_{W2}$[i] and the potential $V_{W2}$[i+1] are potentials each corresponding to the second analog data.

Note that the capacitive coupling coefficients of the memory cell AM and the memory cell AMref are each 1. When the potential $V_{W2}$[i] is supplied to the second terminals of the capacitors C2 in the memory cell AM[i,j], the memory cell AM[i,j+1], and the memory cell AMref[i], the potentials of the node N[i,j], the node N[i,j+1], and the node Nref[i] each increase by $V_{W2}$[i]. When the potential −$V_{W2}$[i+1] is supplied to the second terminals of the capacitors C2 in the memory cell AM[i+1,j], the memory cell AM[i+1,j+1], and the memory cell AMref[i+1], the potentials of the node N[i+1,j], the node N[i+1,j+1], and the node Nref[i+1] each decrease by $V_{W2}$[i+1].

When each of the potentials of the node N[i,j], the node N[i,j+1], and the node Nref[i] increases by $V_{W2}$[i], the amount of current flowing in each of the transistors Tr12 in the memory cell AM[i,j], the memory cell AM[i,j+1], and the memory cell AMref[i] increases. Here, the current flowing in the transistor Tr12 in the memory cell AM[i,j] is denoted by I[i,j], the current flowing in the transistor Tr12 in the memory cell AM[i,j+1] is denoted by I[i,j+1], and the current flowing in the transistor Tr12 in the memory cell AMref[i] is denoted by $I_{ref}$[i].

When the potentials of the node N[i+1,j], the node N[i+1,j+1], and the node Nref[i+1] each decrease by $V_{W2}$[i+1], the amount of current flowing in each of the transistors Tr12 in the memory cell AM[i+1,j], the memory cell AM[i+1,j+1], and the memory cell AMref[i+1] decreases. Here, the current flowing in the transistor Tr12 in the memory cell AM[i+1,j] is denoted by $I_2$[i,j], the current flowing in the transistor Tr12 in the memory cell AM[i+1,j+1] is denoted by $I_2$[i,j+1], and the current flowing in the transistor Tr12 in the memory cell AMref[i+1] is denoted by $I_{2ref}$[i+1].

At this time, the current flowing from the output terminal OT[j] of the column output circuit OUT[j] to the wiring B[j] increases by ($I_2$[i,j]−$I_0$[i,j])+($I_2$[i+1,j]−$I_0$[i+1,j]) (denoted by ΔI[i] in FIG. 25). The current flowing from the output terminal OT[j+1] of the column output circuit OUT[j+1] to the wiring B[i+1] increases by ($I_2$[i,j+1]−$I_0$[i,j+1])+($I_2$[i+1,j+1]−$I_0$[i+1,j+1]) (denoted by A[i+1] in FIG. 25, which is a negative current). The current flowing from the output terminal OTref of the reference column output circuit Cref to the wiring Bref increases by ($I_{2ref}$[i,j]−$I_{ref0}$[i,j])+($I_{2ref}$[i+1,j]−$I_{ref0}$[i+1,j]) (denoted by Δ$I_{Bref}$ in FIG. 25).

The operation during the period from Time T13 to Time T14 can be similar to the operation during the period from Time T09 to Time T10. When Formula (F5) is applied to the operation during the period from Time T13 to Time T14, the differential current that is output from the wiring B[j] is expressed as Δ$I_B$[j]=2k{$V_X$[i,j]$V_{W2}$[i]−$V_X$[i+1,j]$V_{W2}$[i+1]}. Thus, the data corresponding to the sum of products of the first analog data stored in each of the memory cell AM[i,j] and the memory cell AM[i+1,j] and the second analog data corresponding to a selection signal supplied to each of the wiring RW[i] and the wiring RW[i+1] is output from the output terminal SPT[j] that is electrically connected to the wiring B[j].

Furthermore, similarly, the differential current that is output from the wiring B[j+1] is expressed as Δ$I_B$[J+l]=2k{$V_X$[i,j+1]$V_{W2}$[i]−$V_X$[i+1,j+1]$V_{W2}$[i+1]}. The data corresponding to the product of the first analog data stored in each of the memory cell AM[i,j+1] and the memory cell AM[i+1,j+1] and the second analog data corresponding to a selection signal supplied to each of the wiring RW[i] and the wiring RW[i+1] is output from the output terminal SPT[i+1] that is electrically connected to the wiring B[j+1].

<<After Time T14>>

After Time T14, the ground potential is supplied to the wiring RW[i] and the wiring RW[i+1]. At this time, the ground potential is supplied to the second terminals of the capacitors C2 in the memory cells AM[i,1] to AM[i,n], the memory cells AM[i+1,1] to AM[i+1,n], the memory cell AMref[i], and the memory cell AMref[i+1]. Thus, the potentials of the nodes N[i,1] to N[i,n], the nodes N[i+1,1] to N[i+1,n], the node Nref[i], and the node Nref[i+1] return to the potentials in the period from Time T12 to Time T13.

The operations described in Operation example 1 or Operation example 2 are performed with the circuit configuration of FIG. 11, whereby a plurality of product-sum operations can be executed concurrently. Thus, a circuit enabling high-speed product-sum operations can be provided.

Here, the first analog data serves as weight coefficients and the second analog data corresponds to neuron outputs, whereby calculation of the weighted sums of the neuron outputs can be conducted concurrently. Thus, data corresponding to results of the calculation of the weighted sums, that is, synapse inputs can be obtained as the output signals. Specifically, weight coefficients $w_{s[k] \cdot 1}^{(k)}$ to $w_{s[k] \cdot Q[k-1]}^{(k)}$ of the s[k]-th neuron in the k-th layer are stored as the first analog data in the memory cells AM[1,j] to AM[m,j] and output signals $z_1^{(k-1)}$ to $z_{Q[k-1]}^{(k-1)}$ of the neurons in the (k−1)-th layer are supplied as the second analog data to the wirings RW[1] to RW[m], whereby the summation $u_{s[k]}^{(k)}$ of signals input to the s[k]-th neuron in the k-th layer can be obtained. That is, the product-sum operation expressed by Formula (D1) can be performed with the product-sum operation circuit 700.

In the case where weight coefficients are updated in supervised learning, weight coefficients $w_{1 \cdot s[k]}^{(k+1)}$ to $w_{Q[k+1]s[k]}^{(k+1)}$ multiplied by when a signal is sent from the s[k]-th neuron in the k-th layer to neurons in the (k+1)-th layer are stored as the first analog data in the memory cells AM[1,j] to AM[m,j] and errors $\delta_1^{(k+1)}$ to $\delta_{Q[k+1]}^{(k+1)}$ of the neurons in the (k+1)-th layer are supplied as the second analog data to the wirings RW[1] to RW[m], whereby a value of $\Sigma w_{s[k+1] \cdot s[k]}^{(k+1)} \cdot \delta_{s[k+1]}^{(k+1)}$ in Formula (D3) can be obtained from the differential current $\Delta I_B[j]$ flowing through the wiring B[i]. That is, part of the operation expressed by Formula (D3) can be performed with the product-sum operation circuit 700.

Here, in the display device including the display unit 110, information about the power consumption of the frame memory 151 that can be obtained from the power consumption monitor 151a included in the frame memory 151 is input as input data to the neurons in the input layer (first layer), and information about whether IDS driving has been performed is used as teacher data. This allows the data processing circuit 156 to output a signal containing a prediction on whether to start IDS driving from an output layer (L-th layer) in accordance with a calculation result of the hierarchical neural network.

When the product-sum operation circuit described above is used for the hidden layer of the hierarchical neural network, the weight coefficient $w_{s[k]s[k-1]}^{(k)}$ is the first analog data stored in the memory cell AM[i,j] and the output signal $z_{s[k-1]}^{(k-1)}$ from the s[k−1]-th neuron in the (k−1)-th layer is a potential (second analog data) supplied from the wiring RW[i]; thus, the value of the sum of products of the first analog data and the second analog data can be obtained from the current output to the terminal SPT[j] in the product-sum operation circuit. In addition, the value of the activation function can be obtained from the value of the sum of products, so that the value of the activation function can be the output signal $z_{s[k]}^{(k)}$ of the s[k]-th neuron in the k-th layer.

When the product-sum operation circuit described in this embodiment is used for the output layer of the hierarchical neural network, the weight coefficient $w_{s[L]s[L-1]}^{(L)}$ is the first analog data stored in the memory cell AM[i,j] and the output signal $z_{s[L-1]}^{(L-1)}$ from the s[L−1]-th neuron in the (L−1)-th layer is a potential (second analog data) supplied from the wiring RW[i]; thus, the value of the sum of products of the first analog data and the second analog data can be obtained from current output to the terminal SPT[j] in the product-sum operation circuit. In addition, the value of the activation function can be obtained from the value of the sum of products, so that the value of the activation function can be the output signal $z_{s[L]}^{(L)}$ of the s[L]-th neuron in the L-th layer.

Note that the input layer of the hierarchical neural network may function as a buffer circuit that outputs an input signal to the second layer.

In the product-sum operation circuit described above, the number of the rows of the memory cells AM in one layer corresponds to the number of the neurons in the previous layer. That is, the number of the rows of the memory cells AM in one layer corresponds to the number of output signals of the neurons in the previous layer that are input to the one layer. In the case where the number of the neurons in the previous layer is greater than the number of the rows of the memory cells AM, as described in the configuration example of the hierarchical neural network, a plurality of product-sum operation circuits are connected to each other by sharing the wiring B[j] using the switch circuit MSW; accordingly, the number of the rows of the memory cells AM is increased to be equal to the number of the neurons in the previous layer. In the case where the number of the neurons in the one layer is increased, as described in the configuration example of the hierarchical neural network, a plurality of product-sum operation circuits are connected to each other by sharing the wirings WW[i] and RW[i] using the switch circuit MSW; accordingly, the number of the columns of the memory cells AM is increased to be equal to the number of the neurons in the one layer. That is, by combining the above-described configuration example of the hierarchical neural network and the above-described configuration example of the product-sum operation circuit, the connection of the wirings B[j], WW[i], and RW[i] of a plurality of product-sum operation circuits can be freely changed, so that a variety of neural networks become possible.

Note that this embodiment can be combined with any of the other embodiments in this specification as appropriate.

Embodiment 3

In this embodiment, an operation example of power gating of circuits such as a controller IC included in a hybrid display device will be described. Note that the neural network described in Embodiment 2 is used for power gating as described above.

Figure 26:
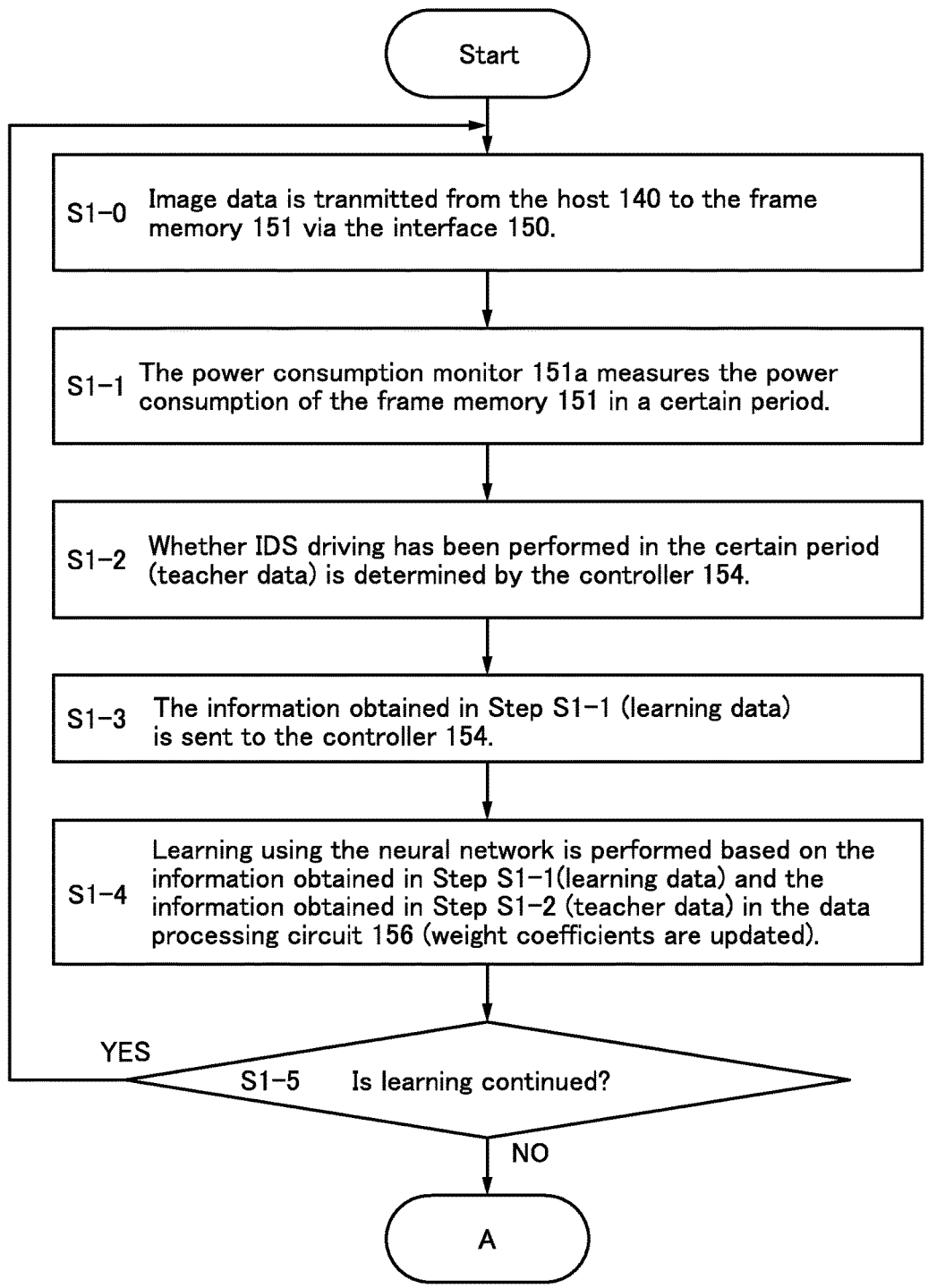
FIG. 26 is a flow chart showing an operation example of an electronic device.
Figure 27:
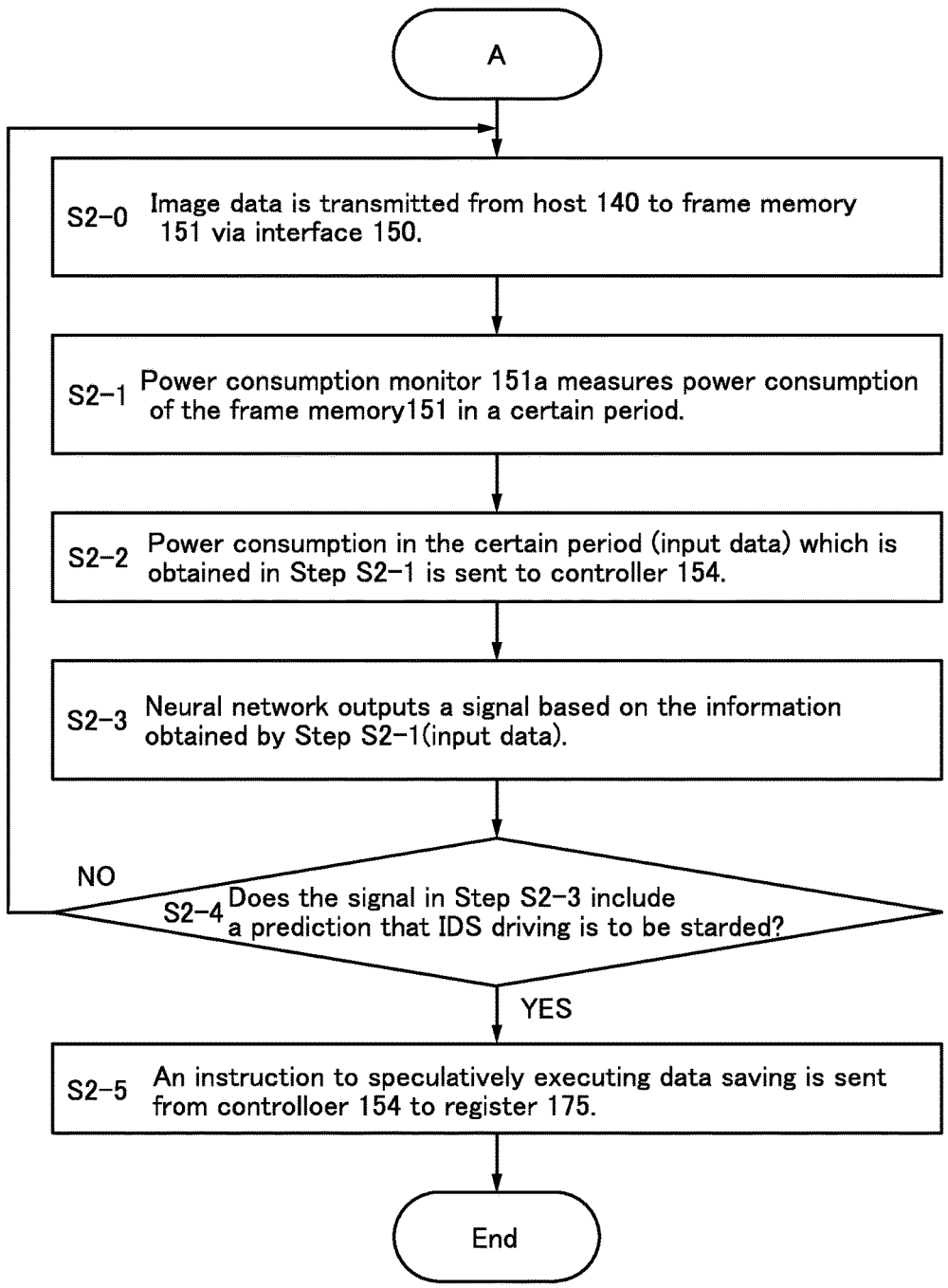
FIG. 27 is a flow chart showing an operation example of an electronic device.

FIG. 26 and FIG. 27 are flow charts showing the operation example. Power gating of circuits included in the controller IC of the hybrid display device is performed through Steps S1-0 to S1-5 and Steps S2-0 to S2-5. Note that Steps S1-0 to S1-5 show learning operation in the neural network, and Steps S2-0 to S2-5 show operation in which whether to perform IDS driving is predicted from the power consumption of the frame memory 151 and data saving into the register 175 is speculatively executed in advance. Speculative execution of data saving through Steps S2-0 to S2-5 allows power gating of the source driver 180, the timing controller 173, the decoder 152, and the like to be started early, further reducing the power consumption of the hybrid display device. Note that the hybrid display device in this embodiment includes the controller IC 115 described in Embodiment 1, the display unit 110, and the touch sensor unit 120.

<Learning>

In Step S1-0, image data is transmitted from the host 140 to the controller IC 115. Specifically, the image data transmitted from the host 140 is transmitted to the frame memory 151 via the interface 150 included in the controller IC 115. The frame memory 151 stores the image data. Note that Step S1-0 is performed continuously as a background operation during Steps S1-1 to S1-5, which will be described later.

In Step S1-1, the power consumption monitor 151a in the frame memory 151 measures the power consumption of the frame memory 151. Note that a period for power consumption measurement preferably extends over ten frames, more preferably five frames, still more preferably two frames. The measurement period is hereinafter referred to as a certain period in this specification. The power consumption measured in the certain period is used as learning data in the neural network.

In Step S1-2, whether IDS driving has been performed in the certain period is determined by the controller 154. Whether IDS driving has been performed depends on whether supply of power supply voltage to the source driver 180, the timing controller 173, and the like has been interrupted when image data displayed on the display unit 110 is not rewritten. This determination result is used as teacher data in the neural network.

In Step S1-3, the power consumption in the certain period (learning data) that is obtained in Step S1-1 is sent to the controller 154.

In Step S1-4, the power consumption in the certain period (learning data) that is obtained in Step S1-1 is input to the data processing circuit 156. Specifically, the power consumption in the certain period is sent to the data processing circuit 156 included in the controller 154 as learning data to be input to an input layer (first layer) of the neural network. In this manner, learning using the neural network is performed.

Note that in initial calculation, the initial values of weights of the neural network may be random numbers. The initial values might affect the degree of learning (e.g., the convergent rate of weight coefficients and the prediction accuracy of the neural network). When the learning speed is low, the initial values may be changed to perform learning again.

When input data is input to the neurons of the input layer (first layer) of the neural network in the data processing circuit 156, output data is output as a calculation result from the output layer (L-th layer) of the neural network in the data processing circuit 156. In the case where a difference between the output data and the teacher data is out of the allowable range, weight values are updated using the teacher data. Note that for example, backpropagation described in Embodiment 2 can be used to update the weight values.

After the weight values are updated, the power consumption in the certain period is input to the neurons of the input layer (first layer) of the neural network in the data processing circuit 156 and calculation is performed again. Update of the weight values and calculation using the neural network are repeated until the error between the calculation result (the output data output from the output layer (L-th layer) of the neural network) and the teacher data falls within the allowable range. Note that the allowable range of error with which calculation is finished does not need to be narrow and may be wide within the allowable range for the user of the display device.

Calculation using the neural network is repeatedly performed in this manner, and finally output data having no difference or a small difference from the teacher data is output from the output layer (L-th layer). The weight coefficients included in the neural network at this time are stored in a predetermined memory device so that they can be associated with the certain measurement period. Note that the predetermined memory device refers to, for example, the register 175 or the memory 170 included in the controller IC 115 or a memory device included in the host 140.

Steps S1-0 to S1-4 are performed in the above manner and weight coefficients when no difference or a small difference exists between the teacher data and the output data are obtained, whereby learning using the neural network is completed.

In Step S1-5, whether to continue learning is determined. For example, in the case where the certain measurement period changes, learning is preferably performed again. Alternatively, learning is preferably performed again in accordance with an application executed by an electronic device including the display device. In that case, operation is performed from Step S1-0 again; the power consumption of the frame memory 151 in a certain measurement period is obtained through Steps S1-1 to S1-3 and learning is performed in Step S1-4.

In the case where learning does not need to be continued in Step S1-5, the process proceeds to Step A in FIG. 26. In that case, the process moves on to Step A in the flow chart of FIG. 27 and the processing is continued.

<Acquisition of Signal Containing Prediction on Whether to Start IDS Driving>

In Step S2-0, as in Step S1-0, image data is transmitted from the host 140 to the controller IC 115. Specifically, the image data transmitted from the host 140 is transmitted to the frame memory 151 via the interface 150 included in the controller IC 115. The frame memory 151 stores the image data. Note that Step S2-0 is performed continuously as a background operation during Steps S2-1 to S2-5, which will be described later.

In Step S2-1, as in Step S1-1, the power consumption monitor 151a in the frame memory 151 measures the power consumption of the frame memory 151 in a certain period. The measured power consumption in the certain period is used as input data in the neural network.

In Step S2-2, the power consumption in the certain period (input data) that is obtained in Step S2-1 is sent to the controller 154.

In Step S2-3, the power consumption in the certain period (input data) that is obtained in Step S2-1 is input to the data processing circuit 156. Specifically, the power consumption in the certain period is sent to the data processing circuit 156 included in the controller 154 as input data to be input to the input layer (first layer) of the neural network.

By the above operation, calculation using the neural network is performed, and a signal containing a prediction on whether to start IDS driving is output from the output layer (L-th layer) of the neural network.

In Step S2-4, whether the signal output in Step S2-3 includes a prediction that IDS driving is to be started or a prediction that IDS driving is not to be started is determined. Specifically, in the case where the signal output in Step S2-3 includes the prediction that IDS driving is to be started, the process moves on to Step S2-5. In the case where the signal output in Step S2-3 does not include the prediction that IDS driving is to be started (the signal includes the prediction that IDS driving is not to be started), the process moves on to Step S2-0.

In Step S2-5, an instruction to speculatively executing data saving is sent from the controller 154 to the register 175. This step is performed in response to the determination in Step S2-4 that the output in Step S2-3 is the prediction that IDS driving is to be started. Performing Steps S2-4 and S2-5 allows setting data or the like to be held in the register 175 before power gating of the circuits in the controller IC 115 that is performed when IDS driving is started. Note that without limitation to the register 175, another memory device (e.g., the memory device in the host 140 or the memory 170 in the controller IC 115) may be used to hold the setting data.

In the aforementioned manner, whether to start IDS driving is predicted using the neural network and when the prediction that IDS driving is to be started is output, setting data or the like is held in the register 175 in advance. This can increase a power gating period of the circuits in the controller IC 115 compared with that when data saving is not performed in advance. Consequently, the power consumption of the display device can be further reduced.

Note that the operation method of one embodiment of the present invention is not limited to Steps S1-0 to S1-5 and S2-1 to S2-5 described above. In this specification and the like, processings shown in the flow chart are classified into individual steps according to functions. However, it is difficult to classify actual processings or the like shown in the flow chart according to functions; a plurality of steps can relate to one step or one step can relate to a plurality of steps. Thus, the processings shown in the flow chart are not limited to the steps described in this specification and the order of the processings can be changed as appropriate according to circumstances. Specifically, the order of the steps can be changed, another step can be added, or one or more of the steps can be eliminated, according to circumstances or conditions or as needed.

Figure 28:
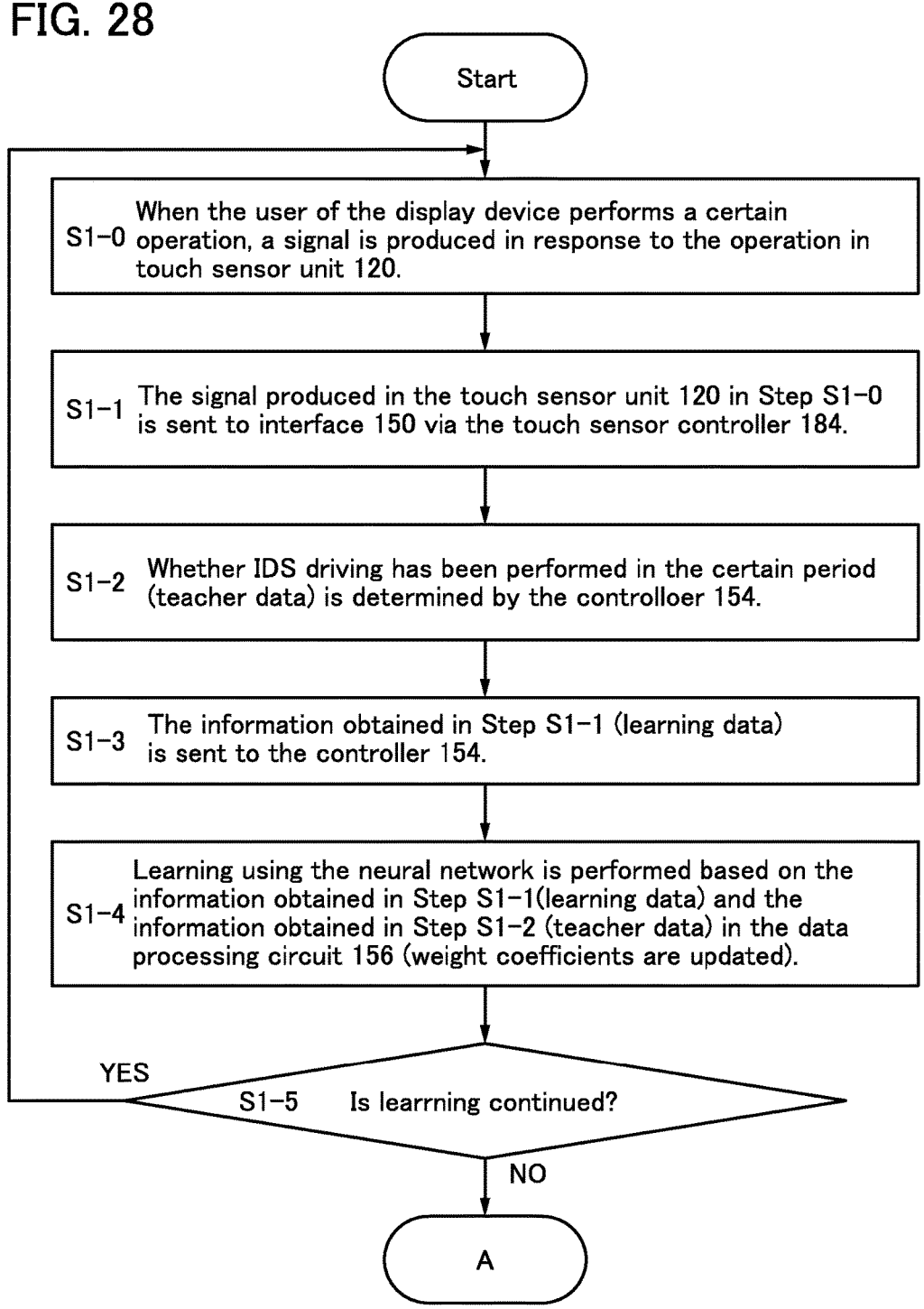
FIG. 28 is a flow chart showing an operation example of an electronic device.
Figure 29:
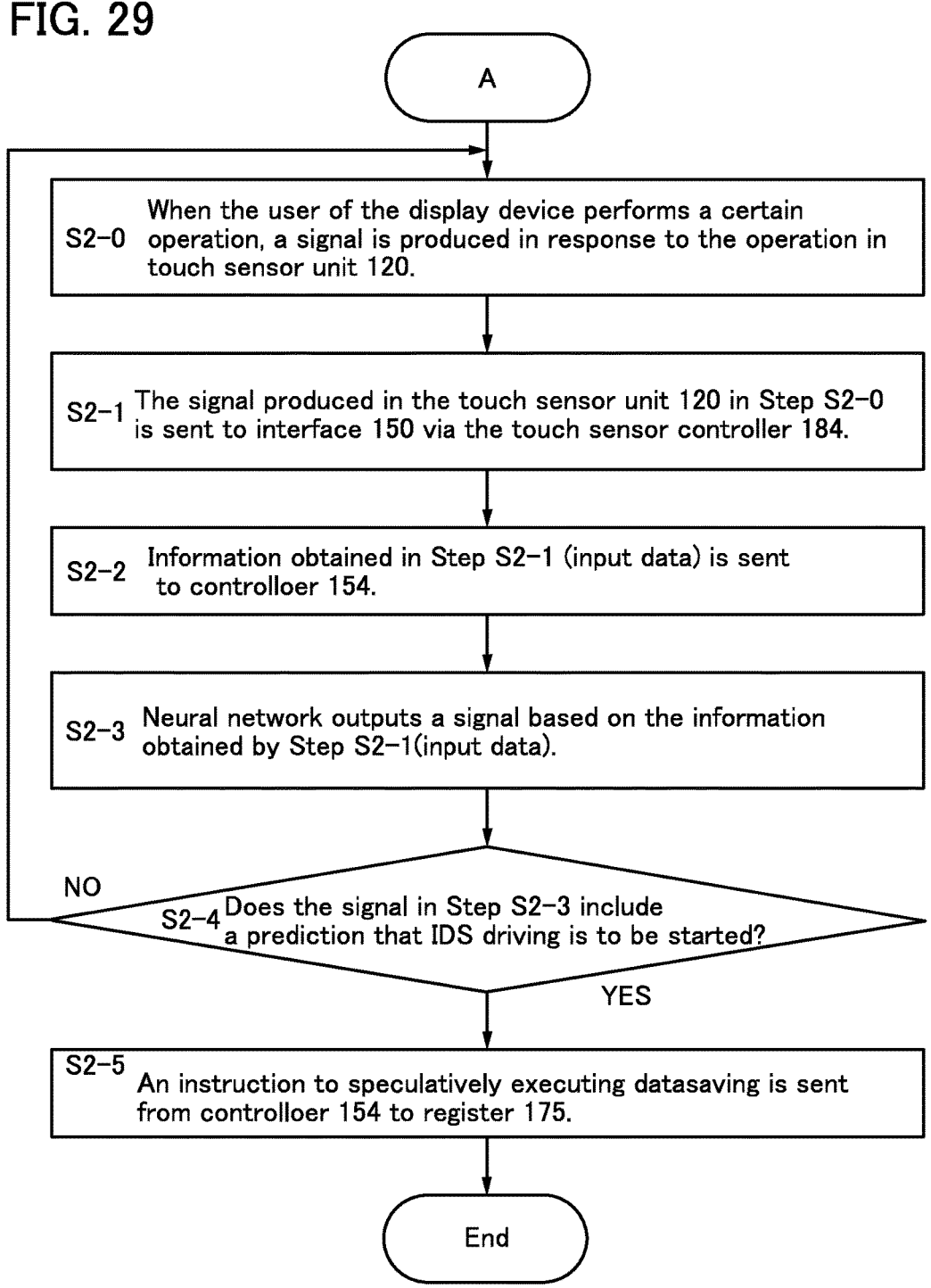
FIG. 29 is a flow chart showing an operation example of an electronic device.

For example, the operation method of one embodiment of the present invention may be that in the flow charts shown in FIG. 28 and FIG. 29. The flow chart of FIG. 28 is different from that of FIG. 26 in details of Steps S1-0 and S1-1. The flow chart of FIG. 29 is different from that of FIG. 26 in details of Steps S2-0 and S2-1.

In Step S1-0 in the flow chart of FIG. 28, when the user of the display device performs a certain operation, a signal is produced in response to the operation in the touch sensor unit 120.

In Step S1-1 in the flow chart of FIG. 28, the signal produced in the touch sensor unit 120 is sent to the interface 150 via the touch sensor controller 184.

In Step S2-0 in the flow chart of FIG. 29, when the user of the display device performs a certain operation, a signal is produced in response to the operation in the touch sensor unit 120.

In Step S2-1 in the flow chart of FIG. 29, the signal produced in the touch sensor unit 120 is sent to the interface 150 via the touch sensor controller 184.

That is, in each of the flow charts of FIG. 28 and FIG. 29, calculation using the neural network can be performed, where the signal produced in Step S1-0 in response to the operation by the user is used as learning data, information about whether IDS driving has been performed in a certain period that is obtained in Step S1-2 is used as teacher data, and the signal produced in Step S2-0 in response to the operation of the user is used as input data.

The operation example of the flow charts shown in FIG. 28 and FIG. 29 is effective in the case where a user views a still image displayed by an electronic device, for example. Specifically, learning using the neural network is performed using as learning data elapsed time from the time when a user starts to view a still image to the time when another still image is displayed (the elapsed time refers to a period during which the certain operation is performed) and as teacher data information about whether IDS driving has been performed in a certain period, whereby a signal containing a prediction on whether to start IDS driving can be acquired using the certain operation of the user as input data.

Note that this embodiment can be combined with any of the other embodiments in this specification as appropriate.

Embodiment 4

Figure 30:
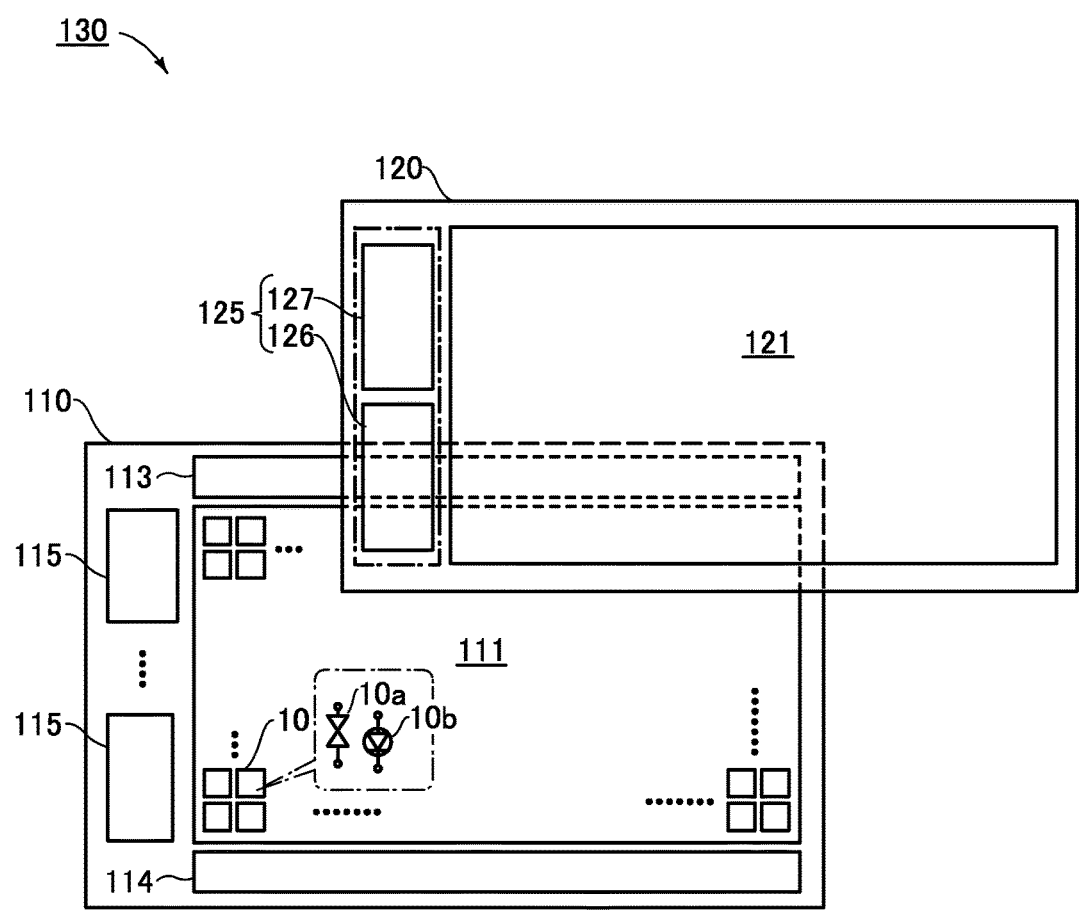
FIG. 30 is a block diagram illustrating a configuration example of a display device.

In this embodiment, the display portion of a hybrid display device will be described.
<Display Device>
FIG. 30 is a block diagram illustrating a configuration example of the display device. A display device 130 includes the display unit 110 and the touch sensor unit 120.
<Display Unit>
The display unit 110 includes a pixel array 111, a gate driver 113, a gate driver 114, and the controller ICs 115 described in Embodiment 1.

The pixel array 111 includes a plurality of pixels 10, and each pixel 10 is an active element driven by a transistor. The pixel 10 includes the reflective element 10a and the light-emitting element 10b. A more specific structure example of the pixel 10 will be described in Embodiment 6.

The gate driver 113 has a function of driving a gate line for selecting the reflective element 10a, and the gate driver 114 has a function of driving a gate line for selecting the light-emitting element 10b. The controller IC 115 is provided with a source driver for driving a source line that supplies a data signal to the reflective element 10a and a source driver for driving a source line that supplies a data signal to the light-emitting element 10b. The controller IC 115 has a function of collectively controlling the operation of the display device 130. The number of controller ICs 115 is determined in accordance with the number of pixels of the pixel array.

Although FIG. 30 illustrates an example in which the gate driver 113 and the gate driver 114 are integrated together with the pixel array 111 over the same substrate, the gate driver 113 and the gate driver 114 can be dedicated ICs. Alternatively, the gate driver 113 or the gate driver 114 may be incorporated in the controller ICs 115.

Although the controller IC 115 is mounted by a chip on glass (COG) method here, there is no particular limitation on the mounting method, and a chip on film (COF) method, a tape automated bonding (TAB) method, or the like may be employed. The same applies to a method for mounting an IC on the touch sensor unit 120.

Note that the transistor used for the pixel 10 is a transistor including an oxide semiconductor in a channel formation region, which has a lower off-state current than a Si transistor. The off-state current of an OS transistor can be extremely low by reducing the concentration of impurities in an oxide semiconductor to make the oxide semiconductor intrinsic or substantially intrinsic. In particular, an oxide semiconductor included in a channel formation region is preferably a CAC-OS which will be described in Embodiment 9.

Note that a transistor used for the pixel 10 does not necessarily include an oxide semiconductor as long as the off-state current of the transistor is low. For example, a transistor including a wide-bandgap semiconductor may be used. The wide-bandgap semiconductor is a semiconductor whose bandgap is 2.2 eV or greater. Examples of the wide-bandgap semiconductor include silicon carbide, gallium nitride, and diamond.

By using the transistor having a low off-state current for the pixel 10, the gate driver 113, the gate driver 114, and the source driver can be temporarily stopped (hereinafter the temporary stop is referred to as "idling stop" or "IDS driving") in the case where rewriting of a display screen is not necessary, that is, a still image is displayed. Power consumption of the display device 130 can be reduced by IDS driving.

<Touch Sensor Unit>

The touch sensor unit 120 in FIG. 30 includes a sensor array 121 and a peripheral circuit 125. The peripheral circuit 125 includes a TS driver 126 and a sensing circuit 127. The peripheral circuit 125 can be composed of a dedicated IC.

Figure 31:
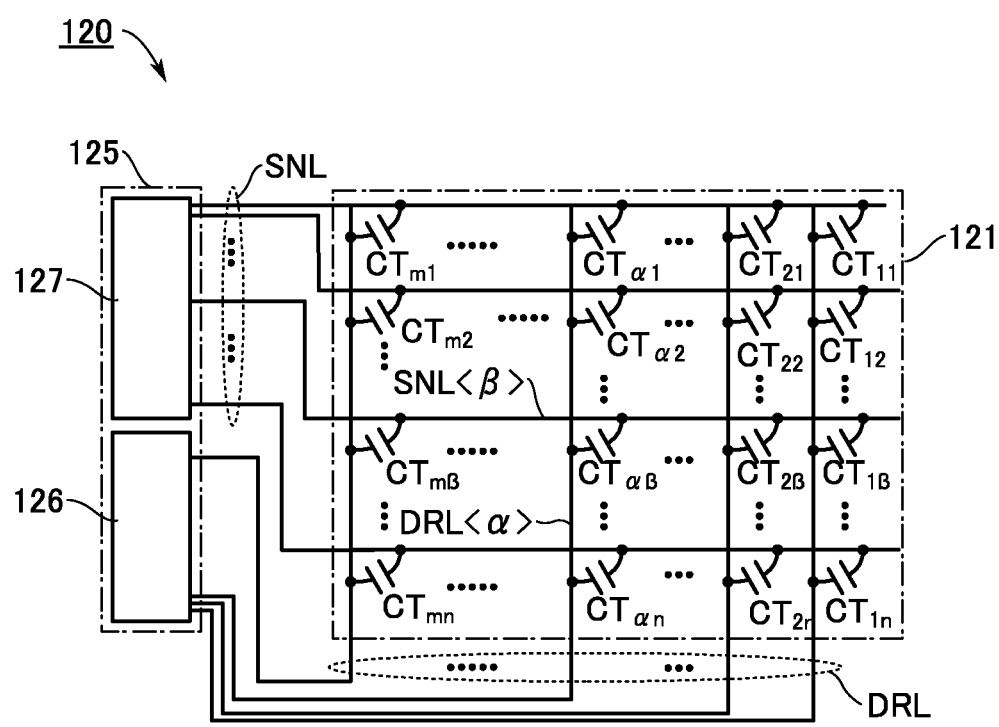
FIG. 31 is a circuit diagram illustrating a configuration example of a touch sensor unit.

FIG. 31 illustrates a configuration example of the touch sensor unit 120. Here, the touch sensor unit 120 is a mutual capacitive touch sensor unit as an example. The sensor array 121 includes m wirings DRL and n wirings SNL, where m is an integer greater than or equal to 1 and n is an integer greater than or equal to 1. The wiring DRL is a driving line, and the wiring SNL is a sensing line. Here, the α-th wiring DRL is referred to as a wiring DRL<α>, and the β-th wiring SNL is referred to as a wiring SNL<β>. A capacitor $CT_{\alpha\beta}$ refers to a capacitor formed between the wiring DRL<α> and the wiring SNL<β>.

The m wirings DRL are electrically connected to the TS driver 126. The TS driver 126 has a function of driving each wiring DRL. The n wirings SNL are electrically connected to the sensing circuit 127. The sensing circuit 127 has a function of sensing signals of wirings SNL. A signal of the wiring SNL<β> at the time when the wiring DRL<α> is driven by the TS driver 126 has information about the change amount of capacitance of the capacitor $CT_{\alpha\beta}$. By analysis of signals of n wirings SNL, information about whether touch operation is performed or not, touch position, and the like can be obtained.

This embodiment can be combined with any of the other embodiments in this specification as appropriate.

Embodiment 5

In this embodiment, a structure example of a display device including a reflective element and a light-emitting element is described. Note that a structure example of a display device including a liquid crystal element as the reflective element and including a light-emitting element with an EL material as the light-emitting element is described in this embodiment.

FIG. 32A illustrates an example of a cross-sectional structure of a display device 200 in one embodiment of the present invention. The display device 200 in FIG. 32A includes a light-emitting element 203, a liquid crystal element 204, a transistor 205 having a function of controlling a current supply to the light-emitting element 203, and a transistor 206 having a function of controlling a voltage supply to the liquid crystal element 204. The light-emitting element 203, the liquid crystal element 204, the transistor 205, and the transistor 206 are positioned between a substrate 201 and a substrate 202.

In the display device 200, the liquid crystal element 204 includes a pixel electrode 207, a common electrode 208, and a liquid crystal layer 209. The pixel electrode 207 is electrically connected to the transistor 206. The alignment of the liquid crystal layer 209 is controlled with a voltage supplied between the pixel electrode 207 and the common electrode 208. Note that FIG. 32A illustrates an example where the pixel electrode 207 has a function of reflecting visible light and the common electrode 208 has a function of transmitting visible light. Light entering through the substrate 202 is reflected by the pixel electrode 207 and exits through the substrate 202 again, as indicated by white arrows.

The light-emitting element 203 is electrically connected to the transistor 205. The light-emitting element 203 emits light to the substrate 202 side. Note that since FIG. 32A illustrates the example where the pixel electrode 207 has a function of reflecting visible light and the common electrode 208 has a function of transmitting visible light, light emitted from the light-emitting element 203 passes through a region which does not overlap with the pixel electrode 207, passes through a region where the common electrode 208 is located, and then exits through the substrate 202, as indicated by a white arrow.

In the display device 200 illustrated in FIG. 32A, the transistor 205 and the transistor 206 are located in the same layer 210, and the layer 210 including the transistor 205 and the transistor 206 includes a region positioned between the liquid crystal element 204 and the light-emitting element 203. In the case where at least a semiconductor layer of the transistor 205 and a semiconductor layer of the transistor 206 are located on the same insulating surface, it can be said that the transistor 205 and the transistor 206 are included in the same layer 210.

Owing to the above structure, the transistor 205 and the transistor 206 can be manufactured through a common manufacturing process.

FIG. 32B illustrates an example of a cross-sectional structure of another display device 200 in one embodiment of the present invention. The structure of the display device 200 in FIG. 32B differs from that of the display device 200 in FIG. 32A in that the transistor 205 and the transistor 206 are included in different layers.

Specifically, the display device 200 in FIG. 32B includes a layer 210a which includes the transistor 205 and a layer 210b which includes the transistor 206, and the layer 210a and the layer 210b each include a region positioned between the liquid crystal element 204 and the light-emitting element 203. In the display device 200 illustrated in FIG. 32B, the layer 210a is closer to the light-emitting element 203 than the layer 210b is. In the case where at least a semiconductor layer of the transistor 205 and a semiconductor layer of the transistor 206 are located on different insulating surfaces, it can be said that the transistor 205 and the transistor 206 are included in different layers.

Owing to the above structure, the transistor 205 and a variety of wirings electrically connected to the transistor 205 can partly overlap with the transistor 206 and a variety of wirings electrically connected to the transistor 206. Thus, the size of the pixel can be decreased, and the resolution of the display device 200 can be increased.

Figure 33A:
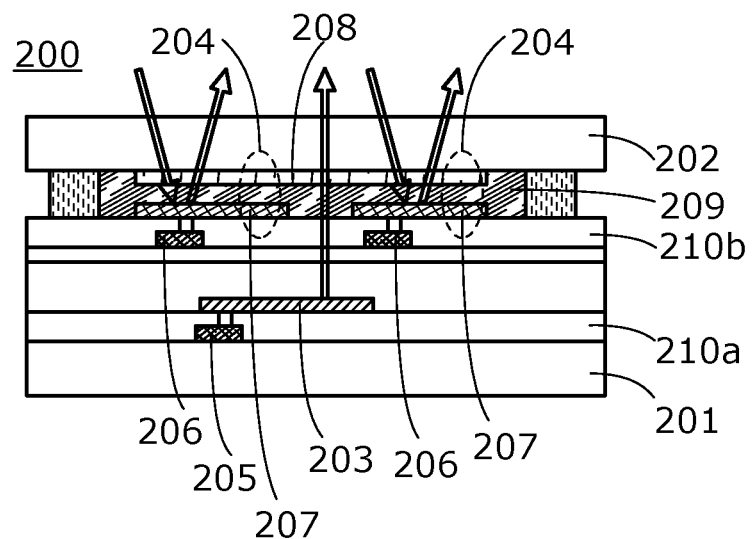
FIGS. 33A and 33B are cross-sectional views each illustrating an example of a display device.

FIG. 33A illustrates an example of a cross-sectional structure of another display device 200 in one embodiment of the present invention. The structure of the display device 200 in FIG. 33A differs from that of the display device 200 in FIG. 32A in that the transistor 205 and the transistor 206 are included in different layers. In addition, the structure of the display device 200 illustrated in FIG. 33A differs from that of the display device 200 in FIG. 32B in that the layer 210*a* including the transistor 205 is closer to the substrate 201 than the light-emitting element 203 is.

Specifically, the display device 200 in FIG. 33A includes the layer 210*a* which includes the transistor 205 and the layer 210*b* which includes the transistor 206. The layer 210*a* includes a region positioned between the light-emitting element 203 and the substrate 201. The layer 210*b* includes a region positioned between the liquid crystal element 204 and the light-emitting element 203.

Owing to the above structure, the transistor 205 and a variety of wirings electrically connected to the transistor 205 can overlap with the transistor 206 and a variety of wirings electrically connected to the transistor 206, to a larger extent than in the case of FIG. 32B. Thus, the size of the pixel can be decreased, and the resolution of the display device 200 can be increased.

Figure 33B:
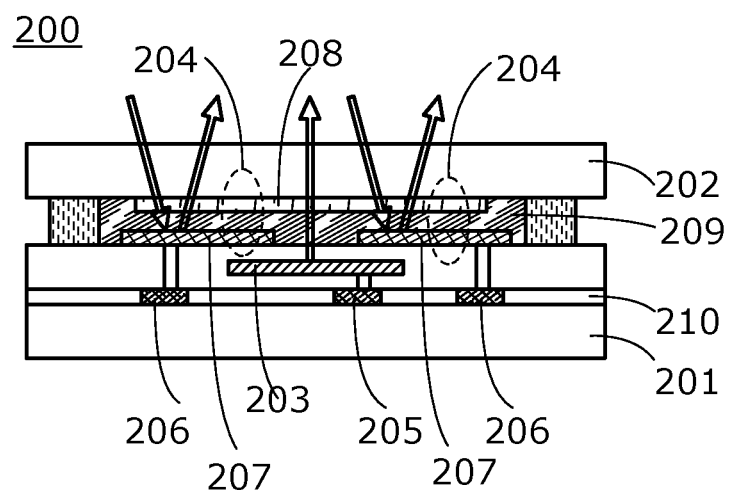

FIG. 33B illustrates an example of a cross-sectional structure of another display device 200 in one embodiment of the present invention. The structure of the display device 200 in FIG. 33B is the same as that of the display device 200 in FIG. 32A in that the transistor 205 and the transistor 206 are included in the same layer. However, the structure of the display device 200 illustrated in FIG. 33B differs from that of the display device 200 in FIG. 32A in that the layer including the transistor 205 and the transistor 206 is closer to the substrate 201 than the light-emitting element 203 is.

Specifically, the display device 200 in FIG. 33B includes the layer 210 which includes the transistor 205 and the transistor 206. The layer 210 includes a region positioned between the light-emitting element 203 and the substrate 201. The liquid crystal element 204 is closer to the substrate 202 than the light-emitting element 203 is.

Owing to the above structure, the transistor 205 and the transistor 206 can be manufactured through a common manufacturing process. A wiring which electrically connects the liquid crystal element 204 and the transistor 206 and a wiring which electrically connects the light-emitting element 203 and the transistor 205 can be provided on the same side of the layer 210. Specifically, the wiring which electrically connects the liquid crystal element 204 and the transistor 206 can be formed over the semiconductor layer of the transistor 206, and the wiring which electrically connects the light-emitting element 203 and the transistor 205 can be formed over the semiconductor layer of the transistor 205. Thus, the manufacturing process can be simpler than that of the display device 200 illustrated in FIG. 32A.

Note that FIGS. 32A and 32B and FIGS. 33A and 33B each illustrate the cross-sectional structure in which one light-emitting element 203 is provided with respect to two liquid crystal elements 204. However, the display device in one embodiment of the present invention may have a cross-sectional structure in which one light-emitting element 203 is provided with respect to one liquid crystal element 204, or may have a cross-sectional structure in which a plurality of light-emitting elements 203 are provided with respect to one liquid crystal element 204.

Although FIGS. 32A and 32B and FIGS. 33A and 33B each illustrate the example where the pixel electrode 207 of the liquid crystal element 204 has a function of reflecting visible light, the pixel electrode 207 may have a function of transmitting visible light. In that case, a light source such as a backlight or a frontlight may be provided in the display device 200, or the light-emitting element 203 may be used as a light source when an image is displayed using the liquid crystal element 204.

This embodiment can be implemented in appropriate combinations with any of the other embodiments.

Embodiment 6

In this embodiment, a configuration example of a pixel of a display device including a reflective element and a light-emitting element is described. Note that a configuration example of a pixel 300 of one embodiment of the present invention in the case of including a liquid crystal element as the reflective element and including a light-emitting element with an EL material as the light-emitting element is described in this embodiment.

Figure 34A:
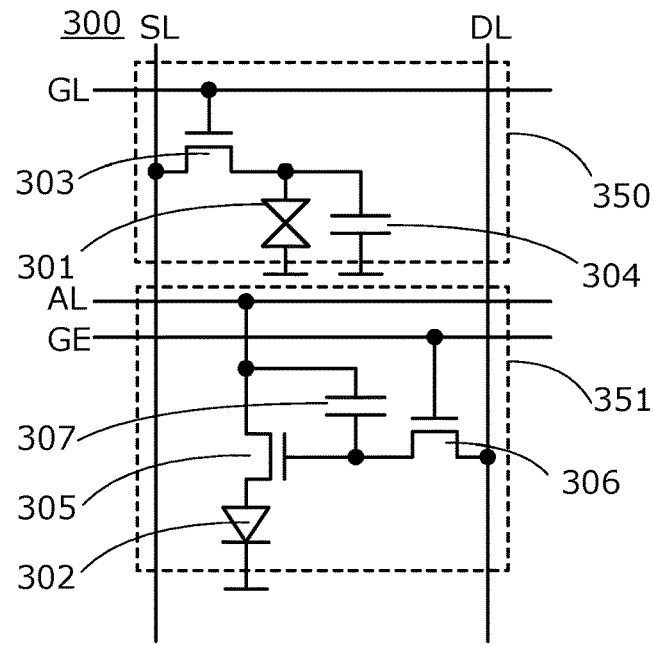
FIGS. 34A and 34B are circuit diagrams each illustrating a configuration example of a pixel circuit.

The pixel 300 illustrated in FIG. 34A includes a pixel 350 and a pixel 351. The pixel 350 includes a liquid crystal element 301, and the pixel 351 includes a light-emitting element 302.

Specifically, the pixel 350 includes the liquid crystal element 301, a transistor 303 having a function of controlling a voltage to be supplied to the liquid crystal element 301, and a capacitor 304. A gate of the transistor 303 is electrically connected to a wiring GL, one of a source and a drain thereof is electrically connected to a wiring SL, and the other of the source and the drain thereof is electrically connected to a pixel electrode of the liquid crystal element 301. A common electrode of the liquid crystal element 301 is electrically connected to a wiring or an electrode to which a predetermined potential is supplied. One electrode of the capacitor 304 is electrically connected to the pixel electrode of the liquid crystal element 301, and the other electrode thereof is electrically connected to a wiring or an electrode to which a predetermined potential is supplied.

Specifically, the pixel 351 includes the light-emitting element 302, a transistor 305 having a function of controlling a current to be supplied to the light-emitting element 302, a transistor 306 having a function of controlling a potential supply to a gate of the transistor 305, and a capacitor 307. A gate of the transistor 306 is electrically connected to a wiring GE, one of a source and a drain thereof is electrically connected to a wiring DL, and the other of the source and the drain thereof is electrically connected to the gate of the transistor 305. One of a source and a drain of the transistor 305 is electrically connected to a wiring AL, and the other of the source and the drain thereof is electrically connected to the light-emitting element 302. One electrode of the capacitor 307 is electrically connected to the wiring AL, and the other electrode thereof is electrically connected to the gate of the transistor 305.

In the pixel 300 illustrated in FIG. 34A, when an image signal for the liquid crystal element 301 is supplied to the wiring SL and an image signal for the light-emitting element 302 is supplied to the wiring DL, the luminance of an image displayed by the liquid crystal element 301 and the luminance of an image displayed by the light-emitting element 302 can be controlled separately.

Although FIG. 34A illustrates a configuration example of the pixel 300 which includes one pixel 350 with the liquid crystal element 301 and one pixel 351 with the light-emitting element 302, the pixel 300 may include a plurality of pixels 350 or a plurality of pixels 351.

Figure 34B:
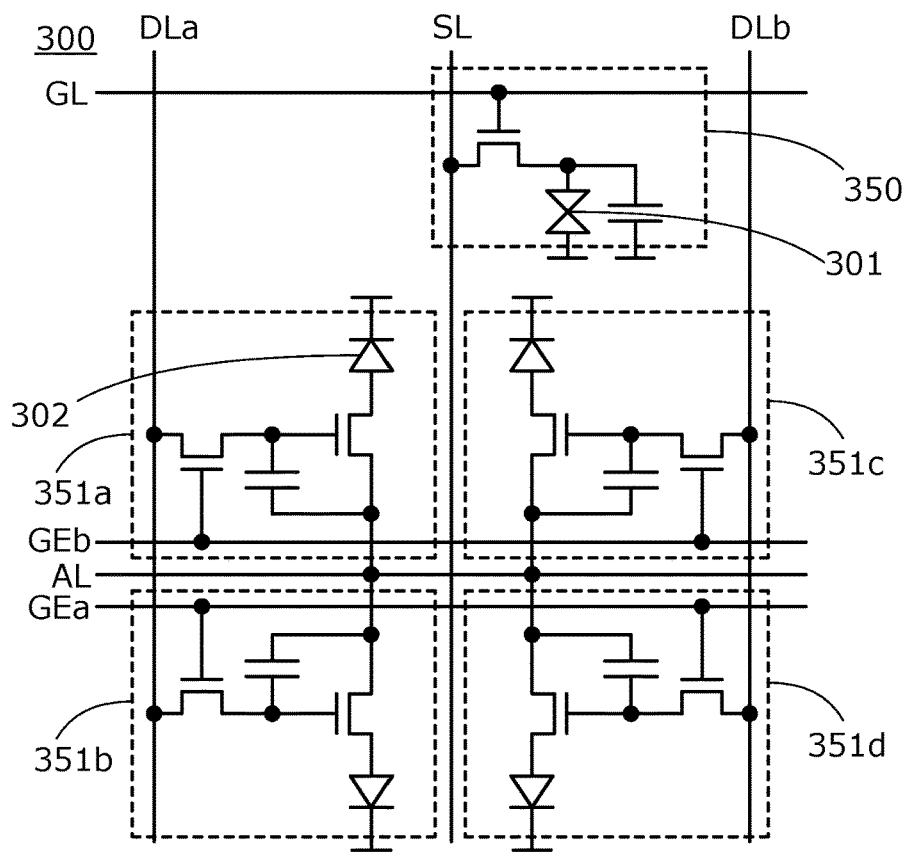

FIG. 34B illustrates a configuration example of the pixel 300 which includes one pixel 350 and four pixels 351.

Specifically, the pixel 300 illustrated in FIG. 34B includes the pixel 350 with the liquid crystal element 301 and pixels 351a to 351d each with the light-emitting element 302.

For the configuration of the pixel 350 in FIG. 34B, the configuration of the pixel 350 in FIG. 34A can be referred to.

Like the pixel 351 in FIG. 34A, the pixels 351a to 351d in FIG. 34B each include the light-emitting element 302, the transistor 305 having a function of controlling a current to be supplied to the light-emitting element 302, the transistor 306 having a function of controlling a potential supply to the gate of the transistor 305, and the capacitor 307. The light-emitting elements 302 of the pixels 351a to 351d emit light having wavelengths in different ranges; thus, the display device can display a color image.

In the pixels 351a to 351d in FIG. 34B, a gate of the transistor 306 included in the pixel 351a and a gate of the transistor 306 included in the pixel 351c are electrically connected to a wiring GEb. A gate of the transistor 306 included in the pixel 351b and a gate of the transistor 306 included in the pixel 351d are electrically connected to a wiring GEa.

In the pixels 351a to 351d in FIG. 34B, one of a source and a drain of the transistor 306 included in the pixel 351a and one of a source and a drain of the transistor 306 included in the pixel 351b are electrically connected to a wiring DLa. One of a source and a drain of the transistor 306 included in the pixel 351c and one of a source and a drain of the transistor 306 included in the pixel 351d are electrically connected to a wiring DLb.

In the pixels 351a to 351d in FIG. 34B, one of a source and a drain of each of the transistors 305 is electrically connected to the wiring AL.

As described above, among the pixels 351 a to 351d in FIG. 34B, the pixel 351a and the pixel 351c share the wiring GEb and the pixel 351b and the pixel 351d share the wiring GEa; however, all the pixels 351a to 351d may share one wiring GE. In that case, it is desired that the pixels 351a to 351d are electrically connected to four respective wirings DL.

Figure 35A:
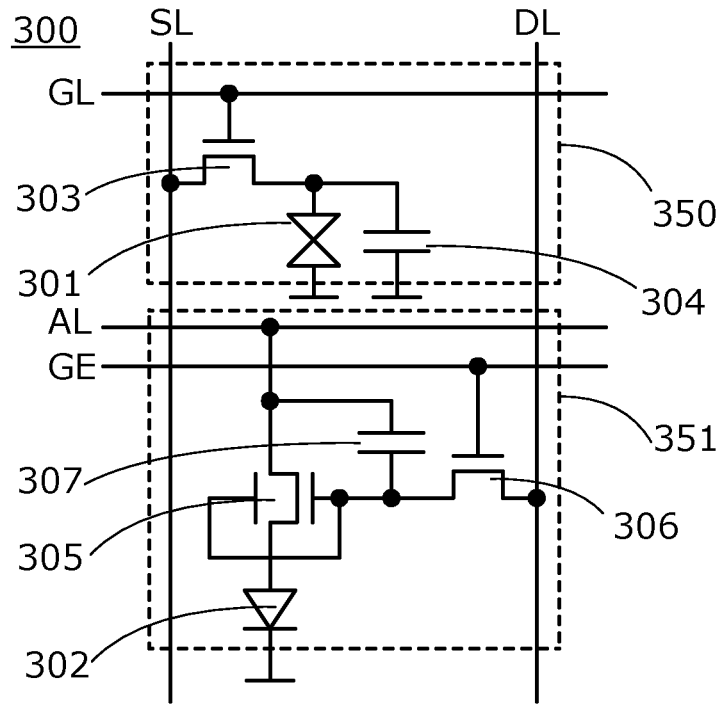
FIGS. 35A and 35B are circuit diagrams each illustrating a configuration example of a pixel circuit.

FIG. 35A illustrates a configuration example of the pixel 300 which is different from that in FIG. 34A. The configuration of the pixel 300 in FIG. 35A differs from that of the pixel 300 in FIG. 34A in that the transistor 305 included in the pixel 351 includes a back gate.

Specifically, in the pixel 300 illustrated in FIG. 35A, the back gate of the transistor 305 is electrically connected to the gate (front gate) thereof. In the pixel 300 in FIG. 35A with the above configuration, a shift of the threshold voltage of the transistor 305 can be reduced, and the reliability of the transistor 305 can be improved. In addition, in the pixel 300 in FIG. 35A with the above configuration, the size of the transistor 305 can be reduced, and the on-state current of the transistor 305 can be increased.

Note that in the display device of one embodiment of the present invention, the pixel 300 may include a plurality of pixels 350 illustrated in FIG. 35A or a plurality of pixels 351 illustrated in FIG. 35A. Specifically, like the pixel 300 in FIG. 34B, the pixel 300 may include one pixel 350 and four pixels 351 illustrated in FIG. 35A. In that case, for connections of a variety of wirings and the four pixels 351, the pixel 300 in FIG. 34B can be referred to.

Figure 35B:
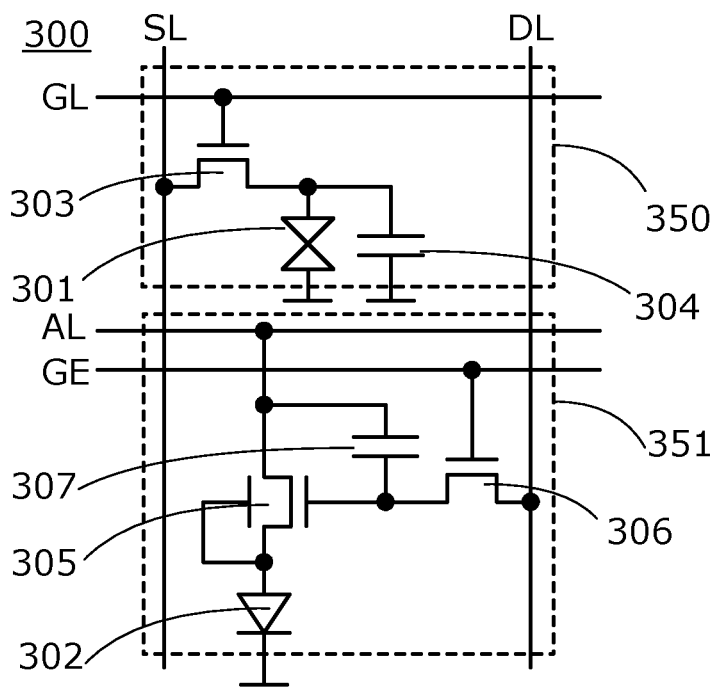

FIG. 35B illustrates a configuration example of the pixel 300 which is different from that in FIG. 34A. The configuration of the pixel 300 in FIG. 35B differs from that of the pixel 300 in FIG. 34A in that the transistor 305 included in the pixel 351 includes a back gate. In addition, the configuration of the pixel 300 in FIG. 35B differs from that of the pixel 300 in FIG. 35A in that the back gate of the transistor 305 is electrically connected to not the gate thereof but the light-emitting element 302.

In the pixel 300 in FIG. 35B with the above configuration, a shift of the threshold voltage of the transistor 305 can be reduced, and the reliability of the transistor 305 can be improved.

Note that in the display device of one embodiment of the present invention, the pixel 300 may include a plurality of pixels 350 illustrated in FIG. 35B or a plurality of pixels 351 illustrated in FIG. 35B. Specifically, like the pixel 300 in FIG. 34B, the pixel 300 may include one pixel 350 and four pixels 351 illustrated in FIG. 35B. In that case, for connections of a variety of wirings and the four pixels 351, the pixel 300 in FIG. 34B can be referred to.

Figure 36:
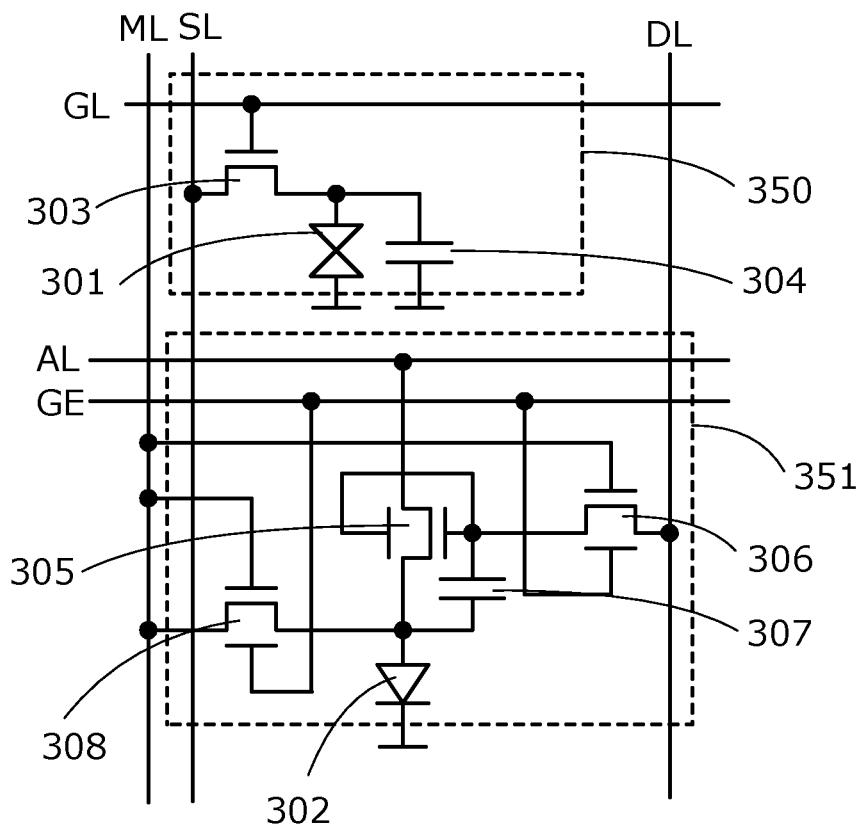
FIG. 36 is a circuit diagram illustrating a configuration example of a pixel circuit.

FIG. 36 illustrates a configuration example of the pixel 300 which is different from that in FIG. 34A. The pixel 300 in FIG. 36 includes the pixel 350 and the pixel 351, and the configuration of the pixel 351 differs from that in FIG. 34A.

Specifically, the pixel 351 in FIG. 36 includes the light-emitting element 302, the transistor 305 having a function of controlling a current to be supplied to the light-emitting element 302, the transistor 306 having a function of controlling a potential supply to the gate of the transistor 305, a transistor 308 having a function of supplying a predetermined potential to the pixel electrode of the light-emitting element 302, and the capacitor 307. The transistor 305, the transistor 306, and the transistor 308 each include a back gate.

A gate (front gate) of the transistor 306 is electrically connected to a wiring ML, the back gate thereof is electrically connected to the wiring GE, one of a source and a drain thereof is electrically connected to the wiring DL, and the other of the source and the drain thereof is electrically connected to the gate and the back gate of the transistor 305. One of a source and a drain of the transistor 305 is electrically connected to the wiring AL, and the other of the source and the drain thereof is electrically connected to the light-emitting element 302.

A gate (front gate) of the transistor 308 is electrically connected to the wiring ML, the back gate thereof is electrically connected to the wiring GE, one of a source and a drain thereof is electrically connected to the wiring ML, and the other of the source and the drain thereof is electrically connected to the light-emitting element 302. One electrode of the capacitor 307 is electrically connected to the light-emitting element 302, and the other electrode thereof is electrically connected to the gate of the transistor 305.

Although FIG. 36 illustrates a configuration example of the pixel 300 which includes one pixel 350 with the liquid crystal element 301 and one pixel 351 with the light-emitting element 302, the pixel 300 may include a plurality of pixels 350 or a plurality of pixels 351.

Figure 37:
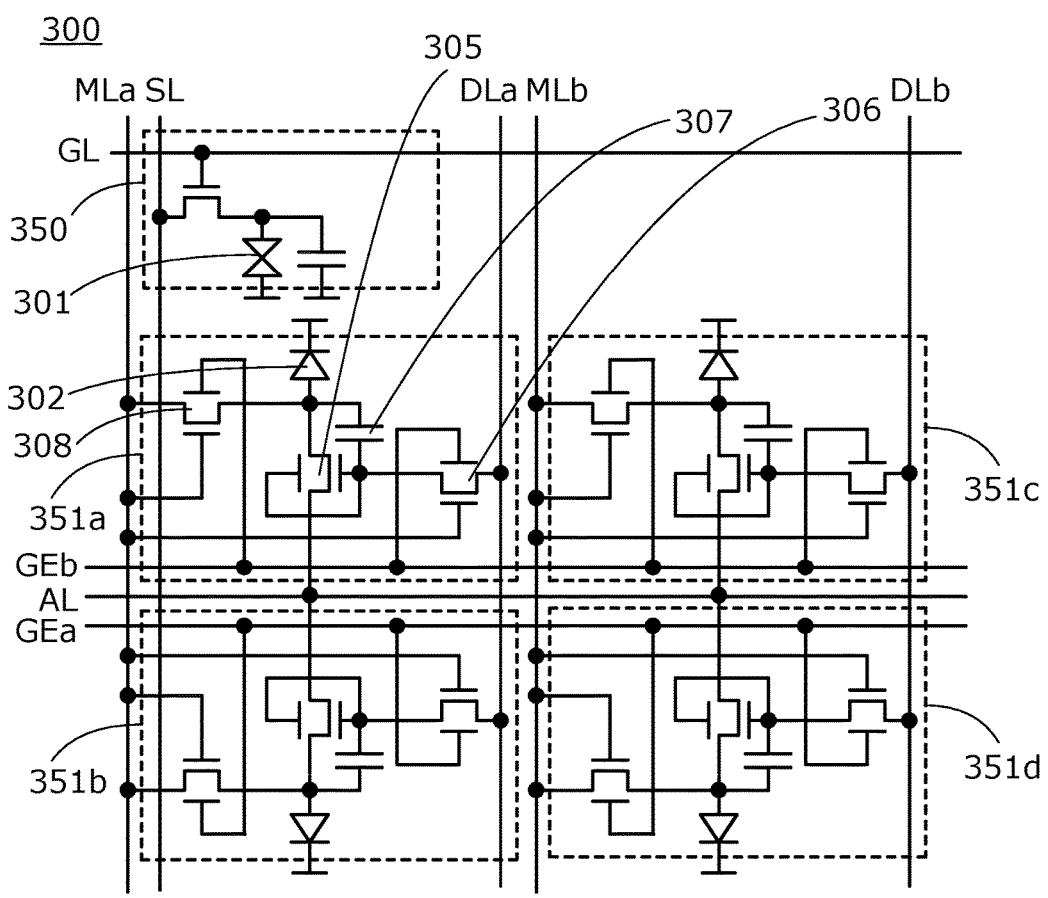
FIG. 37 is a circuit diagram illustrating a configuration example of a pixel circuit.

FIG. 37 illustrates a configuration example of the pixel 300 which includes one pixel 350 and four pixels 351.

Specifically, the pixel 300 illustrated in FIG. 37 includes the pixel 350 with the liquid crystal element 301 and pixels 351a to 351d each with the light-emitting element 302.

For the configuration of the pixel 350 in FIG. 37, the configuration of the pixel 350 in FIG. 36 can be referred to.

Like the pixel 351 in FIG. 36, the pixels 351a to 351d in FIG. 37 each include the light-emitting element 302, the transistor 305 having a function of controlling a current supply to the light-emitting element 302, the transistor 306 having a function of controlling a potential supply to the gate of the transistor 305, the transistor 308 having a function of supplying a predetermined potential to the pixel electrode of the light-emitting element 302, and the capacitor 307. The light-emitting elements 302 of the pixels 351a to 351d emit light having wavelengths in different ranges; thus, the display device can display a color image.

In the pixels 351a to 351d in FIG. 37, a gate of the transistor 306 included in the pixel 351a and a gate of the transistor 306 included in the pixel 351b are electrically connected to a wiring MLa. A gate of the transistor 306 included in the pixel 351c and a gate of the transistor 306 included in the pixel 351d are electrically connected to a wiring MLb.

In the pixels 351a to 351d in FIG. 37, a back gate of the transistor 306 included in the pixel 351a and a back gate of the transistor 306 included in the pixel 351c are electrically connected to the wiring GEb. A back gate of the transistor 306 included in the pixel 351b and a back gate of the transistor 306 included in the pixel 351d are electrically connected to the wiring GEa.

In the pixels 351a to 351d in FIG. 37, one of a source and a drain of the transistor 306 included in the pixel 351a and one of a source and a drain of the transistor 306 included in the pixel 351b are electrically connected to the wiring DLa. One of a source and a drain of the transistor 306 included in the pixel 351c and one of a source and a drain of the transistor 306 included in the pixel 351d are electrically connected to the wiring DLb.

In the pixels 351a to 351d in FIG. 37, a back gate of the transistor 308 included in the pixel 351a and a back gate of the transistor 308 included in the pixel 351c are electrically connected to the wiring GEb. A back gate of the transistor 308 included in the pixel 351b and a back gate of the transistor 308 included in the pixel 351d are electrically connected to the wiring GEa.

In the pixels 351a to 351d in FIG. 37, a gate (front gate) and one of a source and a drain of the transistor 308 included in the pixel 351a are electrically connected to the wiring MLa, and a gate (front gate) and one of a source and a drain of the transistor 308 included in the pixel 351b are electrically connected to the wiring MLa. A gate (front gate) and one of a source and a drain of the transistor 308 included in the pixel 351c are electrically connected to the wiring MLb, and a gate (front gate) and one of a source and a drain of the transistor 308 included in the pixel 351d are electrically connected to the wiring MLb.

In the pixels 351a to 351d in FIG. 37, one of a source and a drain of each of the transistors 305 is electrically connected to the wiring AL.

As described above, among the pixels 351a to 351d in FIG. 37, the pixel 351a and the pixel 351c share the wiring GEb and the pixel 351b and the pixel 351d share the wiring GEa; however, all the pixels 351a to 351d may share one wiring GE. In that case, it is desired that the pixels 351a to 351d are electrically connected to four respective wirings DL.

Note that in the case where a transistor with a low off-state current is used in the pixel 350 and thus there is no need to rewrite the display screen (i.e., in the case of displaying a still image), a driver circuit can be temporarily stopped (this driving is hereinafter referred to as "idling stop" or "IDS driving"). By IDS driving, the power consumption of the display device 200 can be reduced.

This embodiment can be implemented in appropriate combinations with any of the other embodiments.

Embodiment 7

In this embodiment, using the display device 200 illustrated in FIG. 33A as an example, a specific structure example of the display device 200 including a reflective element and a light-emitting element will be described.

Figure 38:
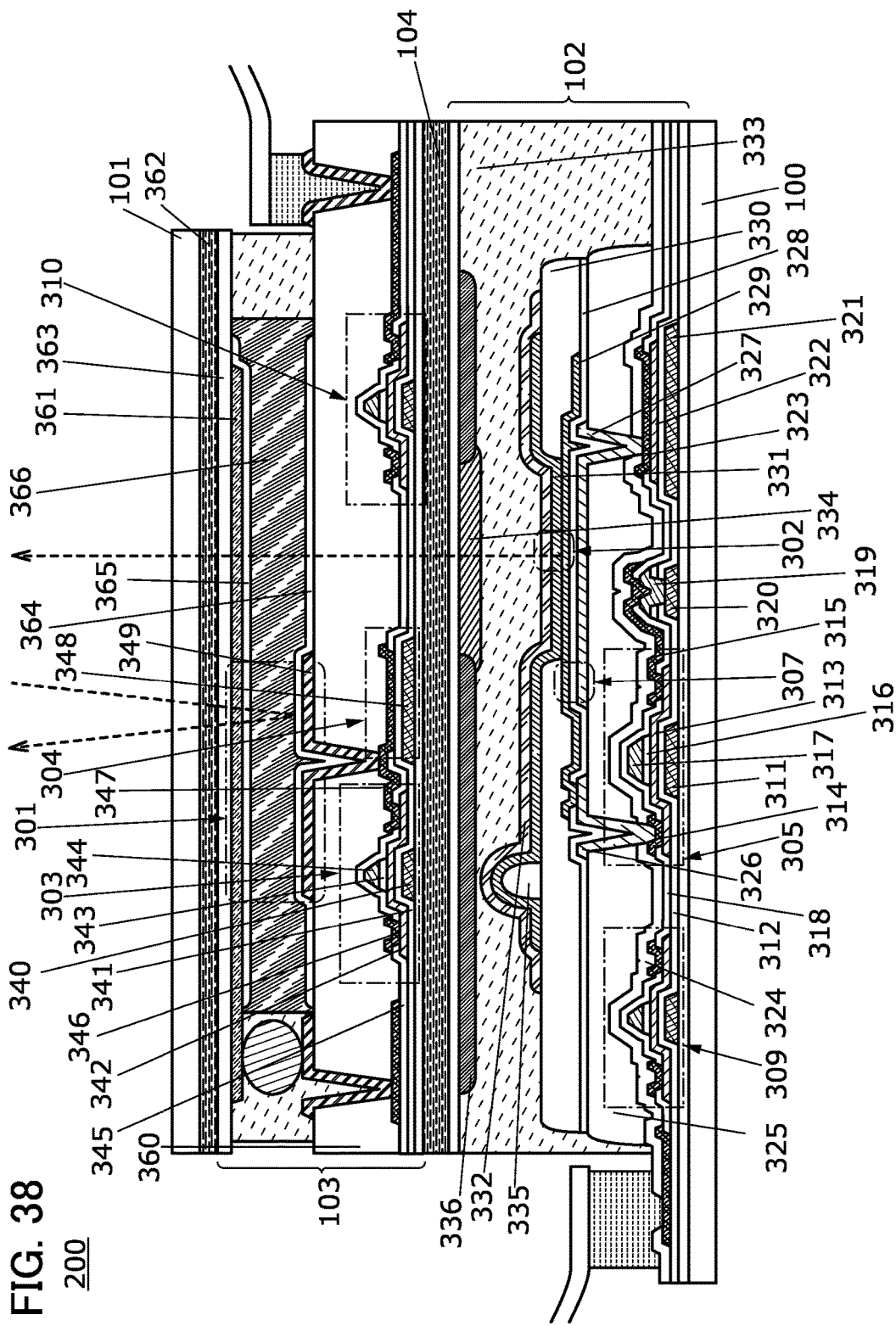
FIG. 38 is a cross-sectional view illustrating an example of a display device.

FIG. 38 illustrates an example of a cross-sectional structure of the display device 200.

The display device 200 illustrated in FIG. 38 has a structure in which a display portion 102 and a display portion 103 are stacked between a substrate 100 and a substrate 101. Specifically, the display portion 102 and the display portion 103 are bonded to each other with a bonding layer 104 in FIG. 38.

In addition, the light-emitting element 302, the transistor 305, and the capacitor 307 included in the pixel of the display portion 102, and a transistor 309 included in a driver circuit of the display portion 102 are illustrated in FIG. 38. Furthermore, the liquid crystal element 301, the transistor 303, and the capacitor 304 included in the pixel of the display portion 103, and a transistor 310 included in a driver circuit of the display portion 103 are illustrated in FIG. 38.

The transistor 305 includes a conductive layer 311 functioning as a back gate, an insulating layer 312 over the conductive layer 311, a semiconductor layer 313 which is provided over the insulating layer 312 to overlap with the conductive layer 311, an insulating layer 316 over the semiconductor layer 313, a conductive layer 317 which functions as a gate and is positioned over the insulating layer 316, and conductive layers 314 and 315 which are positioned over an insulating layer 318 over the conductive layer 317 and electrically connected to the semiconductor layer 313.

The conductive layer 315 is electrically connected to a conductive layer 319. The conductive layer 319 is electrically connected to a conductive layer 320. The conductive layer 319 is formed in the same layer as the conductive layer 317. The conductive layer 320 is formed in the same layer as the conductive layer 311.

A conductive layer 321 which functions as a back gate of the transistor 306 (not illustrated) is positioned in the same layer as the conductive layers 311 and 320. The insulating layer 312 is positioned over the conductive layer 321. A semiconductor layer 322 which includes a region overlapping with the conductive layer 321 is positioned over the insulating layer 312. The semiconductor layer 322 includes a channel formation region of the transistor 306 (not illustrated). The insulating layer 318 is positioned over the semiconductor layer 322. A conductive layer 323 is positioned over the insulating layer 318. The conductive layer 323 is electrically connected to the semiconductor layer 322. The conductive layer 323 functions as a source or a drain of the transistor 306 (not illustrated).

Since the transistor 309 has a structure similar to that of the transistor 305, detailed description thereof is omitted.

An insulating layer 324 is positioned over the transistor 305, the conductive layer 323, and the transistor 309. An insulating layer 325 is positioned over the insulating layer 324. A conductive layer 326 and a conductive layer 327 are positioned over the insulating layer 325. The conductive layer 326 is electrically connected to the conductive layer 314. The conductive layer 327 is electrically connected to the conductive layer 323. An insulating layer 328 is positioned over the conductive layer 326 and the conductive layer 327. A conductive layer 329 is positioned over the insulating layer 328. The conductive layer 329 is electrically connected to the conductive layer 326 and functions as a pixel electrode of the light-emitting element 302.

A region where the conductive layer 327, the insulating layer 328, and the conductive layer 329 overlap with one another functions as the capacitor 307.

An insulating layer 330 is positioned over the conductive layer 329. An EL layer 331 is positioned over the insulating layer 330. A conductive layer 332 functioning as a counter electrode is positioned over the EL layer 331. The conductive layer 329, the EL layer 331, and the conductive layer 332 are electrically connected to one another in an opening of the insulating layer 330. A region where the conductive layer 329, the EL layer 331, and the conductive layer 332 are electrically connected to one another functions as the light-emitting element 302. The light-emitting element 302 has a top emission structure in which light is emitted from the conductive layer 332 side toward a direction shown by an arrow of a broken line.

One of the conductive layer 329 and the conductive layer 332 functions as an anode, and the other thereof functions as a cathode. When a voltage higher than the threshold voltage of the light-emitting element 302 is supplied between the conductive layer 329 and the conductive layer 332, holes are injected to the EL layer 331 from the anode side and electrons are injected to the EL layer 331 from the cathode side. The injected electrons and holes are recombined in the EL layer 331 and a light-emitting substance contained in the EL layer 331 emits light.

Note that when an oxide semiconductor is used for each of the semiconductor layers 313 and 322, it is preferable that an insulating material containing oxygen be used for the insulating layer 318 and that a material in which an impurity such as water or hydrogen is less likely to diffuse be used for the insulating layer 324 in order to increase the reliability of the display device.

In the case where an organic material is used for the insulating layer 325 or the insulating layer 330, when the insulating layer 325 or the insulating layer 330 is exposed at an end portion of the display device, an impurity such as moisture might enter the light-emitting element 302 or the like from the outside of the display device through the insulating layer 325 or the insulating layer 330. Deterioration of the light-emitting element 302 due to the entry of impurities can lead to deterioration of the display device. Thus, as illustrated in FIG. 38, it is preferable that neither the insulating layer 325 nor the insulating layer 330 be positioned at the end portion of the display device.

The light-emitting element 302 overlaps with a coloring layer 334 with a bonding layer 333 positioned therebetween. A spacer 335 and a light-blocking layer 336 overlap with each other with the bonding layer 333 positioned therebetween. Although FIG. 38 illustrates the case where a space is provided between the conductive layer 332 and the light-blocking layer 336, the conductive layer 332 and the light-blocking layer 336 may be in contact with each other.

The coloring layer 334 is a colored layer that transmits light in a specific wavelength range. For example, a color filter that transmits light in a specific wavelength range, such as red, green, blue, or yellow light, can be used.

Note that one embodiment of the present invention is not limited to a color filter method, and a separate coloring method, a color conversion method, a quantum dot method, and the like may be employed.

The transistor 303 in the display portion 103 includes a conductive layer 340 functioning as a back gate, an insulating layer 341 over the conductive layer 340, a semiconductor layer 342 which is provided over the insulating layer 341 to overlap with the conductive layer 340, an insulating layer 343 over the semiconductor layer 342, a conductive layer 344 which functions as a gate and is positioned over the insulating layer 343, and conductive layers 346 and 347 which are positioned over an insulating layer 345 over the conductive layer 344 and electrically connected to the semiconductor layer 342.

A conductive layer 348 is positioned in the same layer as the conductive layer 340. The insulating layer 341 is positioned over the conductive layer 348. The conductive layer 347 is positioned over the insulating layer 341 to overlap with the conductive layer 348. A region where the conductive layer 347, the insulating layer 341, and the conductive layer 348 overlap with one another functions as the capacitor 304.

Since the transistor 310 has a structure similar to that of the transistor 303, detailed description thereof is omitted.

An insulating layer 360 is positioned over the transistor 303, the capacitor 304, and the transistor 310. A conductive layer 349 is positioned over the insulating layer 360. The conductive layer 349 is electrically connected to the conductive layer 347 and functions as a pixel electrode of the liquid crystal element 301. An alignment film 364 is positioned over the conductive layer 349.

A conductive layer 361 functioning as a common electrode is provided over the substrate 101. Specifically, in FIG. 38, an insulating layer 363 is attached so as to be positioned over the substrate 101 with a bonding layer 362 positioned therebetween, and the conductive layer 361 is positioned on the insulating layer 363. Furthermore, an alignment film 365 is positioned on the conductive layer 361, and a liquid crystal layer 366 is positioned between the alignment film 364 and the alignment film 365.

In FIG. 38, the conductive layer 349 has a function of reflecting visible light, and the conductive layer 361 has a function of transmitting visible light; accordingly, light entering through the substrate 101 can be reflected by the conductive layer 349 and then exits through the substrate 101, as shown by an arrow of a broken line.

For example, a material containing one of indium (In), zinc (Zn), and tin (Sn) is preferably used for the conductive material that transmits visible light. Specifically, indium oxide, indium tin oxide (ITO), indium zinc oxide, indium oxide containing tungsten oxide, indium zinc oxide containing tungsten oxide, indium oxide containing titanium oxide, indium tin oxide containing titanium oxide, indium tin oxide containing silicon oxide (ITSO), zinc oxide, and zinc oxide containing gallium are given, for example. Note that a film including graphene can be used as well. The film including graphene can be formed, for example, by reducing a film containing graphene oxide.

Examples of a conductive material that reflects visible light include aluminum, silver, and an alloy including any of these metal elements. Furthermore, a metal material such as gold, platinum, nickel, tungsten, chromium, molybdenum, iron, cobalt, copper, or palladium or an alloy containing any of these metal materials can be used. Furthermore, lanthanum, neodymium, germanium, or the like may be added to the metal material or the alloy. Furthermore, an alloy containing aluminum (an aluminum alloy) such as an alloy of aluminum and titanium, an alloy of aluminum and nickel, an alloy of aluminum and neodymium, or an alloy of aluminum, nickel, and lanthanum (Al—Ni—La), or an alloy containing silver such as an alloy of silver and copper, an alloy of silver, palladium, and copper (also referred to as Ag—Pd—Cu or APC), or an alloy of silver and magnesium may be used.

Although the structure of the display device including a top-gate transistor with a back gate is illustrated in FIG. 38, the display device of one embodiment of the present invention may include a transistor without a back gate or a transistor including a back gate.

There is no particular limitation on the crystallinity of a semiconductor material used for the transistor, and an amorphous semiconductor or a semiconductor having crystallinity (a microcrystalline semiconductor, a polycrystalline semiconductor, a single crystal semiconductor, or a semiconductor partly including crystal regions) may be used. A semiconductor having crystallinity is preferably used, in which case deterioration of the transistor characteristics can be suppressed.

As the semiconductor material used for the transistor, an oxide semiconductor can be used. Typically, an oxide semiconductor containing indium can be used. Especially, the oxide semiconductor used for the transistor is preferably a CAC-OS which will be described in Embodiment 9.

In particular, a semiconductor material having a wider band gap and a lower carrier density than silicon is preferably used because the off-state current of the transistor can be reduced.

The semiconductor layer preferably includes, for example, a film represented by an In-M-Zn-based oxide that contains at least indium, zinc, and M (a metal such as aluminum, titanium, gallium, germanium, yttrium, zirconium, lanthanum, cerium, tin, neodymium, or hafnium). In order to reduce variations in electrical characteristics of the transistors including the oxide semiconductor, the oxide semiconductor preferably contains a stabilizer in addition to In, Zn and M.

Examples of the stabilizer, including the metals that can be used as M, are gallium, tin, hafnium, aluminum, and zirconium. Other examples of the stabilizer are lanthanoid such as lanthanum, cerium, praseodymium, neodymium, samarium, europium, gadolinium, terbium, dysprosium, holmium, erbium, thulium, ytterbium, and lutetium.

As an oxide semiconductor included in the semiconductor layer, any of the following can be used, for example: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Note that here, for example, an "In—Ga—Zn-based oxide" means an oxide containing In, Ga, and Zn as its main components and there is no limitation on the ratio of In:Ga:Zn. The In—Ga—Zn-based oxide may contain another metal element in addition to In, Ga, and Zn.

Note that although the structure of the display device in which a liquid crystal element is used as a reflective element is exemplified in this embodiment, a microelectromechanical systems (MEMS) shutter element, an optical interference type MEMS element, a display element using a microcapsule method, an electrophoretic method, an electrowetting method, an Electronic Liquid Powder (registered trademark) method, or the like can also be used as a reflective element, other than a liquid crystal element.

As the light-emitting element, a self-luminous light-emitting element such as an organic light-emitting diode (OLED), a light-emitting diode (LED), and a quantum-dot light-emitting diode (QLED) can be used.

The liquid crystal element can employ, for example, a vertical alignment (VA) mode. Examples of the vertical alignment mode include a multi-domain vertical alignment (MVA) mode, a patterned vertical alignment (PVA) mode, and an advanced super view (ASV) mode.

The liquid crystal element can employ a variety of modes; for example, other than the VA mode, a twisted nematic (TN) mode, an in-plane switching (IPS) mode, a fringe field switching (FFS) mode, an axially symmetric aligned microcell (ASM) mode, an optically compensated birefringence (OCB) mode, a ferroelectric liquid crystal (FLC) mode, or an antiferroelectric liquid crystal (AFLC) mode can be used.

As the liquid crystal used for the liquid crystal element, thermotropic liquid crystal, low-molecular liquid crystal, high-molecular liquid crystal, polymer dispersed liquid crystal (PDLC), ferroelectric liquid crystal, anti-ferroelectric liquid crystal, or the like can be used. These liquid crystal materials exhibit a cholesteric phase, a smectic phase, a cubic phase, a chiral nematic phase, an isotropic phase, or the like depending on conditions.

As the liquid crystal material, either a positive liquid crystal or a negative liquid crystal may be used, and an appropriate liquid crystal material can be used depending on the mode or design to be used.

An alignment film can be provided to adjust the alignment of liquid crystal. In the case where a horizontal electric field mode is employed, liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which several weight percent or more of a chiral material is mixed is used for the liquid crystal layer in order to improve the temperature range. The liquid crystal composition which includes liquid crystal exhibiting a blue phase and a chiral material has a short response time and has optical isotropy. In addition, the liquid crystal composition which includes liquid crystal exhibiting a blue phase and a chiral material does not need alignment treatment and has small viewing angle dependence. An alignment film is not necessarily provided and rubbing treatment is thus not necessary; accordingly, electrostatic discharge damage caused by the rubbing treatment can be prevented and defects and damage of the liquid crystal display device in the manufacturing process can be reduced.

This embodiment can be implemented in appropriate combinations with any of the other embodiments.

Embodiment 8

Figure 39A:
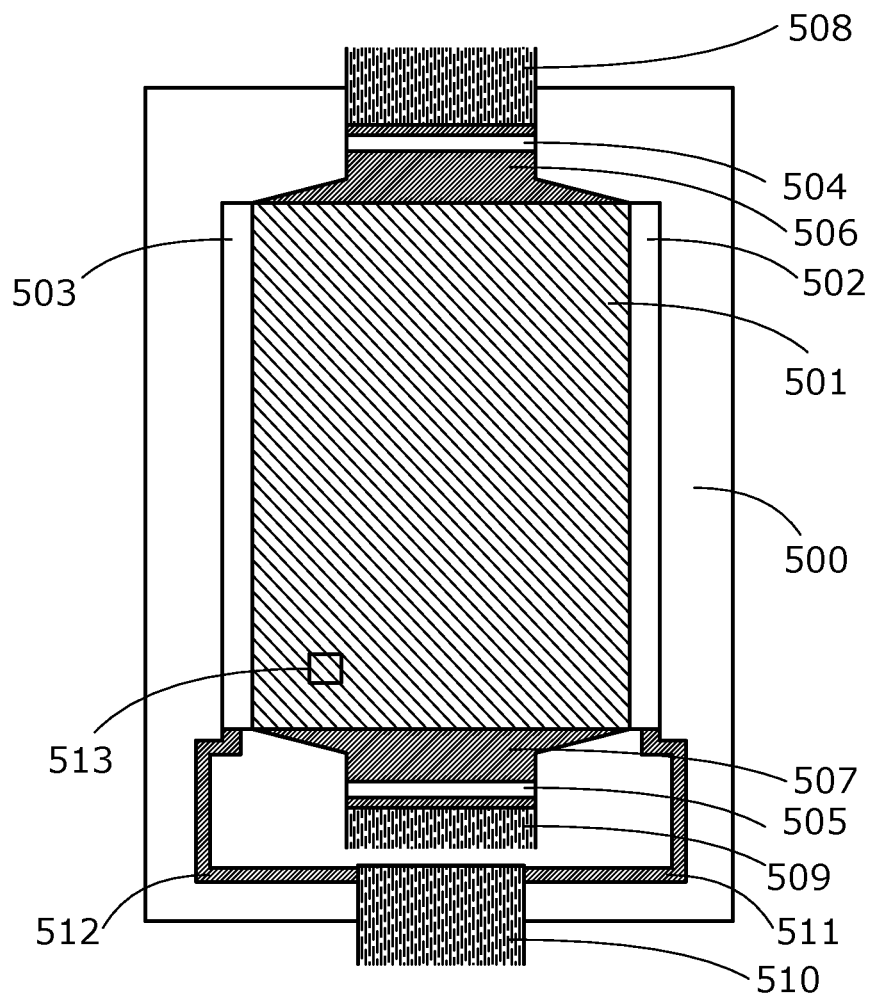
FIG. 39A is a top view of a display device.

FIG. 39A illustrates an example of the appearance of a display device 200 of one embodiment of the present invention. The display device 200 in FIG. 39A includes a pixel portion 501 over a substrate 500, a scan line driver circuit 502 for pixels including reflective elements, and a scan line driver circuit 503 for pixels including light-emitting elements. An IC 504 includes a signal line driver circuit for the pixels including reflective elements, and is electrically connected to the pixel portion 501 through a wiring 506. An IC 505 includes a signal line driver circuit for the pixels including light-emitting elements, and is electrically connected to the pixel portion 501 through a wiring 507.

An FPC 508 is electrically connected to the IC 504, and an FPC 509 is electrically connected to the IC 505. An FPC 510 is electrically connected to the scan line driver circuit 502 through a wiring 511. The FPC 510 is also electrically connected to the scan line driver circuit 503 through a wiring 512.

Figure 39B:
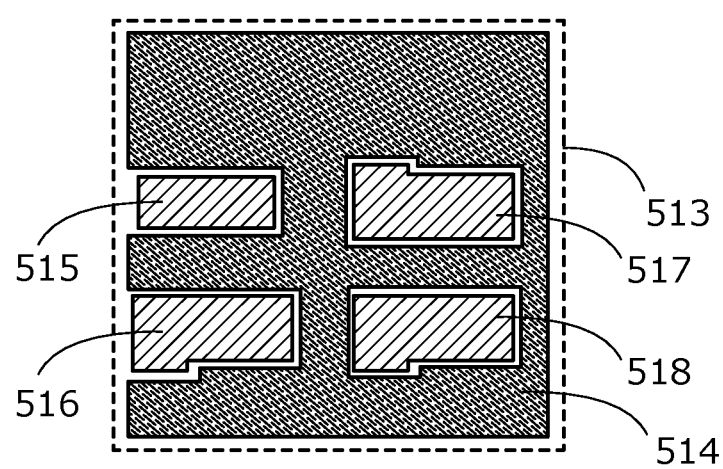
FIG. 39B is a top view of a pixel.

FIG. 39B illustrates a layout of a display region of a liquid crystal element and a layout of a display region of a light-emitting element in a pixel 513 included in the pixel portion 501 in the case where a liquid crystal element is used as the reflective element and an element such as an organic EL element is used as the light-emitting element, for example.

Specifically, the pixel 513 in FIG. 39B includes a display region 514 of the liquid crystal element, a display region 515 of a light-emitting element corresponding to yellow, a display region 516 of a light-emitting element corresponding to green, a display region 517 of a light-emitting element corresponding to red, and a display region 518 of a light-emitting element corresponding to blue.

Note that in order to display black with high color reproducibility by using the light-emitting elements corresponding to green, blue, red, and yellow, the amount of current flowing to the light-emitting element corresponding to yellow per unit area needs to be the smallest among those flowing to the light-emitting elements. In FIG. 39B, the display region 516 of the light-emitting element corresponding to green, the display region 517 of the light-emitting element corresponding to red, and the display region 518 of the light-emitting element corresponding to blue have substantially the same area, and the display region 515 of the light-emitting element corresponding to yellow has a slightly smaller area than the other display regions. Therefore, black can be displayed with high color reproducibility.

This embodiment can be implemented in appropriate combinations with any of the other embodiments.

Embodiment 9

<Composition of CAC-OS>

Described below will be the composition of a cloud-aligned composite oxide semiconductor (CAC-OS) applicable to a transistor of one embodiment of the present invention.

The CAC-OS has, for example, a composition in which elements included in an oxide semiconductor are unevenly distributed. Materials including unevenly distributed elements each have a size of greater than or equal to 0.5 nm and less than or equal to 10 nm, preferably greater than or equal to 1 nm and less than or equal to 2 nm, or a similar size. Note that in the following description of an oxide semiconductor, a state in which one or more metal elements are unevenly distributed and regions including the metal element(s) are mixed is referred to as a mosaic pattern or a patch-like pattern. The region has a size of greater than or equal to 0.5 nm and less than or equal to 10 nm, preferably greater than or equal to 1 nm and less than or equal to 2 nm, or a similar size.

Note that an oxide semiconductor preferably contains at least indium. In particular, indium and zinc are preferably contained. In addition, one or more of aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, of the CAC-OS, an In—Ga—Zn oxide with the CAC composition (such an In—Ga—Zn oxide may be particularly referred to as CAC-IGZO) has a composition in which materials are separated into indium oxide ($InO_{X1}$, where X1 is a real number greater than 0) or indium zinc oxide ($In_{X2}Zn_{Y2}O_{Z2}$, where X2, Y2, and Z2 are real numbers greater than 0), and gallium oxide ($GaO_{X3}$, where X3 is a real number greater than 0) or gallium zinc oxide ($Ga_{X4}Zn_{Y4}O_{Z4}$, where X4, Y4, and Z4 are real numbers greater than 0), and a mosaic pattern is formed. Then, $InO_{X1}$ or $In_{X2}Zn_{Y2}O_{Z2}$ forming the mosaic pattern is evenly distributed in the film. This composition is also referred to as a cloud-like composition.

That is, the CAC-OS is a composite oxide semiconductor with a composition in which a region including $GaO_{X3}$ as a main component and a region including $In_{X2}Zn_{Y2}O_{Z2}$ or $InO_{X1}$ as a main component are mixed. Note that in this specification, for example, when the atomic ratio of In to an element M in a first region is greater than the atomic ratio of In to an element M in a second region, the first region has higher In concentration than the second region.

Note that a compound including In, Ga, Zn, and O is also known as IGZO. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ ($-1 \leq x0 \leq 1$; m0 is a given number).

The above crystalline compounds have a single crystal structure, a polycrystalline structure, or a c-axis-aligned crystalline or c-axis-aligned a-b-plane-anchored crystal (CAAC) structure. Note that the CAAC structure is a crystal structure in which a plurality of IGZO nanocrystals have c-axis alignment and are connected in the a-b plane direction without alignment.

On the other hand, the CAC-OS relates to the material composition of an oxide semiconductor. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Therefore, the crystal structure is a secondary element for the CAC-OS.

Note that in the CAC-OS, a layered structure including two or more films with different atomic ratios is not included. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InO_{X1}$ as a main component is not clearly observed in some cases.

In the case where one or more of aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium in a CAC-OS, nanoparticle regions including the selected metal element(s) as a main component(s) are observed in part of the CAC-OS and nanoparticle regions including In as a main component are observed in part thereof, and these nanoparticle regions are randomly dispersed to form a mosaic pattern in the CAC-OS.

The CAC-OS can be deposited by a sputtering method under conditions where a substrate is not heated intentionally, for example. In the case of depositing the CAC-OS by a sputtering method, one or more selected from an inert gas (typically, argon), an oxygen gas, and a nitrogen gas may be used as a deposition gas. The ratio of the flow rate of an oxygen gas to the total flow rate of the deposition gas at the time of deposition is preferably as low as possible, and for example, the flow rate of an oxygen gas is preferably higher than or equal to 0% and lower than 30%, further preferably higher than or equal to 0% and lower than or equal to 10%.

The CAC-OS is characterized in that no clear peak is observed in measurement using θ/2θ scan by an out-of-plane method, which is an X-ray diffraction (XRD) measurement method. That is, X-ray diffraction shows no alignment in the a-b plane direction and the c-axis direction in a measured region.

In an electron diffraction pattern of the CAC-OS which is obtained by irradiation with an electron beam with a probe diameter of 1 nm (also referred to as a nanometer-sized electron beam), a ring-like region with high luminance and a plurality of bright spots in the ring-like region are observed. Therefore, the electron diffraction pattern indicates that the crystal structure of the CAC-OS includes a nanocrystal (nc) structure with no alignment in plan-view and cross-sectional directions.

For example, an energy dispersive X-ray spectroscopy (EDX) mapping image confirms that an In—Ga—Zn oxide with the CAC composition has a structure in which a region including $GaO_{X3}$ as a main component and a region including $In_{X2}Zn_{Y2}O_{Z2}$ or $InO_{X1}$ as a main component are unevenly distributed and mixed.

As described above, the CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are separated to form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through regions including $In_{X2}Zn_{Y2}O_{Z2}$ or $InO_{X1}$ as a main component, the conductivity of an oxide semiconductor is exhibited. Accordingly, when regions including $In_{X2}Zn_{Y2}O_{Z2}$ or $InO_{X1}$ as a main component are distributed in an oxide semiconductor like a cloud, high field-effect mobility (μ) can be achieved.

In contrast, the insulating property of a region including $GaO_{X3}$ or the like as a main component is higher than that of a region including $In_{X2}Zn_{Y2}O_{Z2}$ or $InO_{X1}$ as a main component. In other words, when regions including $GaO_{X3}$ or the like as a main component are distributed in an oxide semiconductor, a leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby a high on-state current (Ion) and high field-effect mobility (μ) can be achieved.

A semiconductor element including a CAC-OS has high reliability. Thus, the CAC-OS is suitably used in a variety of semiconductor devices typified by a display.

At least part of this embodiment can be implemented in appropriate combination with any of the other embodiments described in this specification.

Embodiment 10

In this embodiment, examples of electronic devices each including a hybrid display device will be described. Electronic devices described in the following examples can each include the display unit 110 described in Embodiment 1.

Alternatively, the electronic devices described in the following examples can each include the touch sensor unit 120 in addition to the display unit 110. Particularly in the case where the electronic devices described in the following examples each include the controller IC disclosed in this specification, the power consumption of the electronic devices can be reduced.

Note that one embodiment of the present invention is not limited to a hybrid display device and may be a display device that includes a display element including one of a reflective element and a light-emitting element or an electronic device including the display device.

<Tablet Information Terminal>

Figure 40A:
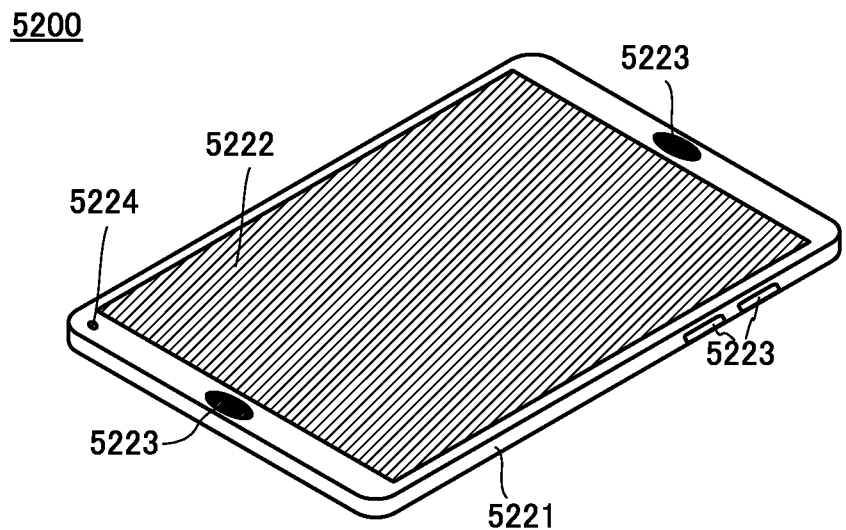
FIGS. 40A and 40B are perspective views each illustrating an example of an electronic device.

FIG. 40A illustrates a tablet information terminal 5200, which includes a housing 5221, a display portion 5222, operation buttons 5223, and a speaker 5224. A display device having a position input function may be used as the display portion 5222. The position input function can be added by providing a touch panel in the display device. Alternatively, the position input function can be added by providing a photoelectric conversion element also called a photosensor in a pixel portion of the display device. As the operation buttons 5223, any one of a power switch for starting the information terminal 5200, a button for operating an application of the information terminal 5200, a volume control button, a switch for turning on or off the display portion 5222, and the like can be provided. Although the number of the operation buttons 5223 is four in the information terminal 5200 illustrated in FIG. 40A, the number and position of operation buttons included in the information terminal 5200 are not limited to this example.

Although not illustrated, the information terminal 5200 illustrated in FIG. 40A may include a microphone. With this structure, the information terminal 5200 can have a telephone function like a cellular phone, for example.

Although not illustrated, the information terminal 5200 illustrated in FIG. 40A may include a camera. Although not illustrated, the information terminal 5200 illustrated in FIG. 40A may include a light-emitting device for use as a flashlight or a lighting device.

Although not illustrated, the information terminal 5200 illustrated in FIG. 40A may include a sensor (which measures force, displacement, position, speed, acceleration, angular velocity, rotational frequency, distance, light, liquid, magnetism, temperature, a chemical substance, a sound, time, hardness, electric field, current, voltage, electric power, radiation, flow rate, humidity, gradient, oscillation, smell, infrared rays, or the like) inside the housing 5221. In particular, when a measuring device including a sensor for measuring inclination, such as a gyroscope sensor or an acceleration sensor, is provided, display on the screen of the display portion 5222 can be automatically changed in accordance with the orientation of the information terminal 5200 illustrated in FIG. 40A by determining the orientation of the information terminal 5200 (the orientation of the information terminal with respect to the vertical direction).

Although not illustrated, the information terminal 5200 illustrated in FIG. 40A may include a device for obtaining biological information such as fingerprints, veins, iris, or voice prints. With this structure, the information terminal 5200 can have a biometric identification function.

In the case where the information terminal 5200 includes a microphone, it can have a speech interpretation function. With the speech interpretation function, the information terminal 5200 can have a function of operating the information terminal 5200 by speech recognition, a function of interpreting a speech or a conversation and creating a summary of the speech or the conversation, and the like. This can be utilized to create meeting minutes or the like, for example.

For the display portion 5222, a flexible base may be used. Specifically, the display portion 5222 may be formed by providing a transistor, a capacitor, and a display element, for example, over a flexible base. With this structure, an electronic device with a housing having a curved surface can be fabricated as well as the electronic device with the housing 5221 having a flat surface, such as the information terminal 5200 illustrated in FIG. 40A.

Figure 40B:
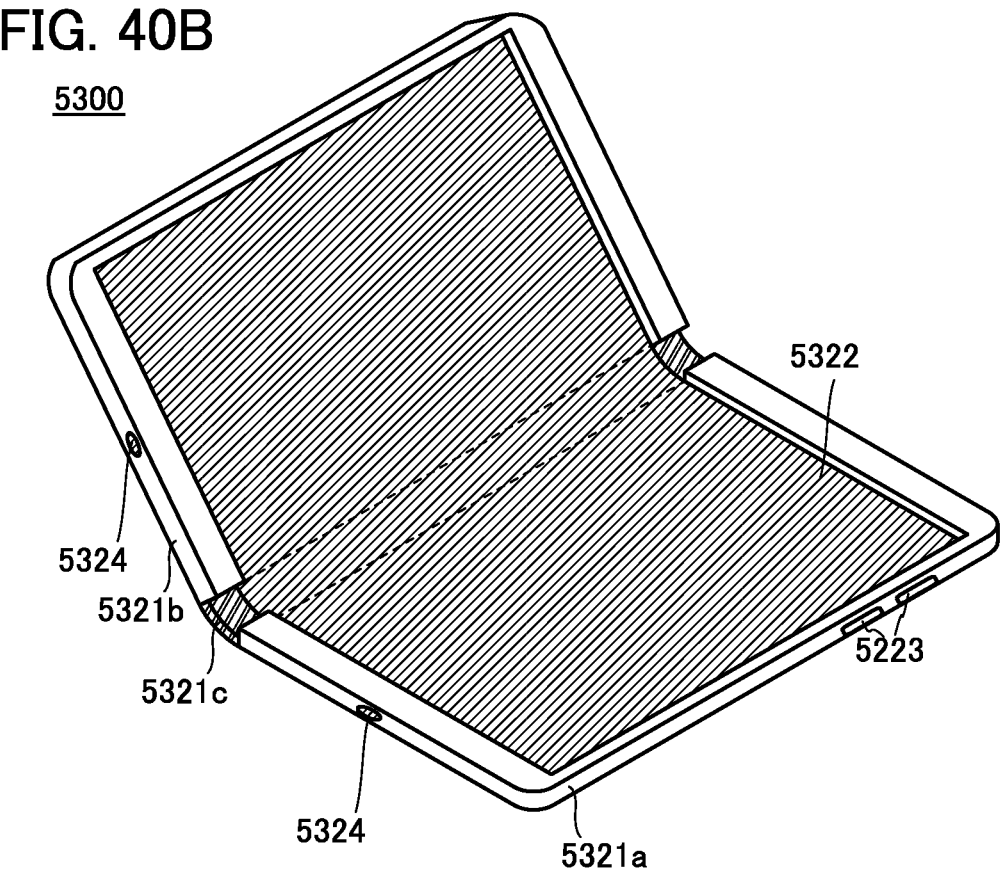

Furthermore, a flexible base may be used for the display portion 5222 of the information terminal 5200 so that the display portion 5222 is freely foldable. FIG. 40B illustrates such a structure. An information terminal 5300 is a tablet information terminal similar to the information terminal 5200 and includes a housing 5321a, a housing 5321b, a display portion 5322, operation buttons 5323, and speakers 5324.

The housing 5321a and the housing 5321b are connected to each other with a hinge portion 5321c that allows the display portion 5322 to be folded in half. The display portion 5322 is provided in the housing 5321a and the housing 5321b and over the hinge portion 5321c.

As a flexible base that can be used for the display portions 5222 and 5322, any of the following materials that transmit visible light can be used: a poly(ethylene terephthalate) resin (PET), a poly(ethylene naphthalate) resin (PEN), a poly (ether sulfone) resin (PES), a polyacrylonitrile resin, an acrylic resin, a polyimide resin, a poly(methyl methacrylate) resin, a polycarbonate resin, a polyamide resin, a polycycloolefin resin, a polystyrene resin, a poly(amide imide) resin, a polypropylene resin, a polyester resin, a poly(vinyl halide) resin, an aramid resin, an epoxy resin, and the like. Alternatively, a mixture or a stack including any of these materials may be used.

The use of the controller IC disclosed in this specification for the information terminal 5200 or the information terminal 5300 enables a reduction in the power consumption of the information terminal 5200 or the information terminal 5300 in IDS driving.

<Portable Game Console>

Figure 41A:
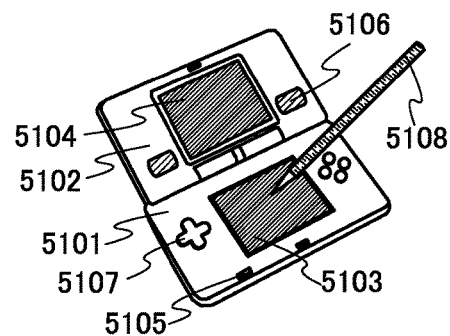
FIGS. 41A to 41F are perspective views each illustrating an example of an electronic device.

FIG. 41A illustrates a portable game console including a housing 5101, a housing 5102, a display portion 5103, a display portion 5104, a microphone 5105, speakers 5106, operation keys 5107, a stylus 5108, and the like. The controller IC of one embodiment of the present invention can be used for an integrated circuit included in the portable game console. Although the portable game console in FIG. 41A has the two display portions 5103 and 5104, the number of display portions included in a portable game console is not limited to two.

<Portable Information Terminal>

Figure 41B:
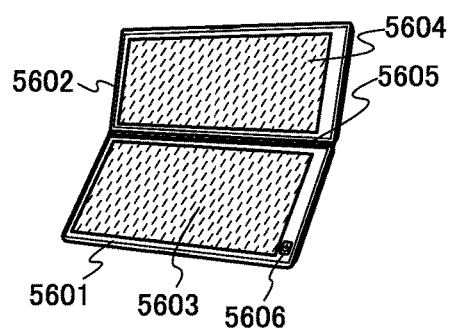

FIG. 41B illustrates a portable information terminal including a first housing 5601, a second housing 5602, a first display portion 5603, a second display portion 5604, a joint portion 5605, an operation key 5606, and the like. The controller IC of one embodiment of the present invention can be used for an integrated circuit included in the portable information terminal. The first display portion 5603 is provided in the first housing 5601, and the second display portion 5604 is provided in the second housing 5602. The first housing 5601 and the second housing 5602 are connected to each other with the joint portion 5605, and the angle between the first housing 5601 and the second housing 5602 can be changed with the joint portion 5605. Images displayed on the first display portion 5603 may be switched in accordance with the angle at the joint portion 5605 between the first housing 5601 and the second housing 5602. A display device with a position input function may be used as at least one of the first display portion 5603 and the second display portion 5604. Note that the position input function can be added by providing a touch panel in a display device. Alternatively, the position input function can be added by providing a photoelectric conversion element called a photosensor in a pixel portion of a display device.

<Laptop Personal Computer>

Figure 41C:
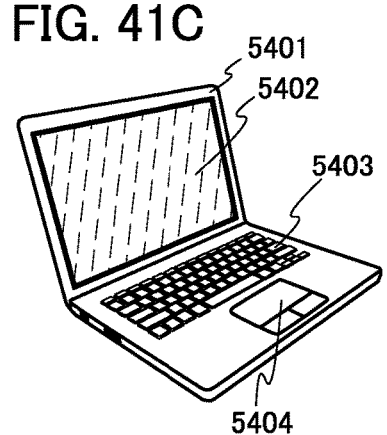

FIG. 41C illustrates a laptop personal computer including a housing 5401, a display portion 5402, a keyboard 5403, a pointing device 5404, and the like. The display device of one embodiment of the present invention can be used as the display portion 5402.

<Wearable Terminal>

Figure 41D:
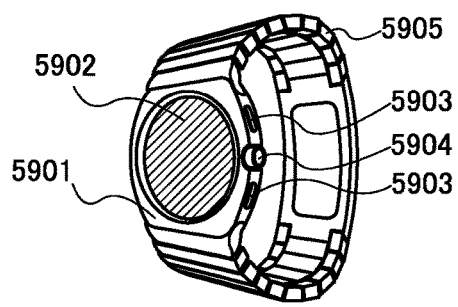

FIG. 41D is a smart watch, which is a wearable terminal. The smart watch includes a housing 5901, a display portion 5902, operation buttons 5903, an operator 5904, and a band 5905. The controller IC of one embodiment of the present invention can be used for an integrated circuit included in the smart watch. A display device with a position input function may be used as the display portion 5902. Note that the position input function can be added by providing a touch panel in a display device. Alternatively, the position input function can be added by providing a photoelectric conversion element called a photosensor in a pixel portion of a display device. As the operation buttons 5903, any of a power switch for starting the smart watch, a button for operating an application of the smart watch, a volume control button, a switch for turning on or off the display portion 5902, and the like can be provided. Although the smart watch in FIG. 41D includes two operation buttons 5903, the number of the operation buttons included in the smart watch is not limited to two. The operator 5904 functions as a crown that performs time adjustment in the smart watch. The operator 5904 may be used as an input interface for operating an application of the smart watch as well as the crown for a time adjustment. Although the smart watch illustrated in FIG. 41D includes the operator 5904, one embodiment of the present invention is not limited thereto and the operator 5904 is not necessarily provided.

<Video Camera>

Figure 41E:
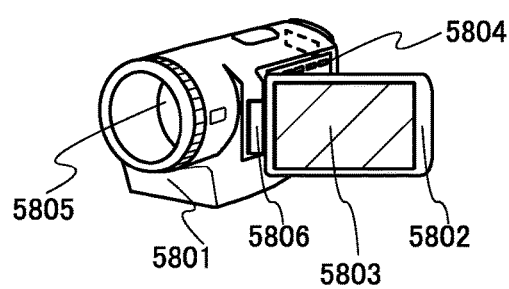

FIG. 41E illustrates a video camera including a first housing 5801, a second housing 5802, a display portion 5803, operation keys 5804, a lens 5805, a joint portion 5806, and the like. The controller IC of one embodiment of the present invention can be used for an integrated circuit included in the video camera. The operation keys 5804 and the lens 5805 are provided in the first housing 5801, and the display portion 5803 is provided in the second housing 5802. The first housing 5801 and the second housing 5802 are connected to each other with the joint portion 5806, and the angle between the first housing 5801 and the second housing 5802 can be changed with the joint portion 5806. Images displayed on the display portion 5803 may be switched in accordance with the angle at the joint portion 5806 between the first housing 5801 and the second housing 5802.

<Mobile Phone>

Figure 41F:
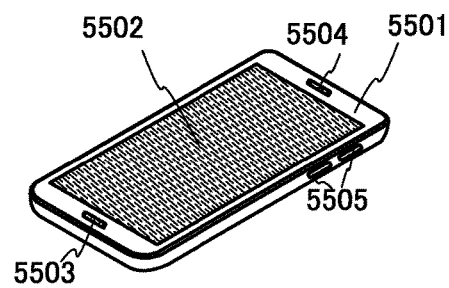

FIG. 41F is a mobile phone having a function of an information terminal. The mobile phone includes a housing 5501, a display portion 5502, a microphone 5503, a speaker 5504, and operation buttons 5505. A display device with a position input function may be used as the display portion 5502. Note that the position input function can be added by providing a touch panel in a display device. Alternatively, the position input function can be added by providing a photoelectric conversion element called a photosensor in a pixel portion of a display device. As the operation buttons 5505, any of a power switch for starting the mobile phone, a button for operating an application of the mobile phone, a volume control button, a switch for turning on or off the display portion 5502, and the like can be provided.

Although the mobile phone in FIG. 41F includes two operation buttons 5505, the number of the operation buttons included in the mobile phone is not limited to two. Although not illustrated, the mobile phone illustrated in FIG. 41F may be provided with a camera. Although not illustrated, the mobile phone illustrated in FIG. 41F may include a light-emitting device used for a flashlight or a lighting purpose.

<Moving Vehicle>

The display device described above can also be used around a driver's seat in an automobile, which is a moving vehicle.

Figure 42:
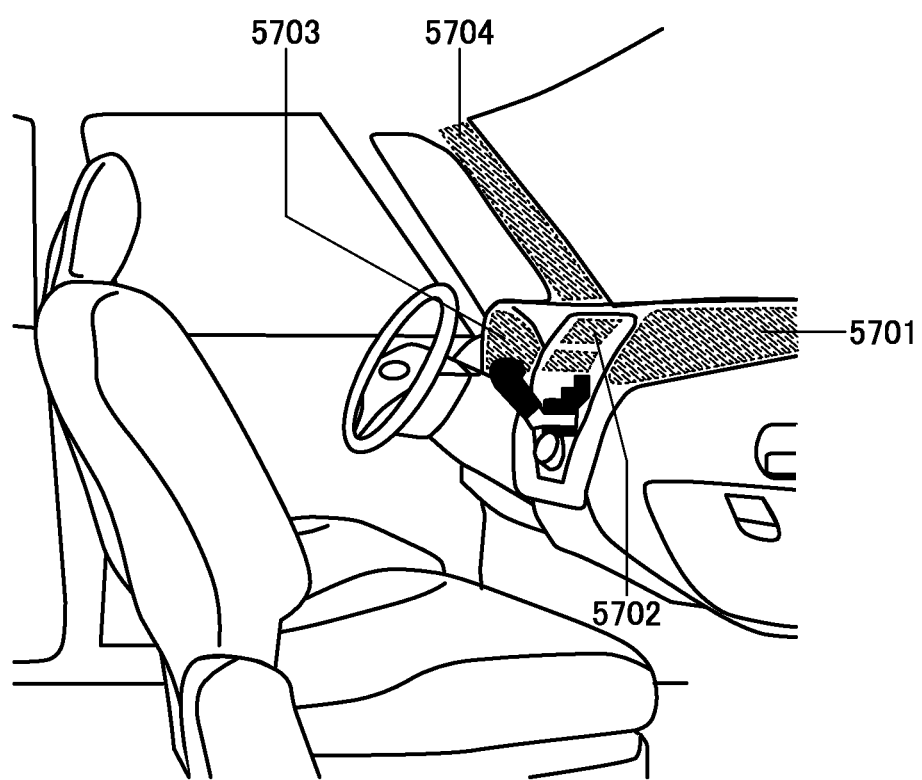
FIG. 42 illustrates a usage example of a display device in a moving vehicle.

FIG. 42 illustrates a front glass and its vicinity inside the automobile, for example. FIG. 42 illustrates a display panel 5701, a display panel 5702, and a display panel 5703 which are attached to a dashboard, and a display panel 5704 attached to a pillar.

The display panels 5701 to 5703 can display a variety of kinds of information such as navigation information, a speedometer, a tachometer, a mileage, a fuel meter, a gearshift indicator, air-condition setting, and the like. The display content, layout, or the like on the display panels can be changed as appropriate in accordance with user's preference, so that more sophisticated design can be obtained. The display panels 5701 to 5703 can also be used as lighting devices.

The display panel 5704 can compensate for the view obstructed by the pillar (blind areas) by showing an image taken by an imaging means provided for the car body. That is, displaying an image taken by the imaging means provided on the outside of the car body can eliminate blind spots and improve safety. Displaying an image to compensate for the area which a driver cannot see, makes it possible for the driver to confirm safety easily and comfortably. The display panel 5704 can also be used as a lighting device.

In this specification and the like, a display element, a display device which is a device including a display element, a light-emitting element, and a light-emitting device which is a device including a light-emitting element can employ various modes or can include various elements. For example, the display element, the display device, the light-emitting element, or the light-emitting device includes at least one of an electroluminescence (EL) element (e.g., an EL element including organic and inorganic materials, an organic EL element, or an inorganic EL element), a light-emitting diode (LED) chip (e.g., a white LED chip, a red LED chip, a green LED chip, or a blue LED chip), a transistor (a transistor that emits light depending on current), a plasma display panel (PDP), an electron emitter, a display element including a carbon nanotube, a liquid crystal element, electronic ink, an electrowetting element, an electrophoretic element, a display element using microelectromechanical systems (MEMS) (such as a grating light valve (GLV), a digital micromirror device (DMD), a digital micro shutter (DMS), MIRASOL (registered trademark), an interferometric modulation (IMOD) element, a MEMS shutter display element, an optical-interference-type MEMS display element, or a piezoelectric ceramic display), quantum dots, and the like. Other than the above, a display medium whose contrast, luminance, reflectance, transmittance, or the like is changed by electric or magnetic action may be included in the display element, the display device, the light-emitting element, or the light-emitting device. Note that examples of display devices using EL elements include an EL display. Examples of a display device using an electron emitter include a field emission display (FED), an SED-type flat panel display (SED: surface-conduction electron-emitter display), and the like. Examples of display devices using liquid crystal elements include a liquid crystal display (e.g., a transmissive liquid crystal display, a transflective liquid crystal display, a reflective liquid crystal display, a direct-view liquid crystal display, and a projection liquid crystal display). Examples of a display device using electronic ink, Electronic Liquid Powder (registered trademark), or an electrophoretic element include electronic paper. Examples of display devices containing quantum dots in each pixel include a quantum dot display. Note that quantum dots may be provided not as display elements but as part of a backlight. The use of quantum dots enables display with high color purity. In the case of a transflective liquid crystal display or a reflective liquid crystal display, some or all of pixel electrodes function as reflective electrodes. For example, some or all of pixel electrodes are formed to contain aluminum, silver, or the like. In such a case, a memory circuit such as an SRAM can be provided under the reflective electrode. Thus, power consumption can be further reduced. Note that in the case of using an LED chip, graphene or graphite may be provided under an electrode or a nitride semiconductor of the LED chip. Graphene or graphite may be a multilayer film in which a plurality of layers are stacked. Providing graphene or graphite in such a manner enables easy formation of a nitride semiconductor thereover, such as an n-type GaN semiconductor layer including crystals. Furthermore, a p-type GaN semiconductor layer including crystals, or the like, can be provided thereover, and thus the LED chip can be formed. Note that an AlN layer may be provided between the n-type GaN semiconductor layer including crystals and graphene or graphite. The GaN semiconductor layers included in the LED chip may be formed by MOCVD. Note that when the graphene is provided, the GaN semiconductor layers included in the LED chip can also be formed by a sputtering method. In a display element using microelectromechanical systems (MEMS), a dry agent may be provided in a space where the display element is sealed (e.g., between an element substrate over which the display element is placed and a counter substrate opposed to the element substrate). Providing a dry agent can prevent MEMS and the like from becoming difficult to move or deteriorating easily because of moisture or the like.

This embodiment can be combined with any of the other embodiments in this specification as appropriate.

Notes on the Description in this Specification and the Like

The following are notes on the description of the above embodiments and the structures in the embodiments.

Notes on One Embodiment of the Present Invention Described in Embodiments

One embodiment of the present invention can be constituted by appropriately combining the structure described in an embodiment with any of the structures described in the other embodiments. In addition, in the case where a plurality of structure examples are described in one embodiment, some of the structure examples can be combined as appropriate.

Note that what is described (or part thereof) in an embodiment can be applied to, combined with, or replaced with another content in the same embodiment and/or what is described (or part thereof) in another embodiment or other embodiments.

Note that in each embodiment, a content described in the embodiment is a content described with reference to a variety of diagrams or a content described with text disclosed in this specification.

Note that by combining a diagram (or part thereof) described in one embodiment with another part of the diagram, a different diagram (or part thereof) described in the embodiment, and/or a diagram (or part thereof) described in another embodiment or other embodiments, much more diagrams can be formed.

Notes on Ordinal Numbers

In this specification and the like, ordinal numbers such as "first", "second", and "third" are used in order to avoid confusion among components. Thus, the terms do not limit the number or order of components. In the present specification and the like, for example, a "first" component in one embodiment can be referred to as a "second" component in other embodiments or claims. Furthermore, in the present specification and the like, for example, a "first" component in one embodiment can be omitted in other embodiments or claims.

Notes on the Description for Drawings

Embodiments are described with reference to drawings. However, the embodiments can be implemented with various modes. It is readily appreciated by those skilled in the art that modes and details can be changed in various ways without departing from the spirit and scope of the present invention. Thus, the present invention should not be interpreted as being limited to the description of the embodiments. Note that in the structures of the embodiments, the same portions or portions having similar functions are denoted by the same reference numerals in different drawings, and the description of such portions is not repeated.

In this specification and the like, terms for describing arrangement, such as "over" and "under", are used for convenience to indicate a positional relation between components with reference to drawings. The positional relation between components is changed as appropriate in accordance with the direction in which each component is described. Therefore, terms for describing arrangement are not limited to the terms used in the description in the specification, and can be appropriately reworded depending on situations.

The term "over" or "below" does not necessarily mean that a component is placed directly on or directly below and directly in contact with another component. For example, the expression "electrode B over insulating layer A" does not necessarily mean that the electrode B is on and in direct contact with the insulating layer A and can include the case where another component is provided between the insulating layer A and the electrode B.

In this specification and the like, components are classified on the basis of the functions, and shown as blocks independent of one another in block diagrams. However, in an actual circuit or the like, it may be difficult to separate components on the basis of the functions, so that one circuit may be associated with a plurality of functions and several circuits may be associated with one function. Therefore, the segmentation of a block in the block diagrams is not limited by any of the components described in the specification, and can be differently determined as appropriate depending on situations.

In the drawings, the size, the layer thickness, or the region has arbitrary magnitude for convenience for the description. Therefore, the scale is not necessarily limited to that illustrated in the drawings. Note that the drawings are schematically illustrated for clarity, and shapes or values are not limited to those illustrated in the drawings. For example, the following can be included: variation in signal, voltage, or current due to noise or difference in timing.

In drawings such as a perspective view, some of components might not be illustrated for clarity of the drawings.

In the drawings, the same components, components having similar functions, components formed of the same material, or components formed at the same time are denoted by the same reference numerals in some cases, and the description thereof is not repeated in some cases.

Notes on Expressions that can be Rephrased

In this specification and the like, in description of connections of a transistor, the terms of "one of a source and a drain" (or a first electrode or a first terminal) and "the other of the source and the drain" (or a second electrode or a second terminal) are used. This is because a source and a drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation. In this specification and the like, two terminals except a gate are sometimes referred to as a first terminal and a second terminal or as a third terminal and a fourth terminal.

In this specification and the like, in the case where a transistor has two or more gates (such a structure is referred to as a dual-gate structure in some cases), these gates are referred to as a first gate and a second gate or a front gate and a back gate in some cases. In particular, the term "front gate" can be replaced with a simple term "gate". The term "back gate" can be replaced with a simple term "gate".

A transistor includes three terminals called a gate, a source, and a drain. A gate is a terminal that controls the conduction state of a transistor. Depending on the channel type of the transistor or the levels of potentials supplied to the terminals, one of terminals (an input terminal and an output terminal) functions as a source and the other functions as a drain. Therefore, the terms "source" and "drain" are interchangeable in this specification and the like. Furthermore, the two terminals other than the gate may be referred to as a first terminal and a second terminal or as a third terminal and a fourth terminal in this specification and the like.

In addition, in this specification and the like, the term such as an "electrode" or a "wiring" does not limit the function of a component. For example, an "electrode" is used as part of a "wiring" in some cases, and vice versa. Furthermore, the term "electrode" or "wiring" can also mean a combination of a plurality of "electrodes" or "wirings" formed in an integrated manner.

In this specification and the like, the terms "voltage" and "potential" are interchangeable in appropriate cases. The term "voltage" refers to a potential difference between a given potential and a reference potential. When the reference potential is a ground potential, the term "voltage" can be replaced with the term "potential". The ground potential does not necessarily mean 0 V. Note that a potential is relative, and a potential supplied to wirings or the like may be changed depending on a reference potential.

In this specification and the like, the terms "film", "layer", and the like can be interchanged with each other depending on the case or circumstances. For example, the term "conductive layer" can be changed into the term "conductive film" in some cases. Moreover, the term "insulating film" can be changed into the term "insulating layer" in some cases, or can be replaced with a word not including the term "film" or "layer" depending on the case or circumstances. For example, the term "conductive layer" or "conductive film" can be changed into the term "conductor" in some cases. Furthermore, for example, the term "insulating layer" or "insulating film" can be changed into the term "insulator" in some cases.

In this specification and the like, the terms "wiring", "signal line", "power supply line", and the like can be interchanged with each other depending on circumstances or conditions. For example, the term "wiring" can be changed into the term such as "signal line" or "power supply line" in some cases. The term such as "signal line" or "power supply line" can be changed into the term "wiring" in some cases. The term such as "power supply line" can be changed into the term such as "signal line" in some cases. The term such as "signal line" can be changed into the term such as "power supply line" in some cases. The term "potential" that is supplied to a wiring can be changed into the term "signal" or the like depending on circumstances or conditions. Inversely, the term "signal" or the like can be changed into the term "potential" in some cases.

<Notes on Definitions of Terms>

The following are definitions of the terms mentioned in the above embodiments.

<<Semiconductor>>

Note that in this specification, a "semiconductor" may have the characteristics of an "insulator" when the conductivity is sufficiently low, for example. In addition, a "semiconductor" and an "insulator" cannot be strictly distinguished from each other in some cases because a border between the "semiconductor" and the "insulator" is not clear. Accordingly, a "semiconductor" in this specification can be called an "insulator" in some cases. Similarly, an "insulator" in this specification can be called a "semiconductor" in some cases.

Note that a "semiconductor" may have the characteristics of a "conductor" when the conductivity is sufficiently high, for example. In addition, a "semiconductor" and a "conductor" cannot be strictly distinguished from each other in some cases because a border between the "semiconductor" and the "conductor" is not clear. Accordingly, a "semiconductor" in this specification can be called a "conductor" in some cases. Similarly, a "conductor" in this specification can be called a "semiconductor" in some cases.

Note that impurities in a semiconductor refer to, for example, elements other than the main components of a semiconductor layer. For example, an element with a concentration of lower than 0.1 atomic % is an impurity. When an impurity is contained, the density of states (DOS) may be formed in a semiconductor, the carrier mobility may be decreased, or the crystallinity may be decreased. In the case where the semiconductor is an oxide semiconductor, examples of an impurity which changes characteristics of the semiconductor include Group 1 elements, Group 2 elements, Group 13 elements, Group 14 elements, Group 15 elements, and transition metals other than the main components of the semiconductor; specifically, there are hydrogen (included in water), lithium, sodium, silicon, boron, phosphorus, carbon, and nitrogen, for example. Furthermore, in the case of an oxide semiconductor, oxygen vacancies may be formed by entry of impurities such as hydrogen. In the case where the semiconductor is a silicon layer, examples of an impurity which changes the characteristics of the semiconductor include oxygen, Group 1 elements except hydrogen, Group 2 elements, Group 13 elements, and Group 15 elements.

<<Transistor>>

In this specification, a transistor is an element having at least three terminals of a gate, a drain, and a source. The transistor has a channel formation region between the drain (a drain terminal, a drain region, or a drain electrode) and the source (a source terminal, a source region, or a source electrode), and current can flow between the source and the drain.

Furthermore, functions of a source and a drain might be switched when transistors having different polarities are employed or a direction of current flow is changed in circuit operation, for example. Therefore, the terms "source" and "drain" can be switched in this specification and the like.

<<Switch>>

In this specification and the like, a switch is an element that is brought into a conduction state or a non-conduction state (is turned on or off) to determine whether a current flows therethrough or not. Alternatively, the switch is an element having a function of selecting and changing a current path.

For example, an electrical switch, a mechanical switch, or the like can be used as a switch. That is, any element can be used as a switch as long as it can control a current, without limitation to a certain element.

A transistor (e.g., a bipolar transistor or a MOS transistor), a diode (e.g., a PN diode, a PIN diode, a Schottky diode, a metal-insulator-metal (MIM) diode, a metal-insulator-semiconductor (MIS) diode, or a diode-connected transistor), or a logic circuit in which such elements are combined can be used as an electrical switch.

When a transistor is used as a switch, an "on state" of the transistor refers to a state in which a source electrode and a drain electrode of the transistor are electrically short-circuited. Furthermore, an "off state" of the transistor refers to a state in which the source electrode and the drain electrode of the transistor are electrically disconnected. Note that if the transistor operates just as a switch, there is no particular limitation on the polarity (conductivity type) of the transistor.

An example of a mechanical switch is a switch formed using a MEMS (microelectromechanical system) technology, such as a digital micromirror device (DMD). Such a switch includes an electrode which can be moved mechanically, and operates by controlling conduction and non-conduction in accordance with movement of the electrode.

<<Connection>>

In this specification and the like, when it is described that X and Y are connected, the case where X and Y are electrically connected, the case where X and Y are functionally connected, and the case where X and Y are directly connected are included therein. Accordingly, another element may be interposed between elements having a connection relation shown in drawings and texts, without limitation to a predetermined connection relation, for example, the connection relation shown in the drawings and the texts.

Here, X, Y, and the like each denote an object (e.g., a device, an element, a circuit, a wiring, an electrode, a terminal, a conductive film, or a layer).

For example, in the case where X and Y are electrically connected, one or more elements that enable electrical connection between X and Y (e.g., a switch, a transistor, a capacitor, an inductor, a resistor, a diode, a display element, a light-emitting element, and a load) can be connected between X and Y. A switch is controlled to be on or off. That is, a switch is conducting or not conducting (is turned on or off) to determine whether a current flows therethrough or not.

For example, in the case where X and Y are functionally connected, one or more circuits that enable functional connection between X and Y (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a step-up circuit and a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, or a buffer circuit; a signal generation circuit; a memory circuit; and/or a control circuit) can be connected between X and Y. Note that for example, in the case where a signal output from X is transmitted to Y even when another circuit is interposed between X and Y, X and Y are functionally connected.

Note that when it is explicitly described that X and Y are connected, the case where X and Y are electrically connected (i.e., the case where X and Y are connected with another element or another circuit provided therebetween), the case where X and Y are functionally connected (i.e., the case where X and Y are functionally connected with another circuit provided therebetween), and the case where X and Y are directly connected (i.e., the case where X and Y are connected without another element or another circuit provided therebetween) are included therein. That is, the explicit expression "X and Y are electrically connected" is the same as the explicit simple expression "X and Y are connected".

Note that, for example, the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to a part of Z1 and another part of Z1 is directly connected to X while a drain (or a second terminal or the like) of the transistor is directly connected to a part of Z2 and another part of Z2 is directly connected to Y, can be expressed by using any of the following expressions.

The expressions include, for example, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope. Note that these expressions are only examples and one embodiment of the present invention is not limited to the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

<<Parallel and Perpendicular>>

In this specification, the term "parallel" indicates that the angle formed between two straight lines is greater than or equal to −10° and less than or equal to 10°, and accordingly also includes the case where the angle is greater than or equal to −5° and less than or equal to 5°. In addition, the term "substantially parallel" indicates that the angle formed between two straight lines is greater than or equal to −30° and less than or equal to 30°. In addition, the term "perpendicular" indicates that the angle formed between two straight lines is greater than or equal to 80° and less than or equal to 100°, and accordingly also includes the case where the angle is greater than or equal to 85° and less than or equal to 95°. In addition, the term "substantially perpendicular" indicates that the angle formed between two straight lines is greater than or equal to 60° and less than or equal to 120°.

<<Trigonal and Rhombohedral>>

In this specification, trigonal and rhombohedral crystal systems are included in a hexagonal crystal system.

This application is based on Japanese Patent Application Serial No. 2016-138377 filed with Japan Patent Office on Jul. 13, 2016 and Japanese Patent Application Serial No. 2016-138378 filed with Japan Patent Office on Jul. 13, 2016, the entire contents of which are hereby incorporated by reference.

What is claimed is:

1. An electronic device comprising:
   a data processing circuit;
   a frame memory; and
   a memory device,
   wherein the frame memory includes a power consumption monitor,
   wherein the data processing circuit includes a first product-sum operation circuit, a second product-sum operation circuit, a first switch circuit, and a second switch circuit,
   wherein the first product-sum operation circuit includes a first terminal,
   wherein the second product-sum operation circuit includes a second terminal,
   wherein the first switch circuit includes a third terminal and a fourth terminal,
   wherein the second switch circuit includes a fifth terminal and a sixth terminal, wherein the first terminal is electrically connected to the third terminal, wherein the second terminal is electrically connected to the fifth terminal, wherein the fourth terminal is electrically connected to the sixth terminal, wherein the first switch circuit is configured to electrically connect or disconnect the third terminal and the fourth terminal to or from each other, wherein the second switch circuit is configured to electrically connect or disconnect the fifth terminal and the sixth terminal to or from each other, wherein the frame memory is configured to hold image data and to rewrite the held image data, wherein the power consumption monitor is configured to obtain as first data an amount of power consumed when the image data held in the frame memory is rewritten, and wherein the data processing circuit is configured to receive the first data and a signal indicating whether to perform idling stop driving and to determine whether to speculatively execute data saving into the memory device, in response to the first data and the signal.

2. The electronic device according to claim 1, wherein a configuration of the first switch circuit is a same as a configuration of the second switch circuit, wherein the fifth terminal corresponds to the third terminal, wherein the sixth terminal corresponds to the fourth terminal, wherein the first switch circuit comprises a first circuit, wherein the first circuit comprises a first transistor, a second transistor, and a first capacitor, wherein one of a source and a drain of the first transistor is electrically connected to a gate of the second transistor, wherein one of a pair of electrodes of the first capacitor is electrically connected to the one of the source and the drain of the first transistor, wherein one of a source and a drain of the second transistor is electrically connected to the third terminal, and wherein the other of the source and the drain of the second transistor is electrically connected to the fourth terminal.

3. The electronic device according to claim 2, wherein at least one of channel formation regions in the first transistor and the second transistor includes an oxide containing at least one of indium, zinc, and an element M that is aluminum, gallium, yttrium, or tin.

4. The electronic device according to claim 1, wherein a configuration of the second product-sum operation circuit is a same as a configuration of the first product-sum operation circuit, wherein the first product-sum operation circuit includes a first memory cell, a second memory cell, and an offset circuit, wherein the first memory cell is electrically connected to the offset circuit, wherein the second memory cell is electrically connected to the offset circuit, wherein the first memory cell is configured to hold first analog data and to supply a first current based on the first analog data when a first signal is input as a selection signal to the first memory cell, wherein the second memory cell is configured to hold reference analog data and to supply a second current based on the reference analog data when the first signal is input as the selection signal to the second memory cell, wherein the offset circuit is configured to supply a third current which is a difference between the first current and the second current, wherein the first memory cell is configured to supply a fourth current based on a second signal including second analog data and the first analog data when the second signal is input as the selection signal to the first memory cell, wherein the second memory cell is configured to supply a fifth current based on the second signal and the reference analog data when the second signal is input as the selection signal to the second memory cell, and wherein the first product-sum operation circuit is configured to output a sixth current obtained by subtracting the third current from a difference between the fourth current and the fifth current.

5. The electronic device according to claim 1, further comprising an offset circuit, wherein a configuration of the second product-sum operation circuit is a same as a configuration of the first product-sum operation circuit, wherein the first product-sum operation circuit includes a memory cell array, wherein the memory cell array includes a first memory cell and a second memory cell, wherein the first memory cell is electrically connected to the offset circuit, wherein the second memory cell is electrically connected to the offset circuit, wherein the first memory cell is configured to hold first analog data and to supply a first current based on the first analog data when a first signal is input as a selection signal to the first memory cell, wherein the second memory cell is configured to hold reference analog data and to supply a second current based on the reference analog data when the first signal is input as the selection signal to the second memory cell, wherein the offset circuit is configured to supply a third current which is a difference between the first current and the second current, wherein the first memory cell is configured to supply a fourth current based on a second signal including second analog data and the first analog data when the second signal is input as the selection signal to the first memory cell, wherein the second memory cell is configured to supply a fifth current based on the second signal and the reference analog data when the second signal is input as the selection signal to the second memory cell, and wherein the first product-sum operation circuit is configured to output a sixth current obtained by subtracting the third current from a difference between the fourth current and the fifth current.

6. The electronic device according to claim 1, further comprising a display unit, wherein at least part of the data processing circuit is configured not to be supplied with power when a still image is displayed by the display unit during the idling stop driving.

7. An electronic device comprising:

a data processing circuit;
a frame memory; and
a memory device, wherein the frame memory includes a power consumption monitor, wherein the data processing circuit includes a first memory cell, a second memory cell, and an offset circuit, wherein the first memory cell is configured to output a first current based on first analog data held in the first memory cell, wherein the second memory cell is configured to output a second current based on reference analog data held in the second memory cell, wherein the offset circuit is configured to output a third current which is a difference between the first current and the second current, wherein the first memory cell is configured to output a fourth current based on the first analog data held in the first memory cell, when second analog data is input as a selection signal to the first memory cell, wherein the second memory cell is configured to output a fifth current based on the reference analog data held in the second memory cell, when the second analog data is input as the selection signal to the second memory cell, wherein the data processing circuit is configured to output a sixth current that is obtained by subtracting the third current from a difference between the fourth current and the fifth current and depends on a sum of products of the first analog data and the second analog data, wherein the frame memory is configured to hold image data and to rewrite the held image data, wherein the power consumption monitor is configured to obtain as first data an amount of power consumed when the image data held in the frame memory is rewritten, and wherein the data processing circuit is configured to receive the first data and a signal indicating whether to perform idling stop driving and to determine whether to speculatively execute data saving into the memory device, in response to the first data, the signal, and the sixth current.

8. The electronic device according to claim 7, wherein the first memory cell, the second memory cell, and the offset circuit each include a third transistor, and wherein a channel formation region in the third transistor includes an oxide containing at least one of indium, zinc, and an element M that is aluminum, gallium, yttrium, or tin.

9. The electronic device according to claim 7, wherein the memory device is a register.

10. The electronic device according to claim 7, further comprising a first display element and a second display element, wherein the first display element is configured to display an image with use of reflection of light, and wherein the second display element is configured to display an image by self-emission.

11. The electronic device according to claim 7, further comprising a display unit, wherein at least part of the data processing circuit is configured not to be supplied with power when a still image is displayed by the display unit during the idling stop driving.

12. An electronic device comprising:

a data processing circuit;

a touch sensor unit; and a memory device, wherein the data processing circuit includes a first memory cell, a second memory cell, and an offset circuit, wherein the first memory cell is configured to output a first current based on first analog data held in the first memory cell, wherein the second memory cell is configured to output a second current based on reference analog data held in the second memory cell, wherein the offset circuit is configured to output a third current which is a difference between the first current and the second current, wherein the first memory cell is configured to output a fourth current based on the first analog data held in the first memory cell, when second analog data is input as the selection signal to the first memory cell, wherein the second memory cell is configured to output a fifth current based on the reference analog data held in the second memory cell, when the second analog data is input as the selection signal to the second memory cell, wherein the data processing circuit is configured to output a sixth current that is obtained by subtracting the third current from a difference between the fourth current and the fifth current and depends on a sum of products of the first analog data and the second analog data, wherein the touch sensor unit is configured to obtain first data based on input data, and wherein the data processing circuit is configured to receive the first data and a signal indicating whether to perform idling stop driving and to determine whether to speculatively execute data saving into the memory device, in response to the first data, the signal, and the sixth current.

13. The electronic device according to claim 12, wherein the first memory cell, the second memory cell, and the offset circuit each include a third transistor, and wherein a channel formation region in the third transistor includes an oxide containing at least one of indium, zinc, and an element M that is aluminum, gallium, yttrium, or tin.

14. The electronic device according to claim 12, wherein the memory device is a register.

15. The electronic device according to claim 12, further comprising a first display element and a second display element, wherein the first display element is configured to display an image with use of reflection of light, and wherein the second display element is configured to display an image by self-emission.

16. The electronic device according to claim 12, further comprising a display unit, wherein at least part of the data processing circuit is configured not to be supplied with power when a still image is displayed by the display unit during the idling stop driving.

* * * * *